United States Patent
Volkerink et al.

(10) Patent No.: US 11,741,822 B2
(45) Date of Patent: Aug. 29, 2023

(54) SYSTEM AND METHOD OF INTELLIGENT NODE DETECTING EVENTS FOR BORDER PROTECTION AND SECURITY

(71) Applicant: TRACKONOMY SYSTEMS, INC., San Jose, CA (US)

(72) Inventors: Hendrik J. Volkerink, San Jose, CA (US); Ajay Khoche, San Jose, CA (US)

( * ) Notice: Subject to any disclaimer, the term of this patent is extended or adjusted under 35 U.S.C. 154(b) by 0 days.

(21) Appl. No.: 17/449,582

(22) Filed: Sep. 30, 2021

(65) Prior Publication Data
US 2022/0122436 A1    Apr. 21, 2022

Related U.S. Application Data

(63) Continuation-in-part of application No. 17/330,353, filed on May 25, 2021.
(Continued)

(51) Int. Cl.
*G08B 25/10*    (2006.01)
*G06V 20/20*    (2022.01)
(Continued)

(52) U.S. Cl.
CPC ............. *G08B 25/10* (2013.01); *G06V 20/20* (2022.01); *G06V 10/761* (2022.01); *G08B 13/22* (2013.01)

(58) Field of Classification Search
CPC .. G06K 9/00; G06K 9/00201; G06K 9/00362; G06K 9/00624; G06K 9/00671; G06K 9/00718; G06K 9/00771; G06K 19/00; G06K 19/06; G06K 19/07; G06K 19/077; G06F 20/23; G06F 16/235; G06F 16/28; G06Q 20/20; G06Q 30/00;
(Continued)

(56) References Cited

U.S. PATENT DOCUMENTS

| 4,064,552 A | 12/1977 | Angelucci et al. |
| 4,974,129 A | 11/1990 | Grieb et al. |

(Continued)

FOREIGN PATENT DOCUMENTS

| AU | 2018204317 A1 | 1/2019 |
| CA | 3008512 A1 | 12/2018 |

(Continued)

OTHER PUBLICATIONS

NPL Search.*
(Continued)

*Primary Examiner* — Van T Trieu

(57) ABSTRACT

A method, comprising detecting, by a wireless tracking system, a tampering event associated with an asset within an asset container; capturing, by the wireless tracking system, a first digital representation of the field of view including the asset container; determining, based on the wireless tracking system comparing the first representation to a second digital representation of the field of view including the asset container stored in memory, a difference between the first and second digital representations; and displaying, by the wireless tracking system, within a graphical user interface of a client device, the difference between the first and second digital representations, wherein displaying the difference comprises displaying an augmented reality overlay to emphasizes the difference.

26 Claims, 26 Drawing Sheets

Related U.S. Application Data

(60) Provisional application No. 63/085,992, filed on Sep. 30, 2020, provisional application No. 63/029,675, filed on May 25, 2020, provisional application No. 63/196,150, filed on Jun. 2, 2021, provisional application No. 63/124,791, filed on Dec. 12, 2020.

(51) Int. Cl.
 *G08B 13/22* (2006.01)
 *G06V 10/74* (2022.01)

(58) Field of Classification Search
 CPC ........ G06Q 30/06; G06V 20/64; G06V 20/20; G06V 20/44; H04N 23/225; H04N 23/232; G08G 1/08; G08G 13/14; G07G 1/00; G07G 1/0054; A47F 9/00; A47F 9/042; A47F 9/043; A47F 9/046
 See application file for complete search history.

(56) References Cited

U.S. PATENT DOCUMENTS

| | | | |
|---|---|---|---|
| 5,917,433 | A | 6/1999 | Keillor et al. |
| 6,437,702 | B1 | 8/2002 | Ragland et al. |
| 6,522,874 | B1 | 2/2003 | Chu et al. |
| 6,919,803 | B2 | 7/2005 | Breed |
| 7,009,517 | B2 | 3/2006 | Wood |
| 8,095,070 | B2 | 1/2012 | Twitchell, Jr. |
| 9,228,911 | B1 | 1/2016 | Meyers |
| 10,758,943 | B1 | 9/2020 | Carpenter |
| 10,902,240 | B2 * | 1/2021 | Adato ............ G06K 9/6231 |
| 2002/0089434 | A1 | 7/2002 | Ghazarian |
| 2003/0089771 | A1 | 3/2003 | Cybulski et al. |
| 2004/0066274 | A1 | 4/2004 | Bailey |
| 2004/0224640 | A1 | 11/2004 | Baccelli et al. |
| 2006/0055552 | A1 | 3/2006 | Chung et al. |
| 2006/0187033 | A1 | 8/2006 | Hall et al. |
| 2007/0085677 | A1 | 4/2007 | Neff et al. |
| 2007/0095905 | A1 | 5/2007 | Kadaba |
| 2007/0164858 | A1 | 7/2007 | Webb, Sr. |
| 2007/0164863 | A1 | 7/2007 | Himberger et al. |
| 2009/0322510 | A1 | 12/2009 | Berger et al. |
| 2010/0210322 | A1 | 8/2010 | Kim et al. |
| 2011/0127325 | A1 | 6/2011 | Hussey et al. |
| 2012/0075343 | A1 | 3/2012 | Chen et al. |
| 2013/0002443 | A1 | 1/2013 | Breed et al. |
| 2013/0146122 | A1 | 6/2013 | Chung |
| 2013/0211976 | A1 | 8/2013 | Breed |
| 2014/0062699 | A1 | 3/2014 | Heine et al. |
| 2014/0250745 | A1 | 9/2014 | Foltz |
| 2015/0227245 | A1 | 8/2015 | Inagaki et al. |
| 2015/0310773 | A1 | 10/2015 | Cho et al. |
| 2015/0312653 | A1 | 10/2015 | Avrahami et al. |
| 2015/0366518 | A1 | 12/2015 | Sampson |
| 2017/0078950 | A1 | 3/2017 | Hillary et al. |
| 2018/0012472 | A1 | 1/2018 | Purcell |
| 2018/0165568 | A1 | 6/2018 | Khoche |
| 2018/0374039 | A1 | 12/2018 | Walden et al. |
| 2019/0012936 | A1 | 1/2019 | Yazdi et al. |
| 2019/0236531 | A1 * | 8/2019 | Adato ............ G06F 16/288 |
| 2020/0104790 | A1 | 4/2020 | Chung |
| 2020/0223066 | A1 | 7/2020 | Diankov et al. |
| 2020/0285726 | A1 | 9/2020 | Kalous |
| 2020/0405223 | A1 | 12/2020 | Mai et al. |

FOREIGN PATENT DOCUMENTS

| | | |
|---|---|---|
| WO | WO 2014153418 A1 | 9/2014 |
| WO | WO 2018053309 | 3/2018 |
| WO | WO 2021/086248 A1 | 5/2021 |

OTHER PUBLICATIONS

Sandhez et al., Machine Learning on Difference Image Analysis: A Comparison of Methods for Transient Detection, arXiv:1812.10518v2 [astro-ph.IM] Aug. 8, 2019, 17 pages.
PCT Application No. PCT/US2021/063120, International Search Report and Written Opinion, dated Mar. 2, 2022, 13 pages.
PCT Application No. PCT/US2020/014521 International Preliminary Report on Patentability, dated Jul. 27, 2021, 6 pages.
U.S. Appl. No. 16/776,804, Non-Final Office Action dated Jul. 15, 2021, 9 pages.
U.S. Appl. No. 16/517,508, Non-Final Office Action dated Jan. 7, 2021, 10 pages.
U.S. Appl. No. 16/517,508, Non-Final Office Action dated May 6, 2020, 35 pages.
International Patent Application No. PCT/US2021/034112, International Search Report and Written Opinion dated Oct. 22, 2021, 14 pages.
Nisarga et al. "System-Level Tamper Protection Using MSP MCUs." Texas Instruments, Aug. 2016, 13 pages.
International Patent Application No. PCT/US2021/053028, International Search Report and Written Opinion dated Jan. 12, 2022, 11 pages.
International Patent Application No. PCT/US2022/013729 International Search Report and Written Opinion dated Jun. 6, 2022, 11 pages.
International Patent Application No. PCT/US2022/015161 International Search Report and Written Opinion dated Jul. 1, 2022, 15 pages.
U.S. Appl. No. 17/330,353 Non-Final Office Action dated Jul. 28, 2022, 19 pages.
International Patent Application No. PCT/US2022/47338 International Search Report and Written Opinion dated Apr. 7, 2023, 15 pages.

* cited by examiner

SYSTEM AND METHOD OF INTELLIGENT NODE DETECTING EVENTS FOR BORDER PROTECTION AND SECURITY

RELATED APPLICATIONS

This application is a Continuation-in-part of U.S. patent application Ser. No. 17/330,353, titled "DETECTING TAMPERING IN ASSETS AND AUTHENTICATING AUTHORIZED USERS", filed May 25, 2021, which claims priority to U.S. Provisional Application 63/029,675, titled "TAMPER DETECTING DISPOSABLE CONVERT TAPE", filed May 25, 2020, and claims priority to U.S. Provisional Application Ser. No. 63/124,791, titled "FLEXIBLE SOLAR POWERED WIRELESS COMMUNICATION DEVICE", filed Dec. 12, 2020, and claims priority to U.S. Provisional Application Ser. No. 63/196,150, titled "COMPUTER VISION AND AUGMENTED REALITY FOR TAMPER DETECTION", filed Jun. 2, 2021, and claims priority to U.S. Provisional Application Ser. No. 63/085,992, titled "DETECTING TAMPERING IN ASSETS AND AUTHENTICATING AUTHORIZED USERS", filed Sep. 30, 2020, and incorporated herein by reference.

BACKGROUND

Detection of tampering or any type of events in sensitive assets is valuable for multiple applications, including security applications, logistics, and industrial applications. While security devices may be used to detect tampering, in environments that include a large number of assets, it is often difficult for an inspector to quickly locate a location or nature of tampering. In some cases, an incident of tampering may have a subtle effect on the affected assets and may be difficult to detect for a human visually or manually inspecting an environment that may have been exposed to tampering.

SUMMARY

A method, comprising detecting, by a wireless tracking system, a tampering event associated with an asset within an asset container; capturing, by the wireless tracking system, a first digital representation of the field of view including the asset container; determining, based on the wireless tracking system comparing the first representation to a second digital representation of the field of view including the asset container stored in memory, a difference between the first and second digital representations; and displaying, by the wireless tracking system, within a graphical user interface of a client device, the difference between the first and second digital representations, wherein displaying the difference comprises displaying an augmented reality overlay to emphasizes the difference.

A wireless tracking system, comprising a first client device operable to capture a first digital representation of a field of view including an asset container; a network comprising: a first intelligent node attached to an asset within the asset container, the first intelligent node operable to detect a tampering event of the asset; and a second intelligent node operable to receive an indication of a tampering event from the first intelligent node, the second intelligent node communicatively coupled to the client device, and includes a wireless communication interface with longer range capabilities of a wireless communication interface of the first intelligent node; and a second client device communicatively coupled to the second intelligent node, and operable to receive the indication of the tampering event from the second intelligent node, the second client device further operable to capture a second digital representation of the field of view including an asset container.

A method, comprising analyzing, by a wireless tracking system, sensor data associated with an event proximate to an asset, collected by at least one intelligent node of a wireless tracking system associated with the asset; determining, based on the wireless tracking system analyzing the sensor data, whether an event threshold has been satisfied; responsive to determining the event threshold is satisfied, blacklisting the at least one intelligent node from passing through a checkpoint; and updating, by the wireless tracking system, records within the wireless tracking system associated with the at least one intelligent node to include the blacklisting.

A method, comprising analyzing, by a wireless tracking system, sensor data associated with an event proximate to an asset, collected by at least one intelligent node of a wireless tracking system associated with the asset within an asset container; determining, based on the wireless tracking system analyzing the sensor data, whether an event threshold has been satisfied; and responsive to determining the event threshold is satisfied, fast-tracking the asset container through a checkpoint.

DETAILED DESCRIPTION OF THE EMBODIMENTS

Figure 1:
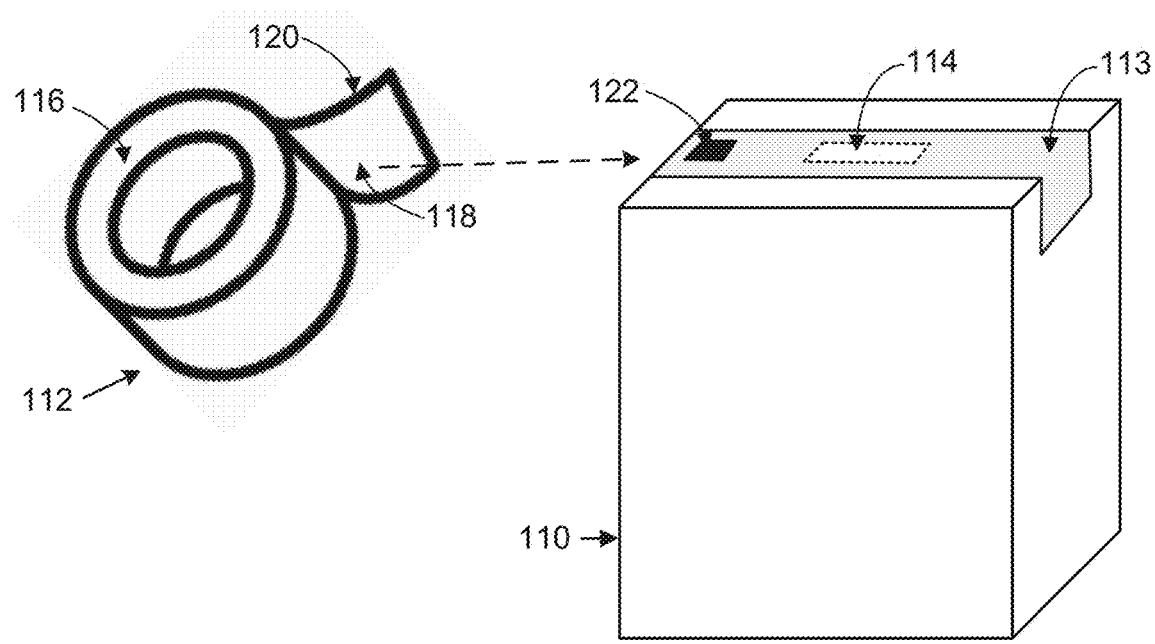
FIG. 1 is a diagrammatic view of a segment of an example adhesive tape platform dispensed from a roll used to detect tampering of an asset, according to embodiments.

Disclosed herein is a method and system thereof for using computer vision for efficiently detecting a location of tampering. The system analyzes a "before" image of an asset container taken before a potential tampering event and compares it to an "after" image of the asset container after a potential tampering event is detected. The potential tampering event is detected by a tamper-detecting wireless TOT tracking device associated with a container for assets or an asset itself, in some embodiments. The system identifies locations in the image where potential tampering may have occurred and notify a user to inspect the identified location. Also disclosed is a graphical user interface for guiding users to the location using augmented reality. The augmented reality interface guides users by providing overlays that indicate portions of a video feed or an image corresponding to the identified locations of potential tampering.

The system may further blacklist or fast-track certain shipments/assets based on a tampering event. For example, as the shipment enters a point of ingress (e.g., a checkpoint, border crossing, port, airport, etc.) the system may transmit information associated with any tampering events to an authority using the wireless sensing system (e.g., a client device). The system or the authority, or both, may determine whether an asset may be fast-tracked (avoiding a routine inspection, expedited processing, simplified or reduced inspection, or some other type of expediting through a security or processing checkpoint) and proceed through the point of ingress with minimal or no delay or inspection. Or the system and/or authority may determine that a shipment should not be fast-tracked and shipment/assets should be inspected. In this case, a particular asset (e.g., an asset that had a tampering event or that has been damaged) may be blacklisted. The blacklisting event may be recorded in the system, along with identifying information of the tape node. At a later time at the same point of ingress, or another point of ingress using the wireless sensing system, the blacklisted asset and/or tape node may be denied entry.

The system may further include long-range scanning of a shipment, via a gateway at the ship, for communicating information about asset containers and any tampering events on the ship, along with other information, such as a shipping manifest, etc. For example, upon the ship transiting a geofence threshold, and within communication range capabilities of the gateway and the scanning system, the gateway may transmit the information to the system for expedited passage through a point of ingress.

The present embodiments are not limited to shipping and border patrol applications. For example, although in some embodiments, a certain mode of transportation, such as a ship or a truck is used for ease of explanation, the embodiments are not limited to a ship or truck, but include all modes of transportation, such as airplanes, trains, cars, boats, etc. Likewise, although the modes of transportation are discussed within the context of a port or checkpoint, such as a border crossing, any point of ingress is within the scope of this application, such as airports, shipping centers, manufacturing facilities, etc. Further, through the application, a point of ingress may be used interchangeably with checkpoint, border checkpoint, shipping port, etc.

In some embodiments, the wireless TOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In some contexts, the term "agent" may refer to a "node", and an "agent" or "node" may be adhesively applied to a surface and denoted as a "tape node" or "tape agent". These terms may be used interchangeably, depending on the context. Further, the "agent," or "node" may have two forms of hierarchy: one depending on the functionality of the "agent" or "node," such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, positioning, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. Examples of such applications include event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

FIG. 1 shows an example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
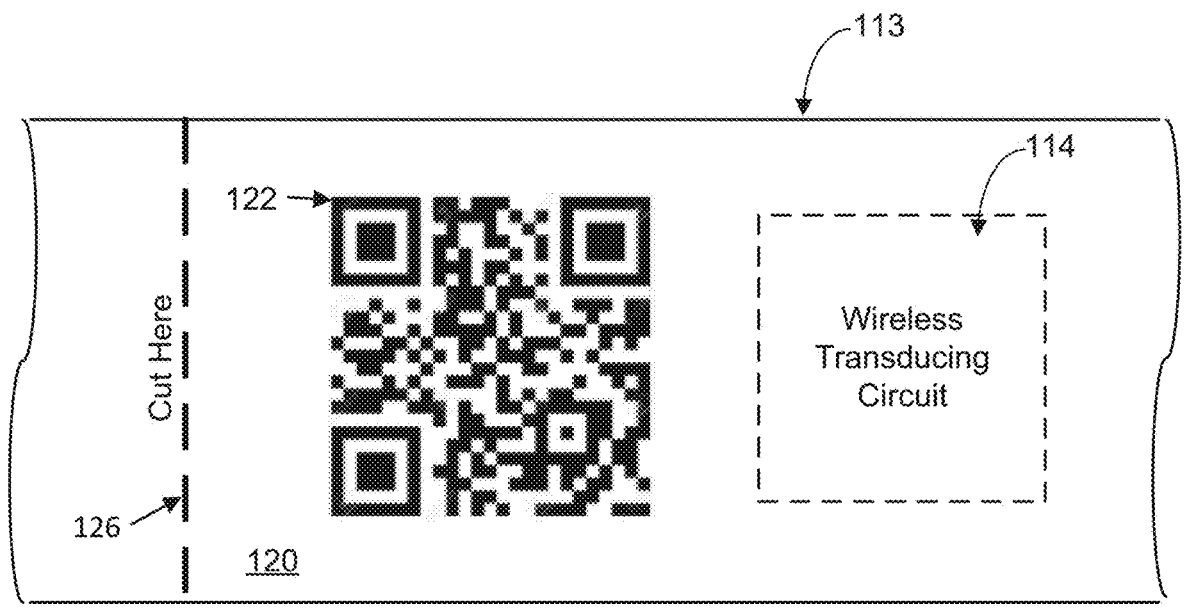
FIG. 2 is a diagrammatic top view of a portion of the segment of the example adhesive tape platform shown in FIG. 1, according to embodiments.

FIG. 2 shows the non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example in FIG. 2, the segment 113 of the adhesive tape agent platform 112 includes an identifier 122 (e.g., a two-dimensional bar code, such as a QR Code), written instructions 124 (e.g., "Cut Here"), and an associated cut line 126 that indicates where the user should cut the adhesive tape agent platform 112. The written instructions 124 and the cut line 126 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 126 may demarcate the boundaries between adjacent segments at locations that are free of any active components of the wireless transducing circuit 114. The spacing between the wireless transducing circuit 114 and the cut lines 126 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 126. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 126).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
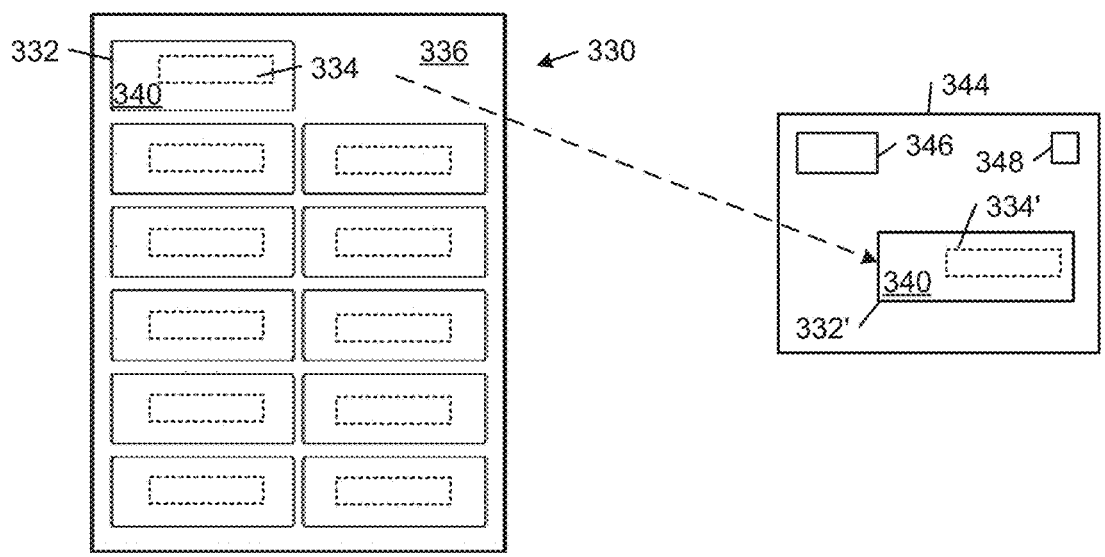
FIG. 3 is a diagrammatic view of an example of an envelope carrying a segment of an example adhesive tape platform dispensed from a backing sheet, according to embodiments.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 344 also includes a return address 346 and, optionally, a postage stamp or mark 348.

In some examples, segments of the adhesive tape platform 112 are deployed by a human operator. The human operator may be equipped with a mobile phone or other device that allows the operator to authenticate and initialize the adhesive tape platform 112. In addition, the operator can take a picture of a parcel including the adhesive tape platform and any barcodes associated with the parcel and, thereby, create a persistent record that links the adhesive tape platform 12 to the parcel. In addition, the human operator typically will send the picture to a network service and/or transmit the picture to the adhesive tape platform 112 for storage in a memory component of the adhesive tape platform 112.

In some examples, the wireless transducing circuit components 34 that are embedded in a segment 332 of the adhesive tape platform 112 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
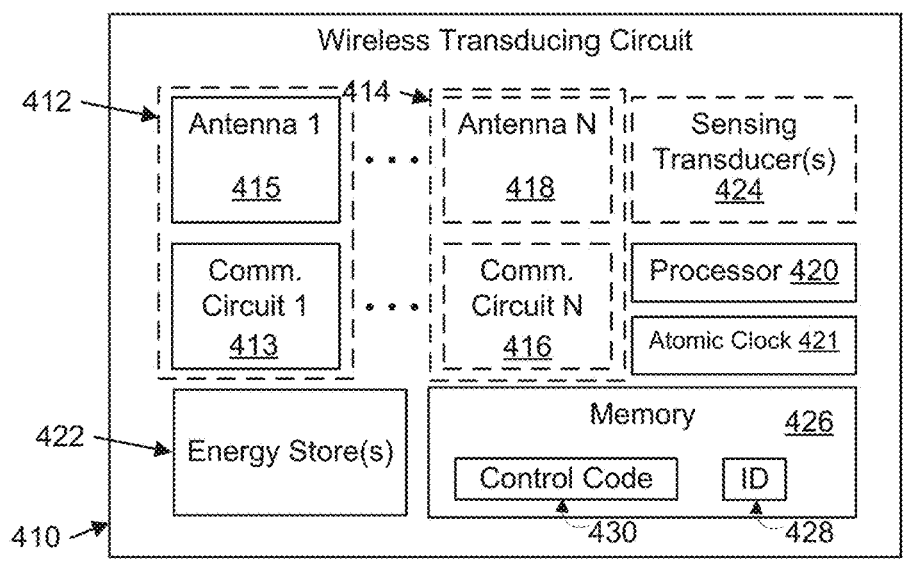
FIG. 4 is a schematic view of an example segment of an adhesive tape platform, according to embodiments.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Figure 6A:
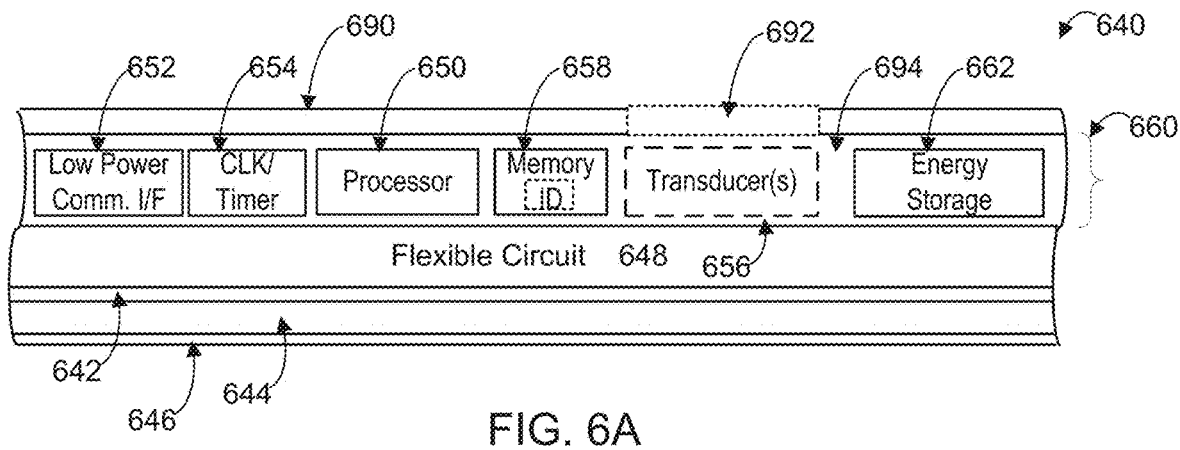
FIGS. 6A-C show diagrammatic cross-sectional side views of portions of different respective adhesive tape platforms, according to embodiments.
Figure 6B:
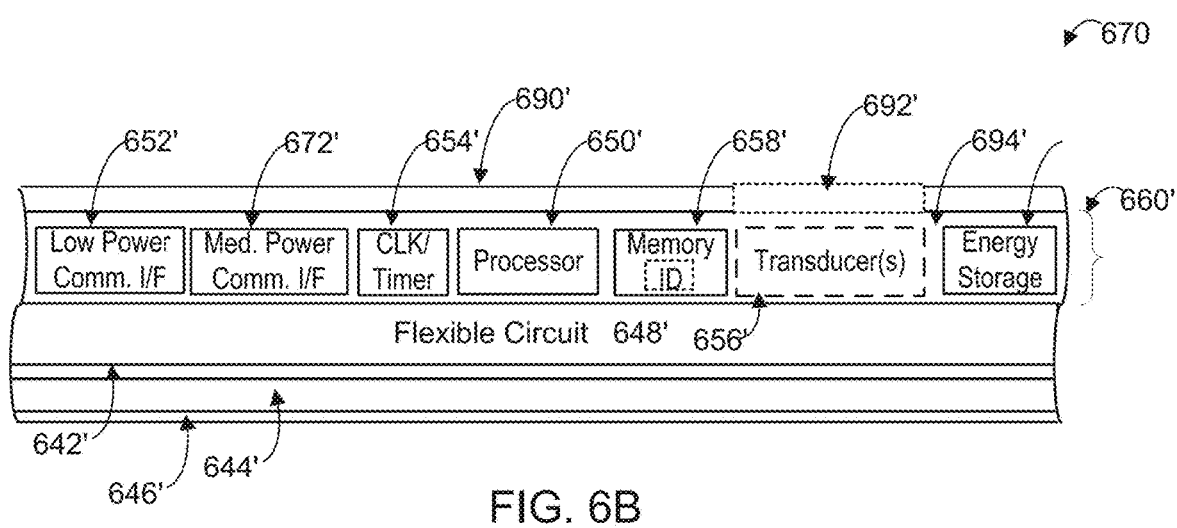
Figure 6C:
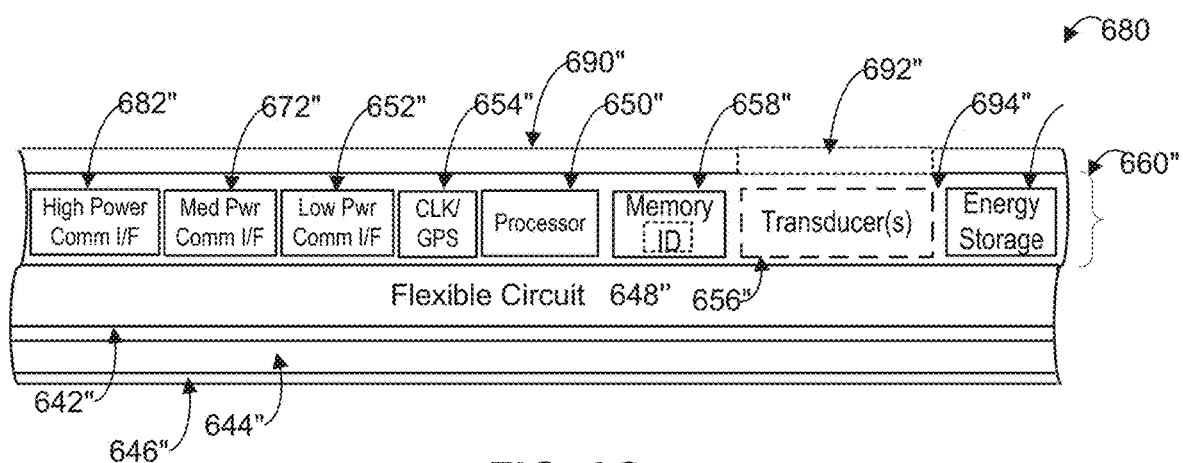

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 6A-C. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
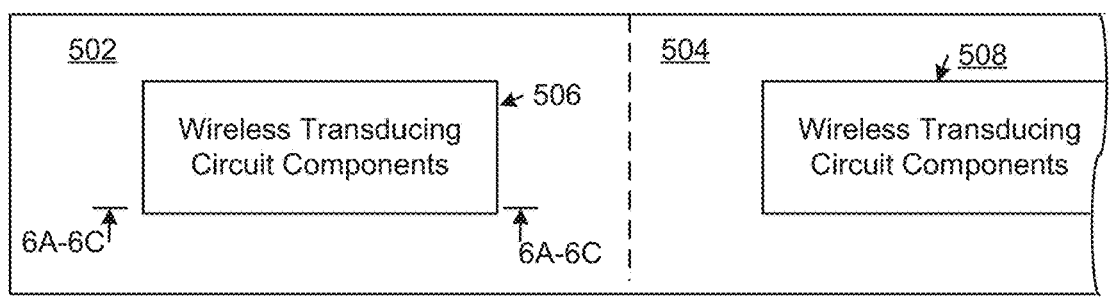
FIG. 5 is a diagrammatic top view of a length of an example adhesive tape platform, according to embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 7A:
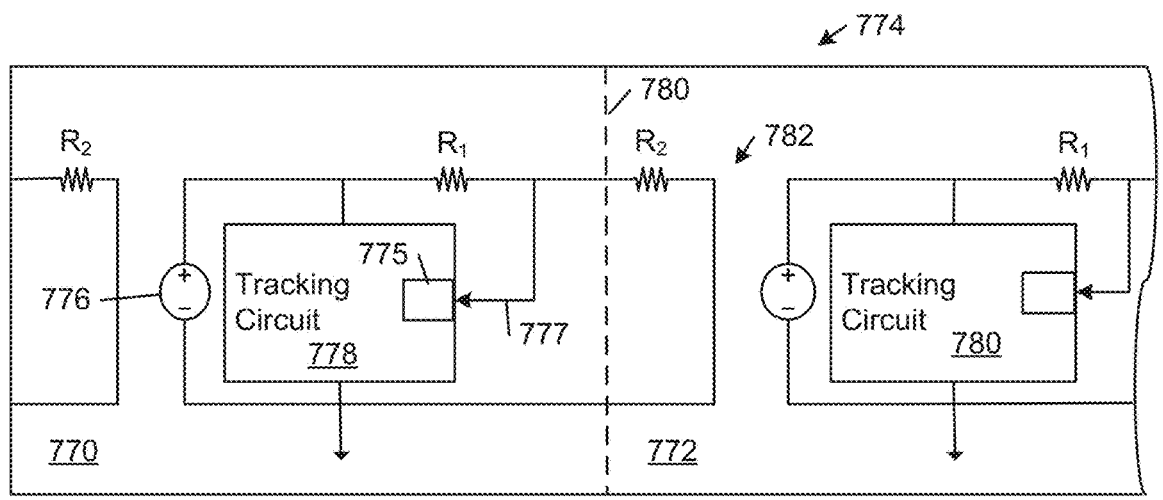
FIGS. 7A-C are diagrammatic top views of a length of an example tracking adhesive tape product, according to embodiments.
Figure 7B:
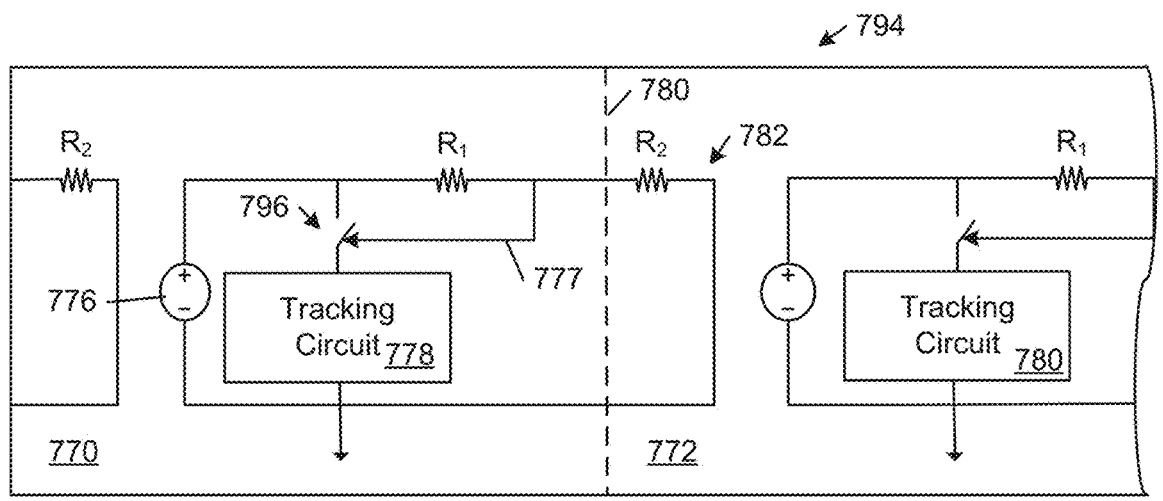
Figure 7C:
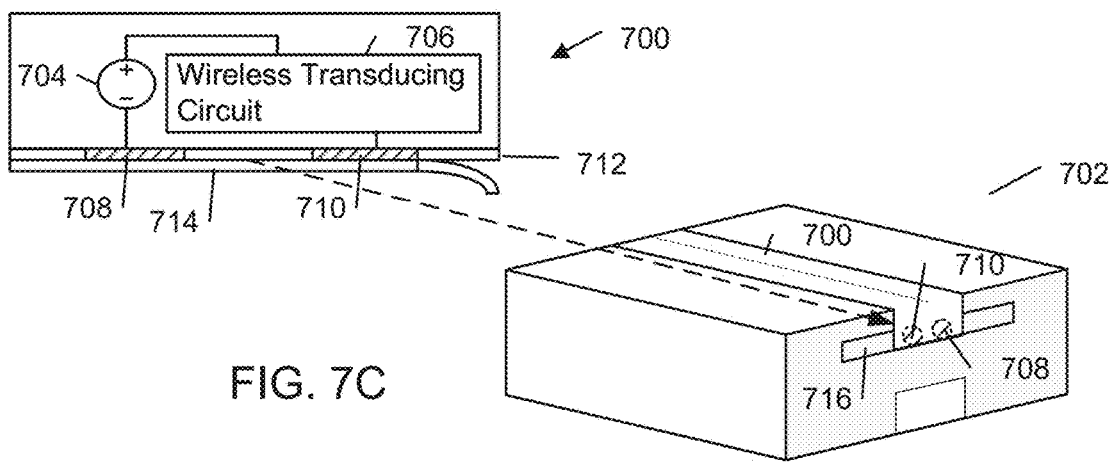

An example method of fabricating the adhesive tape platform 500 according to a roll-to-roll fabrication process is described in connection with FIGS. 6A-6C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A shows a cross-sectional side view of a portion of an example segment 640 of a flexible adhesive tape agent platform (e.g., platform 502 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 502 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648". The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Depending on the target application, the wireless transducing circuits 410 are distributed across the flexible adhesive tape platform 500 according to a specified sampling density, which is the number of wireless transducing circuits 410 for a given unit size (e.g., length or area) of the flexible adhesive tape platform 500. In some examples, a set of multiple flexible adhesive tape platforms 500 are provided that include different respective sampling densities in order to seal different asset sizes with a desired number of wireless transducing circuits 410. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 410. In some example applications (e.g., shipping low value goods), only one wireless transducing circuit 410 is used per asset, whereas in other applications (e.g., shipping high value goods) multiple wireless transducing circuits 410 are used per asset. Thus, a flexible adhesive tape platform 500 with a lower sampling density of wireless transducing circuits 410 can be used for the former application, and a flexible adhesive tape platform 100 with a higher sampling density of wireless transducing circuits 410 can be used for the latter application. In some examples, the flexible adhesive tape platforms 500 are color-coded or otherwise marked to indicate the respective sampling densities with which the wireless transducing circuits 410 are distributed across the different types of adhesive tape platforms 500.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

FIG. 7C shows a diagrammatic cross-sectional front view of an example adhesive tape platform 700 and a perspective view of an example asset 702. Instead of activating the adhesive tape platform 700 in response to separating a segment of the adhesive tape platform 700 from a roll or a sheet of the adhesive tape platform, this example is configured to supply power from the energy source 702 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

An example network communications environment 800 (herein used interchangeably with "network 800" and "wireless tracking system 800") includes a plurality of wireless nodes configured to detect tampering in assets (or other forms of events, such as temperature differentials, humidity differentials, acceleration differentials, etc.). Tampering may include, but is not limited to, opening assets such as boxes, containers, storage, or doors (e.g., of an asset container 864), moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the network 800. The network 800 is configured to provide a notification or alert to a user (e.g., authenticated user 1220) of the network 800. In some embodiments, a wireless node may directly transmit the notification or alert to the user (e.g., to a client device, such as the mobile gateway 810 of a user 1220). In other embodiments, a wireless node may include a display that indicates whether or not a tampering event has occurred (e.g., the display may be an indicator light or LED).

Alerts may be transmitted to the server/cloud, other wireless nodes, a client device, or some combination thereof, as discussed below. For example, in an embodiment, a wireless node of the network 800 captures sensor data, detects a tampering event, and transmits an alarm to a user of the wireless sensing system (e.g., without communicating with a server or cloud of the wireless sensing system). In another embodiment, a wireless node of the network 800 captures sensor data and transmits the sensor data to a gateway, parent node (e.g., black tape), or client device. The gateway, parent node, or client device detects a tampering event based on the received sensor data and transmits an alarm to a user of the network 800. In another embodiment, the wireless node of the network 800 captures sensor data, detects a tampering event, and transmits information describing the tampering event to a server or cloud of the network 800, in the form of a list with tampering events at specific times, along with which tape node or containers were tampered with, as shown in table 1502, discussed in FIG. 15. The server or cloud of the wireless sensing system transmits an alarm to a user of the wireless sensing system.

Figure 8:
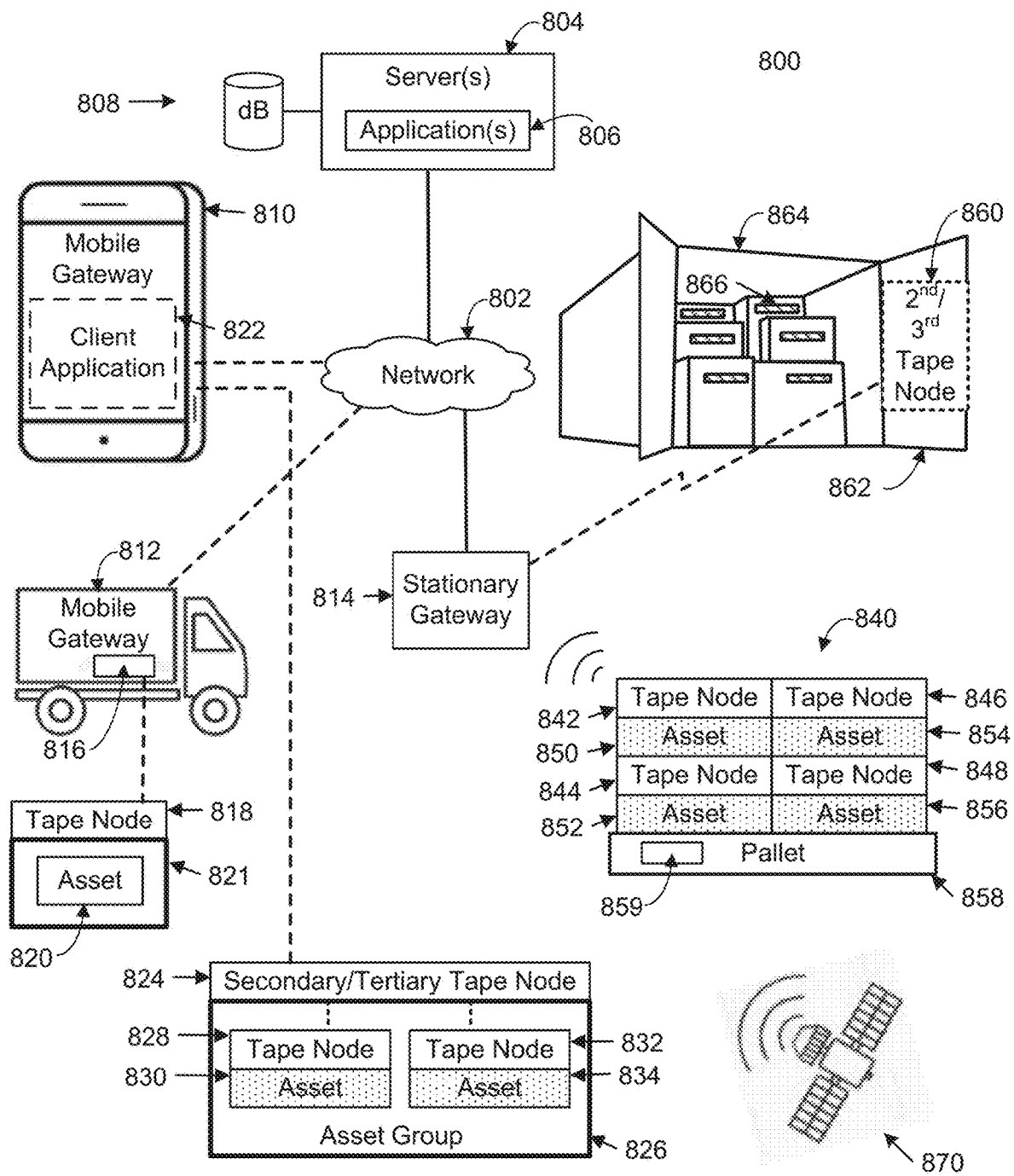
FIG. 8 is a diagrammatic view of an example of a network environment supporting communications with segments of an adhesive tape platform, according to embodiments.

FIG. 8 shows an example network communications environment 800 (herein used interchangeably with "network 800") that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-6; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and Zig-Bee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 418 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes (e.g., the master agent 842-848, 859, secondary agent 824, 860, or tertiary agent 824, 860 shown in FIG. 8), where each tape node class has a different respective set of functionalities and/or capacities, as described above with respect to the "agents" in FIGS. 1-6. For example, the master agents 842-848, 859 (with reference to FIG. 6A have a lower-power wireless communication interface (e.g., the low-power wireless-communication interface 652, with reference to FIG. 6A), in comparison to the secondary and tertiary agents 824, 860 (with reference to FIG. 6B,C).

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes. The server 804 further maintains a database of tape node identifiers (e.g., hardware identifiers, such as MAC address, a network identifier, and/or software-based identifier) associated with various assets. The database may further include other information on the asset including barcode identifiers (e.g., the identifiers 122) associated with the asset, description of the asset, weight of the asset, size of the asset etc. The database includes information on whether the associated asset has been fast tracked or blacklisted in the past. The database may further include historical information on where and when the tape nodes and associated assets have previously been scanned (e.g., at a checkpoint, as discussed below with reference to FIGS. 14-23). The database information may also include security information corresponding to the tape node and the asset. For example, the tape node may store security credentials that prove the authenticity of the tape node. The security credentials may be stored on the database for cross-referencing and authentication.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In some embodiments, the client application 822 is accessible to authorized users and the authorize users may have varying levels of access to data stored in the network 800. For example, an employee (e.g., border patrol agent) at a checkpoint may have more access than a non-employee user, who may be granted a temporary access for a limited purpose of tracking a particular asset during the voyage, with a final destination to the non-employee user. This limited access for the non-employee user may be to ensure a safe chain-of-custody from end-to-end, without tampering, and it may be applicable to any type of asset.

In some embodiments, the client application 822 is installed on a mobile device (e.g., smartphone) that is not a mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G) or Wi-Fi. Further, the client application 822 may cause the mobile device to automatically search for tape nodes and receive pings (e.g., alerts to nearby tampering events) from the tape nodes. The tape node may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

In one embodiment, each of the master tape nodes 842-748 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 408 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of an asset container 864, and is further configured to communicate with the network service 808 over the network 802. In the illustrated example, the asset container 864 contains a number of parcels labeled or sealed by respective master tape nodes 866 and containing respective assets. The secondary or tertiary tape node 860 communicates with each of the master tape nodes 866 within the asset container 864 and communicates with the stationary gateway 814. In some examples, each of the master tape nodes 866 includes a low-power wireless communications-interface (e.g., the low-power wireless-communication interface 652, with reference to FIG. 6A), and the secondary or tertiary tape node 860 includes a low-power wireless-communications interface (low-power wireless-communication interfaces 652', 652", with reference to FIGS. 6B-6C) for communicating with the master tape nodes 866 contained within the asset container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the asset container 864 are closed, the secondary or tertiary tape node 860 is operable to communicate wirelessly with the master tape nodes 866 contained within the asset container 864. In some embodiments, both a secondary and a tertiary node are attached to the asset container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the asset container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-6). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segment 670 typically adheres to objects (e.g., a parcel 826 and an asset container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9:
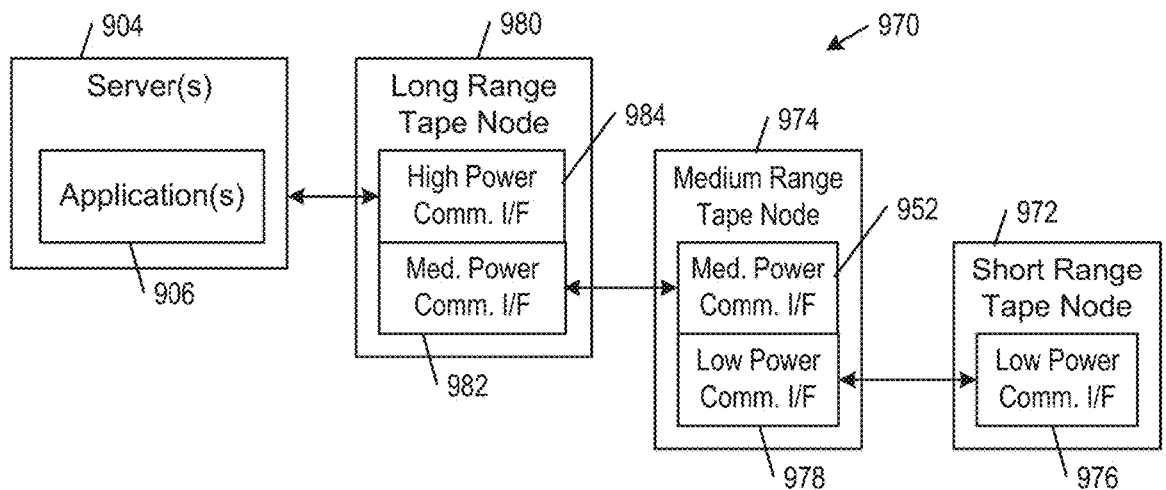
FIG. 9 is a diagrammatic view of a hierarchical communications network including an adhesive tape platform, according to embodiments.

FIG. 9 shows an example hierarchical wireless communications network of tape nodes 970. In this example, the short-range tape node 972 and the medium range tape node 974 communicate with one another over their respective low power wireless communication interfaces 976, 978. The medium range tape node 974 and the long-range tape node 980 communicate with one another over their respective medium power wireless communication interfaces 978, 982. The long-range tape node 980 and the one or more network service servers 904 communicate with one another over the high-power communication interface 984. In some examples, the low power communication interfaces 976, 978 establish wireless communications with one another in accordance with the Bluetooth LE protocol, the medium power communication interfaces 986, 982 establish wireless communications with one another in accordance with the LoRa communications protocol, and the high-power communication interface 984 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 of the network service 908 designates a tape node at a higher level in a hierarchical communications network as a master node of a designated set of tape nodes at a lower level in the hierarchical communications network. For example, the designated master tape node may be adhered to a parcel (e.g., a box, pallet, or asset container) that contains one or more tape nodes that are adhered to one or more packages containing respective assets. In order to conserve power, the tape nodes typically communicate according to a schedule promulgated by the one or more network service servers 904 of the network service 908. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the network 800). In other examples, the master tape node processes the information contained in the received data packets and transmits the processed information to the one or more network service servers 904.

Figure 10:
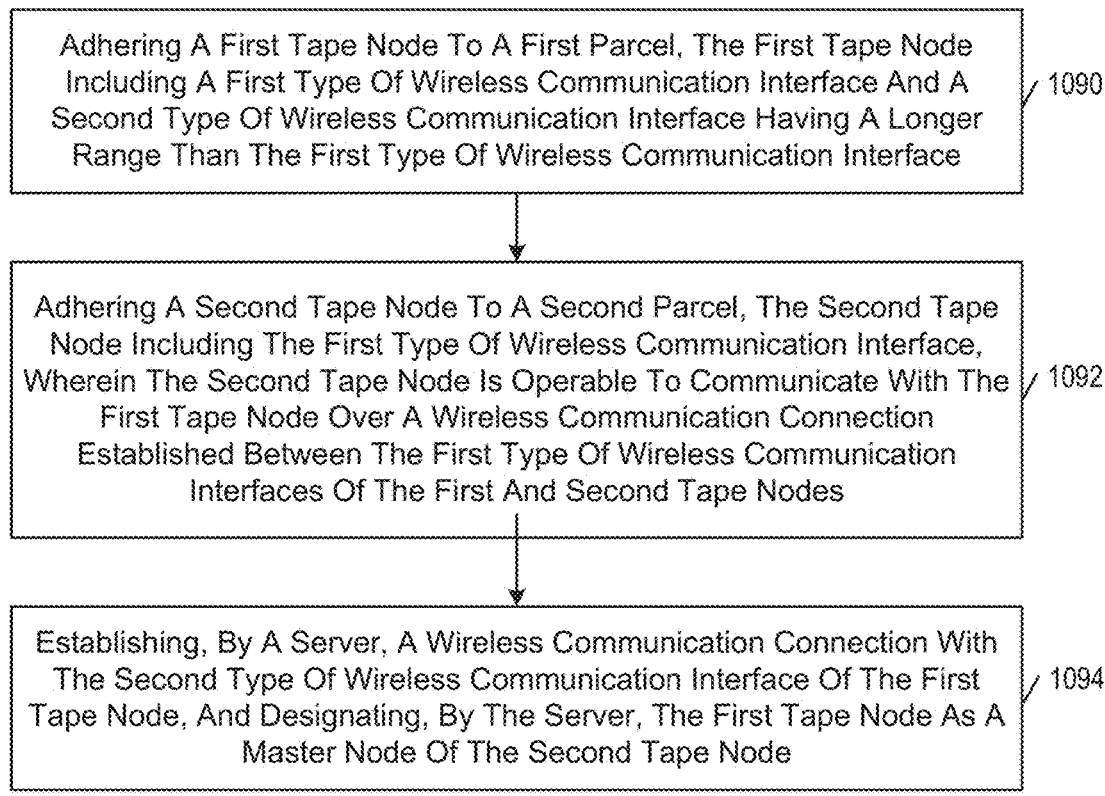
FIG. 10 is a flow diagram of a method of creating the hierarchical communications network, according to embodiments.

FIG. 10 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 10, block 1090). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 10, block 1092). An application executing on a computer system (e.g., the one or more network service servers 904 of a network service 906) establishes a wireless communication connection with the second type of wireless communication interface of the first tape node, and the application transmits programmatic code executable by the first tape node to function as a master tape node with respect to the second tape node (FIG. 10, block 1094).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs). In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces).

A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server. Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 11A:
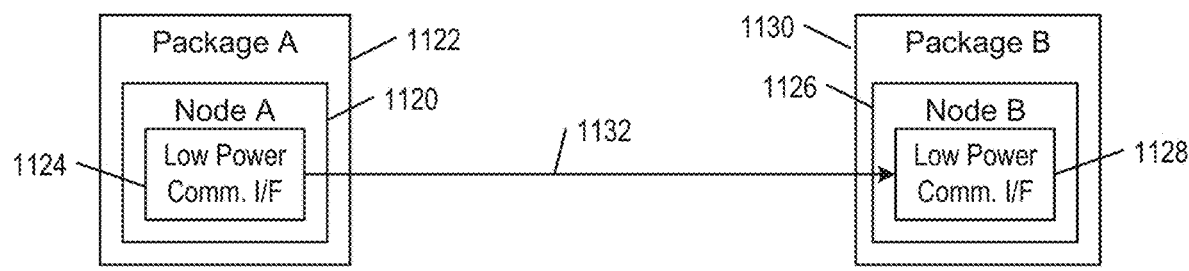
FIGS. 11A-E are diagrammatic views showing example use cases for a distributed agent operating system, according to embodiments.

Referring to FIG. 11A, a node 1120 (Node A) is associated with a package 1122 (Package A). In some embodiments, the node 1120 may be implemented as a tape node that is used to seal the package 1122 or it may be implemented as a label node that is used to label the package 1122; alternatively, the node 1120 may be implemented as a non-tape node that is inserted within the package 1122 or embedded in or otherwise attached to the interior or exterior of the package 1122. In the illustrated embodiment, the node 1120 includes a low power communications interface 1124 (e.g., a Bluetooth Low Energy communications interface). Another node 1126 (Node B), which is associated with another package 1130 (Package B), is similarly equipped with a compatible low power communications interface 1128 (e.g., a Bluetooth Low Energy communications interface).

In an example scenario, in accordance with the programmatic code stored in its memory, node 1126 (Node B) requires a connection to node 1120 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1120 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1132 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 11B:
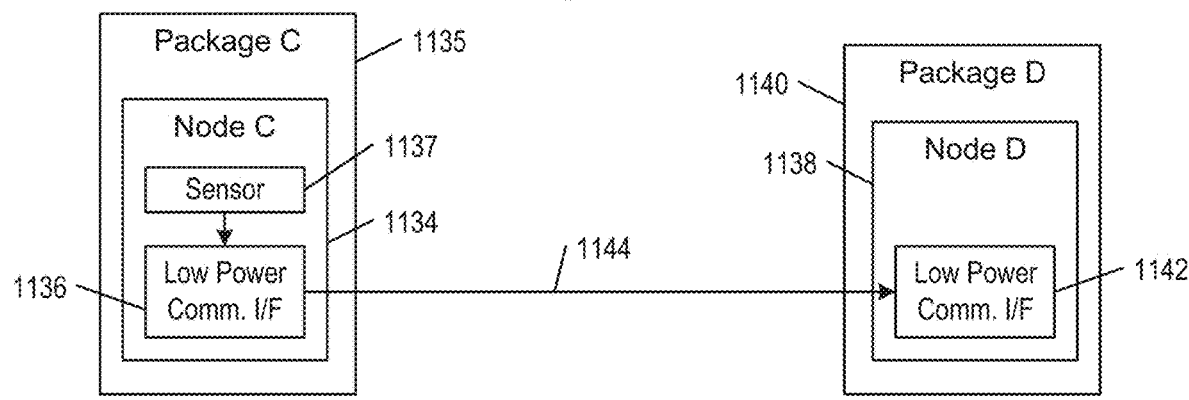

Referring to FIG. 11B, a node 1134 (Node C) is associated with a package 1135 (Package C). In the illustrated embodiment, the Node C includes a low power communications interface 1136 (e.g., a Bluetooth Low Energy communications interface), and a sensor 1137 (e.g., a temperature sensor). Another node 1138 (Node D), which is associated with another package 1140 (Package D), is similarly equipped with a compatible low power communications interface 1142 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D.

In this process, Node C and Node D determine each other's identities, capabilities, and services. For example, after successfully establishing a communication path 1144 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 11C:
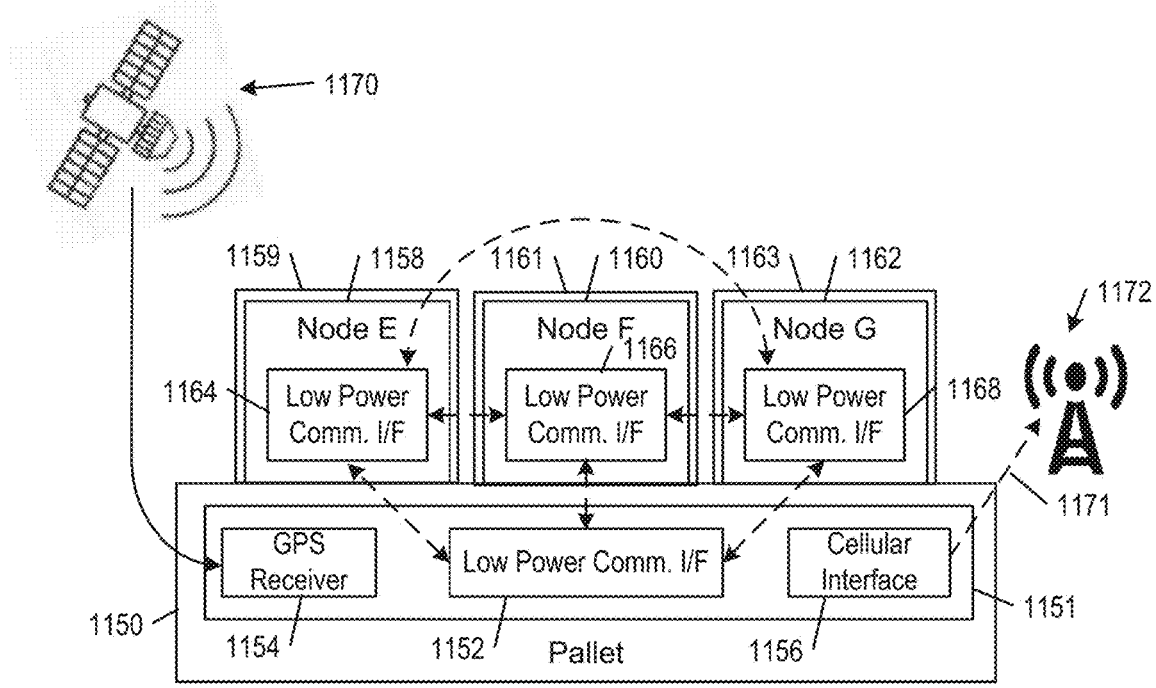

Referring to FIG. 11C, a pallet 1150 is associated with a master node 1151 that includes a low-power communications interface 1152, a GPS receiver 1154, and a cellular communications interface 1156. In some embodiments, the master node 1151 may be implemented as a tape node or a label node that is adhered to the pallet 1150. In other embodiments, the master node 1151 may be implemented as a non-tape node that is inserted within the body of the pallet 1150 or embedded in or otherwise attached to the interior or exterior of the pallet 1150.

The pallet 1150 provides a structure for grouping and containing packages 1159, 1161, 1163 each of which is associated with a respective peripheral node 1158, 1160, 1162 (Node E, Node F, and Node G). Each of the peripheral nodes 1158, 1160, 1162 includes a respective low power communications interface 1164, 1166, 1168 (e.g., Bluetooth Low Energy communications interface). In the illustrated embodiment, each of the nodes E, F, G, and the master node 1151 are connected to each of the other nodes over a respective low power communications path (shown by dashed lines).

In some embodiments, the packages 1159, 1161, 1163 are grouped together because they are related. For example, the packages 1159, 1161, 1163 may share the same shipping itinerary or a portion thereof. In an example scenario, the master pallet node 1151 scans for advertising packets that are broadcasted from the peripheral nodes 1158, 1160, 1162. In some examples, the peripheral nodes broadcast advertising packets during respective scheduled broadcast intervals. The master node 1151 can determine the presence of the packages 1159, 1161, 1163 in the vicinity of the pallet 1150 based on receipt of one or more advertising packets from each of the nodes E, F, and G. In some embodiments, in response to receipt of advertising packets broadcasted by the peripheral nodes 1158, 1160, 1162, the master node 1151 transmits respective requests to the server to associate the master node 1151 and the respective peripheral nodes 1158, 1160, 1162. In some examples, the master tape node requests authorization from the server to associate the master tape node and the peripheral tape nodes. If the corresponding packages 1159, 1161, 1163 are intended to be grouped together (e.g., they share the same itinerary or certain segments of the same itinerary), the server authorizes the master node 1151 to associate the peripheral nodes 1158, 1160, 1162 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1151 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1158, 1160, 1162 include environmental sensors for obtaining information regarding environmental conditions in the vicinity of the associated packages 1159, 1161, 1163. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1151 can determine its own location based on geolocation data transmitted by a satellite-based radio navigation system 1170 (e.g., GPS, GLONASS, and NAVSTAR) and received by the GPS receiver 1154 component of the master node 1151. In an alternative embodiment, the location of the master pallet node 1151 can be determined using cellular based navigation techniques that use mobile communication technologies (e.g., GSM, GPRS, CDMA, etc.) to implement one or more cell-based localization techniques. After the master node 1151 has ascertained its location, the distance of each of the packages 1159, 1161, 1163 from the master node 1151 can be estimated based on the average signal strength of the advertising packets that the master node 1151 receives from the respective peripheral node. The master node 1151 can then transmit its own location and the locations of the package nodes E, F, and G to a server over a cellular interface connection with a cellular network 1172. Other methods of determining the distance of each of the packages 1159, 1161, 1163 from the master node 1151, such as Received Signal-Strength Index (RSSI) based indoor localization techniques, also may be used.

In some embodiments, after determining its own location and the locations of the peripheral nodes, the master node 1151 reports the location data and the collected and optionally processed (e.g., by the peripheral nodes peripheral nodes 1158, 1160, 1162 or the master node 1151) sensor data to a server over a cellular communication path 1171 on a cellular network 1172.

In some examples, nodes are able to autonomously detect logistics execution errors if packages that are supposed to travel together no longer travel together and raise an alert. For example, a node (e.g., the master node 1151 or one of the peripheral nodes 1158, 1160, 1162) alerts the server when the node determines that a particular package 1159 is being or has already been improperly separated from the group of packages. The node may determine that there has been an improper separation of the particular package 1159 in a variety of ways. For example, the associated peripheral node 1158 that is bound to the particular package 1159 may include an accelerometer that generates a signal in response to movement of the package from the pallet. In accordance with its intelligent agent program code, the associated peripheral node 1158 determines that the master node 1151 has not disassociated the particular package 1159 from the group and therefore broadcasts advertising packets to the master node, which causes the master node 1151 to monitor the average signal strength of the advertising packets and, if the master node 1151 determines that the signal strength is decreasing over time, the master node 1151 will issue an alert either locally (e.g., through a speaker component of the master node 1151) or to the server.

Figure 11D:
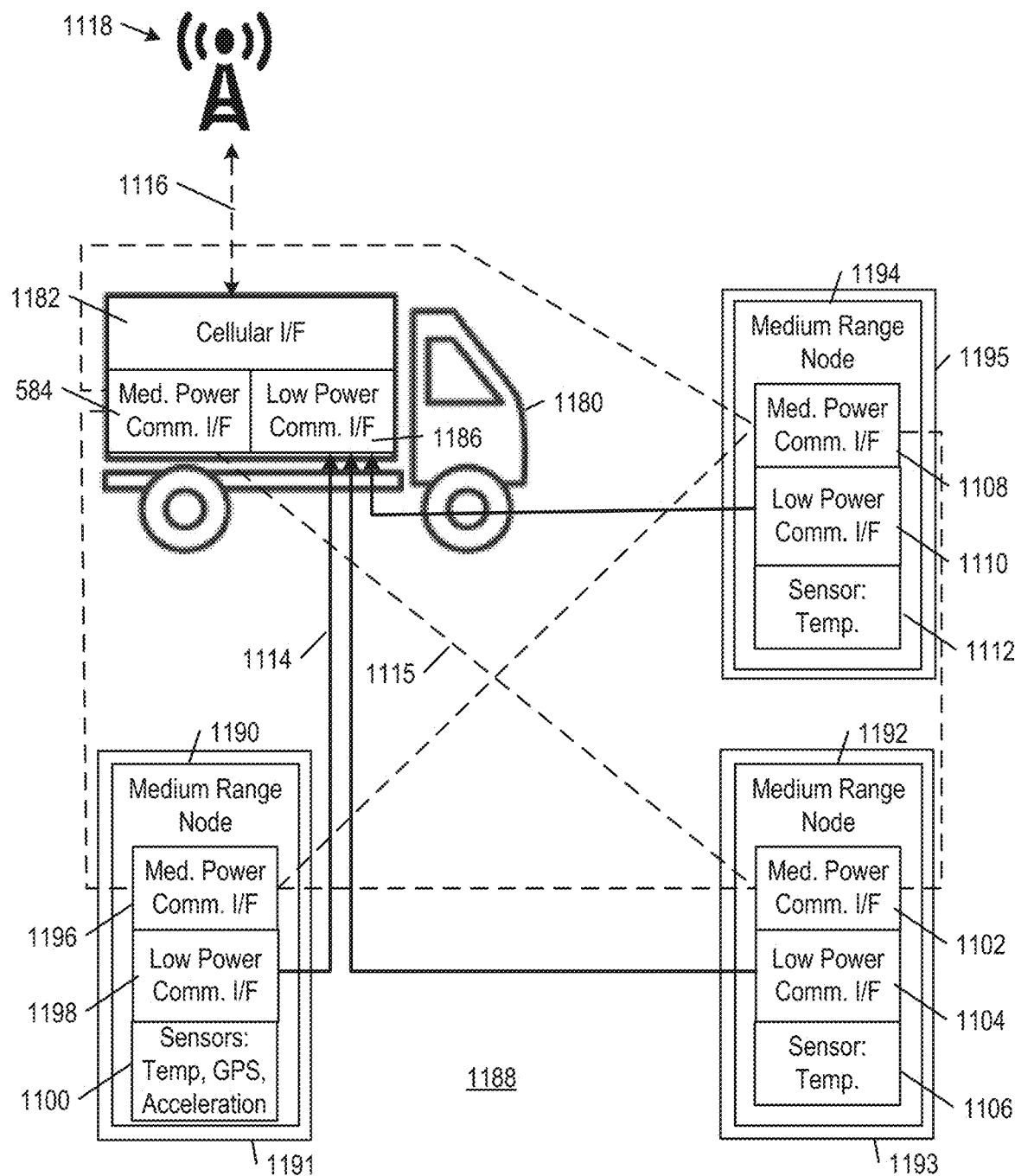

Referring to FIG. 11D, a truck 1180 is configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1094 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1117), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 11E:
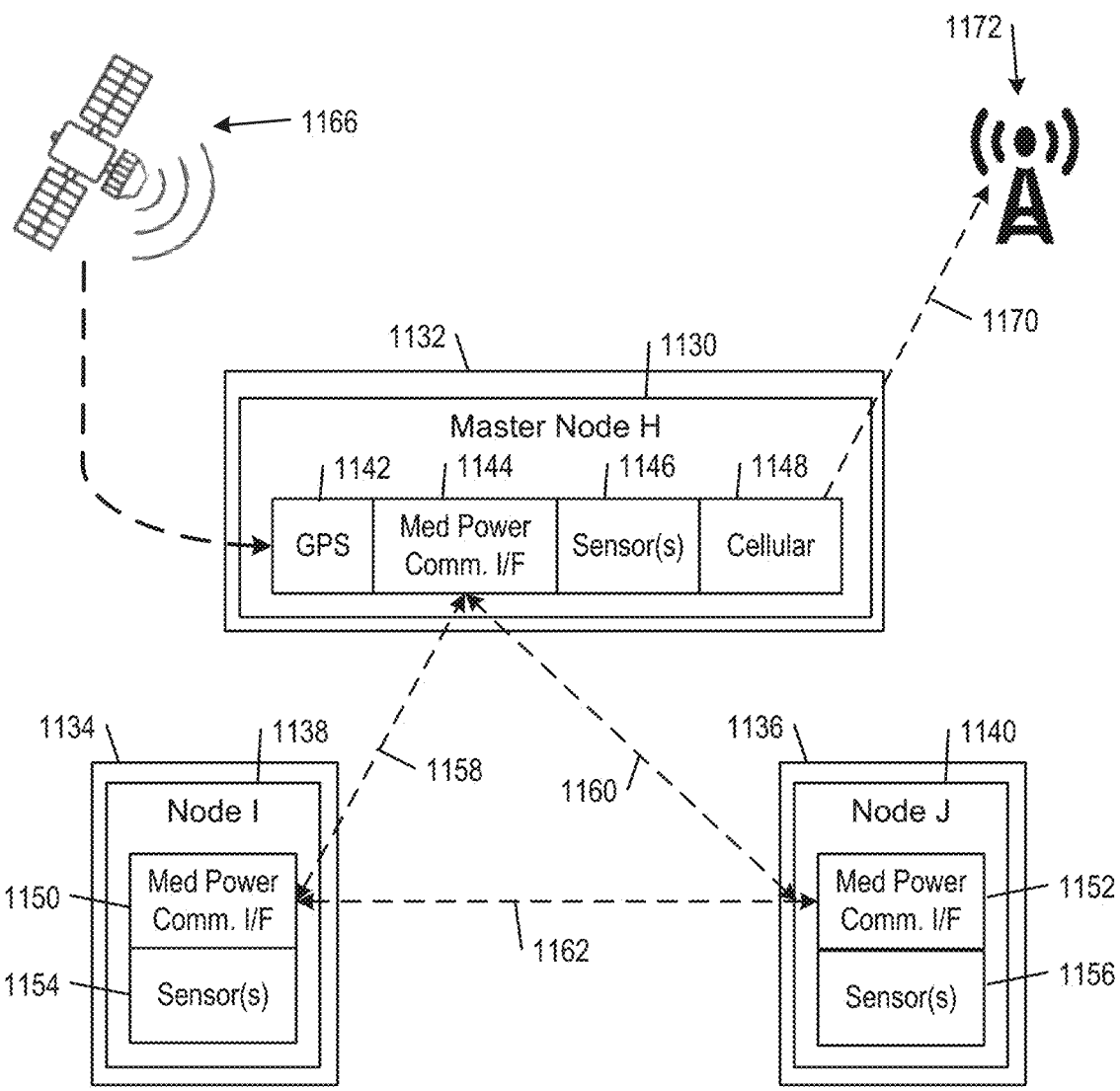

Referring to FIG. 11E, a master node 1130 is associated with a logistic item 1132 (e.g., a package) and grouped together with other logistic items 1134, 1136 (e.g., packages) that are associated with respective peripheral nodes 1138, 1140. The master node 1130 includes a GPS receiver 1142, a medium power communications interface 1144, one or more sensors 1146, and a cellular communications interface 1148. Each of the peripheral nodes 1138, 1140 includes a respective medium power communications interface 1150, 1152 and one or more respective sensors 1154, 1156. In the illustrated embodiment, the peripheral and master nodes are connected to one another other over respective pairwise communications paths (shown by dashed lines). In some embodiments, the nodes 1130, 1138, 1140 communicate through respective LoRa communications interfaces over LoRa formatted communications paths 1158, 1160, 1162.

In the illustrated embodiment, the master and peripheral nodes 1130, 1138, 1140 (e.g., any of the nodes included in network 800) include environmental sensors (used interchangeably with "sensors") for obtaining information regarding environmental conditions in the vicinity of the associated logistic items 1132, 1134, 1136. Examples of such environmental sensors include temperature sensors, humidity sensors, acceleration sensors, vibration sensors, shock sensors, pressure sensors, altitude sensors, light sensors, gyrometric sensors, optical sensors, acoustic sensors, strain sensors, electromagnetic field sensors, chemical sensors, capacitive sensors, altimeter sensors, piezoelectric sensors, radioactivity sensors, biosensors, magnetic sensors, and orientation sensors. The data collected by the sensors may include sensor data includes one or more of: vibration data, optical data, acoustic data, temperature data, orientation data, pressure data, altitude data, biometric data, humidity data, radioactivity data, and chemical data, etc.

In accordance with the programmatic code stored in its memory, the master node 1130 periodically broadcasts advertising packets in the surrounding area. When the peripheral nodes 1138, 1140 are within range of master node 1130, and are operating in a listening mode, the peripheral nodes 1138, 1140 will extract the address of master node 1130 and potentially other information (e.g., security information) from the advertising packets. If, according to their respective programmatic code, the peripheral nodes 1138, 1140 determine that they are authorized to connect to the master node 1130, the peripheral nodes 1138, 1140 will attempt to pair with the master node 1130. In this process, the peripheral nodes 1138, 1140 and the master node 1130 determine each other's identities, capabilities, and services. For example, after successfully establishing a respective communication path 1158, 1160 with each of the peripheral nodes 1138, 1140 (e.g., a LoRa formatted communication path), the master node 1130 determines certain information about the peripheral nodes 1138, 1140, such as their identity information (e.g., peripheral nodes), their capabilities (e.g., measuring temperature data), and their services include transmitting temperature data to other nodes.

After establishing LoRa formatted communications paths 1158, 1160 with the peripheral nodes 1138, 1140, the master node 1130 transmits requests for the peripheral nodes 1138, 1140 to transmit their measured and/or locally processed temperature data to the master node 1130.

In the illustrated embodiment, the master node 1130 can determine its own location based on geolocation data transmitted by a satellite-based radio navigation system 1166 (e.g., GPS, GLONASS, and NAVSTAR) and received by the GPS receiver 1142 component of the master node 1130. In an alternative embodiment, the location of the master node 1130 can be determined using cellular based navigation techniques that use mobile communication technologies (e.g., GSM, GPRS, CDMA, etc.) to implement one or more cell-based localization techniques. After the master node 1130 has ascertained its location, the distance of each of the logistic items 1134, 1136 from the master node 1130 can be estimated based on the average signal strength of the advertising packets that the master node 1130 receives from the respective peripheral node. The master node 1130 can then transmit its own location and the locations of the package nodes H, J, and I to a server over a cellular interface connection with a cellular network 1172. Other methods of determining the distance of each of the logistic items 1134, 1136 from the master node 1130, such as Received Signal-Strength Index (RSSI) based indoor localization techniques, also may be used.

In some embodiments, after determining its own location and the locations of the peripheral nodes, the master node 1130 reports the location data, the collected and optionally processed (e.g., either by the peripheral nodes peripheral nodes 1138, 1140 or the master node 1130) sensor data to a server over a cellular communication path 1170 on a cellular network 1172.

Figure 12A:
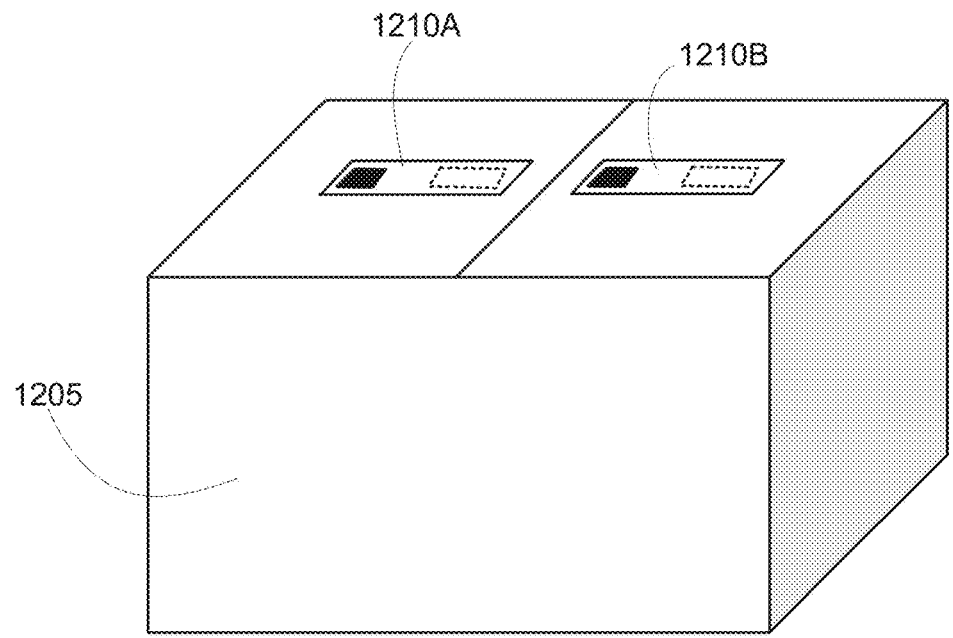
FIGS. 12A-D show example illustrations of tape nodes affixed to assets configured to detect tampering events, and the tape nodes authenticating a user, according to embodiments.

FIG. 12A illustrates an example embodiment wherein an asset 1205 is associated with two wireless nodes 1210A, B that detect each other by proximity, such that when a distance between the wireless nodes increases, an asset is considered to have been opened and a tampering event is recorded. For example, a first wireless node 1210A communicates with a second wireless node 1210B. The second wireless node 1210B determines a distance between the second wireless node and the first wireless node 1210A, e.g., based on signal strength of the received communication. Responsive to the distance being within a threshold (e.g., 6 in.), the second wireless node 1210B determines that the asset has not been opened and that a tampering event has not occurred. In embodiments, although wireless nodes 1210A, B are depicted in FIG. 12A, B as having adhesive platforms (e.g., tape nodes), alternate forms of wireless nodes, both with and without flexible form factors, are considered within the scope of embodiments herein.

In the example of FIG. 12A, the asset 1205 is a sealed box. In other examples, the asset 1205 may be another type of package, a door to a building, storage container, asset container (e.g., asset container 864 of FIG. 8), safe, or the like. In other examples, thresholds may be less than or greater than the example shown in FIG. 12A and may be configured by a user based on the asset type, dimension, or other associated factors.

Figure 12B:
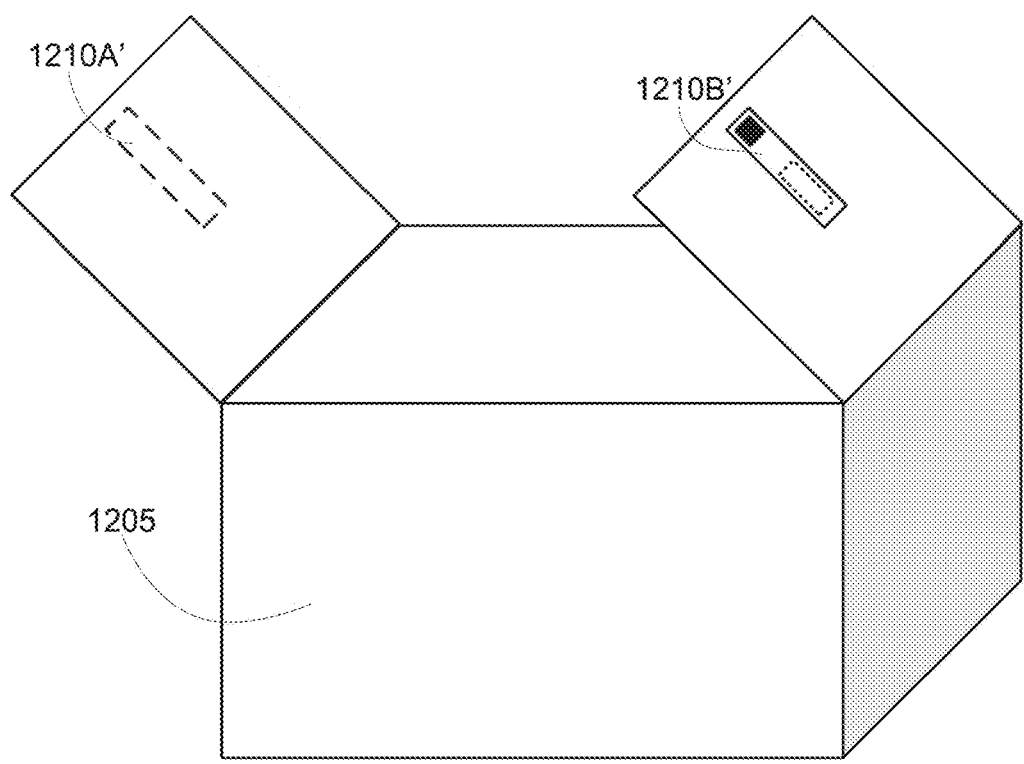
Figure 15:
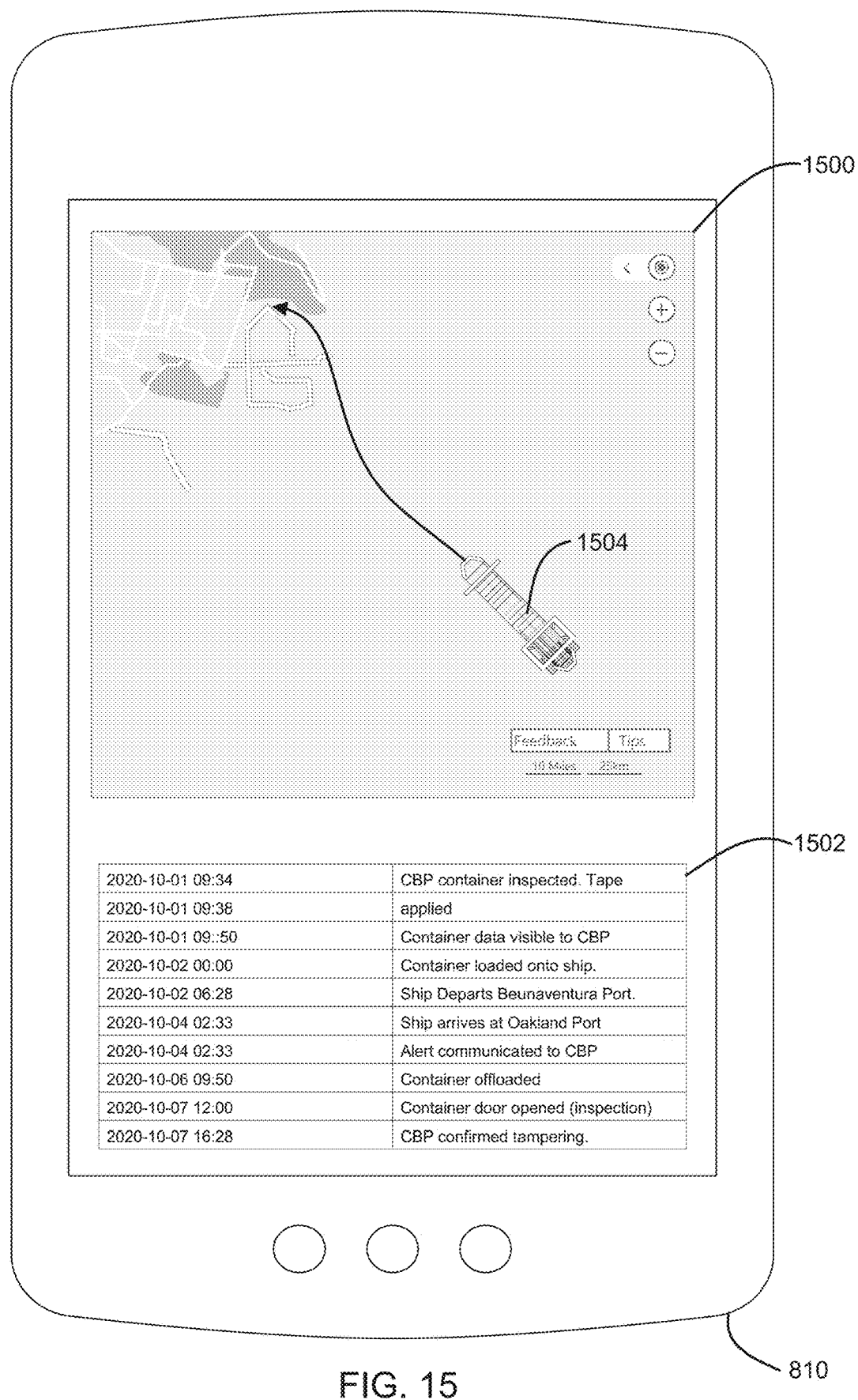
FIG. 15 is a diagram of a client device displaying a corresponding table showing events for an asset container on a ship during a journey detected by the wireless tracking system, according to embodiments.

FIG. 12B illustrates an example embodiment wherein an asset 1205 associated with two wireless nodes 1210A', B' experiences a tampering event. The first wireless node 1210A' communicates with the second wireless node 1210B'. The second wireless node 1210B' determines a distance between the second wireless node and the first wireless node 1210A'. Responsive to the distance exceeding a threshold, the second wireless node 1210B' determines that the asset has been opened and that a tampering event has occurred. In an embodiment, the second wireless node 1210B' communicates to a mobile device (e.g., a mobile gateway 810) of a user (e.g. authenticated user 1220) or to a gateway node that the tampering event has occurred to notify the user of the wireless sensing system. A notification of the tampering event may include an alarm, a location of the asset during the tampering event, and a time of the tampering event. In other embodiments, additional, fewer, or different information may be included in the notification. The notification may take the form of an event listed in a table (e.g., table 1502; FIG. 15).

In certain embodiments, wireless nodes 1210A, B comprise an orientation sensor and a tampering event is determined based on the 1205 asset being moved to or beyond a specified orientation or a range of orientations (e.g., turned upside down). The orientation of the asset 1205 may be determined by placing a wireless node (comprising an orientation sensor) on each of two or more different surfaces of the asset (e.g., opposite sides of the asset, if the asset has a shape corresponding to a polyhedron).

In certain embodiments, a wireless node comprises a vibration sensor and a tampering event is determined based on sensor signals corresponding to tampering actions such as drilling through a portion of the asset, cutting through a portion of the asset, damaging a portion of the asset, denting a portion of the asset, striking the portion of an asset with a tool (e.g., hammer or crowbar), opening a portion of the asset (e.g., a lid, door, or cap), shaking the asset, other movement, or some combination thereof. In other embodiments, a wireless node adhered to the inside of an asset comprises a light sensor and a tampering event is determined responsive to the optical sensor detecting light (e.g., an asset or asset container doors being opened and exposed to natural or artificial light). In other embodiments, a wireless node comprises an acoustic sensor and a tampering event is determined responsive to noise levels exceeding a threshold amount. In other embodiments, a wireless node is adhered across an opening of an asset (e.g., across a lid of a box, across a doorway) or applied to an asset in such a way that tampering with the asset requires tearing or cutting the wireless node (e.g., applied across or around the handle of a lever), and a tampering event is determined responsive to the wireless node being torn or broken. In certain embodiments, tearing the wireless node (e.g., wireless node 700) results in a circuit of the wireless node being altered (e.g., an open circuit state, short circuit state, other alteration of the circuit), and the tearing of the wireless node is detected based on the alteration of the circuit. In other embodiments, tearing of the wireless node may be detected based on a functionality of the wireless node changing (e.g., the wireless node no longer transmits a signal to the sensing system). In other embodiments, a wireless node is placed on the interior of or adhered to an internal surface of a metal asset (e.g., a trailer or truck; a metal container; machinery; across asset container doors (e.g., doors 862 of FIG. 8 or truck doors 1419, 1421), wherein connection between the wireless node within the metal asset and other nodes or gateways of the wireless tracking system 800 outside of the metal asset is restricted within the metal asset (e.g., due to electromagnetic shielding), and a tampering event is determined responsive to a connection being re-established between the wireless node within the metal asset and other nodes or gateways of the wireless sensing system, indicating that a portion of the metal asset has been opened. In certain embodiments, combinations of the above or other sensors may be used to identify tampering.

Waveforms or signatures of signals from sensors in a wireless node corresponding to an asset may correlate to specific tampering events. For example, drilling a hole in a portion of an asset has a corresponding waveform that is sensed by a vibration sensor on a wireless node adhered to the asset. A tampering event may be detected by determining that a signal from the vibration sensor has a waveform corresponding to the drilling waveform. Signals from the sensors used to detect tampering events may be input to a trained machine learning model which classifies events based on input signals. For example, a waveform of vibrations measured by a vibration sensor over time may be input to a trained machine learning model which outputs whether or not the waveform corresponds to an occurrence of a tampering event. For example, the trained machine leaning model may differentiate between the vibration from a truck engine and tampering of the asset. The machine learning model may be trained using sensor signals from one or more wireless nodes.

The wireless tracking system 800 includes a plurality of wireless nodes further configured to authenticate authorized users and/or safe zones (e.g., an authorized area, such as a checkpoint: shipping yard, port, border inspection, etc.). Authorized users 1220 are, for example, employees or individuals authorized to access, open, or otherwise handle assets containing sensitive or private information or materials. For example, in an airport, border patrol personnel may be designated as authorized individuals that may open and inspect assets. Safe zones are areas in which assets may be accessed, opened, or otherwise handled. For example, an airport may designate a security area as a safe zone (e.g., an authorized area) wherein assets may be opened and handled for inspection purposes.

Figure 12C:
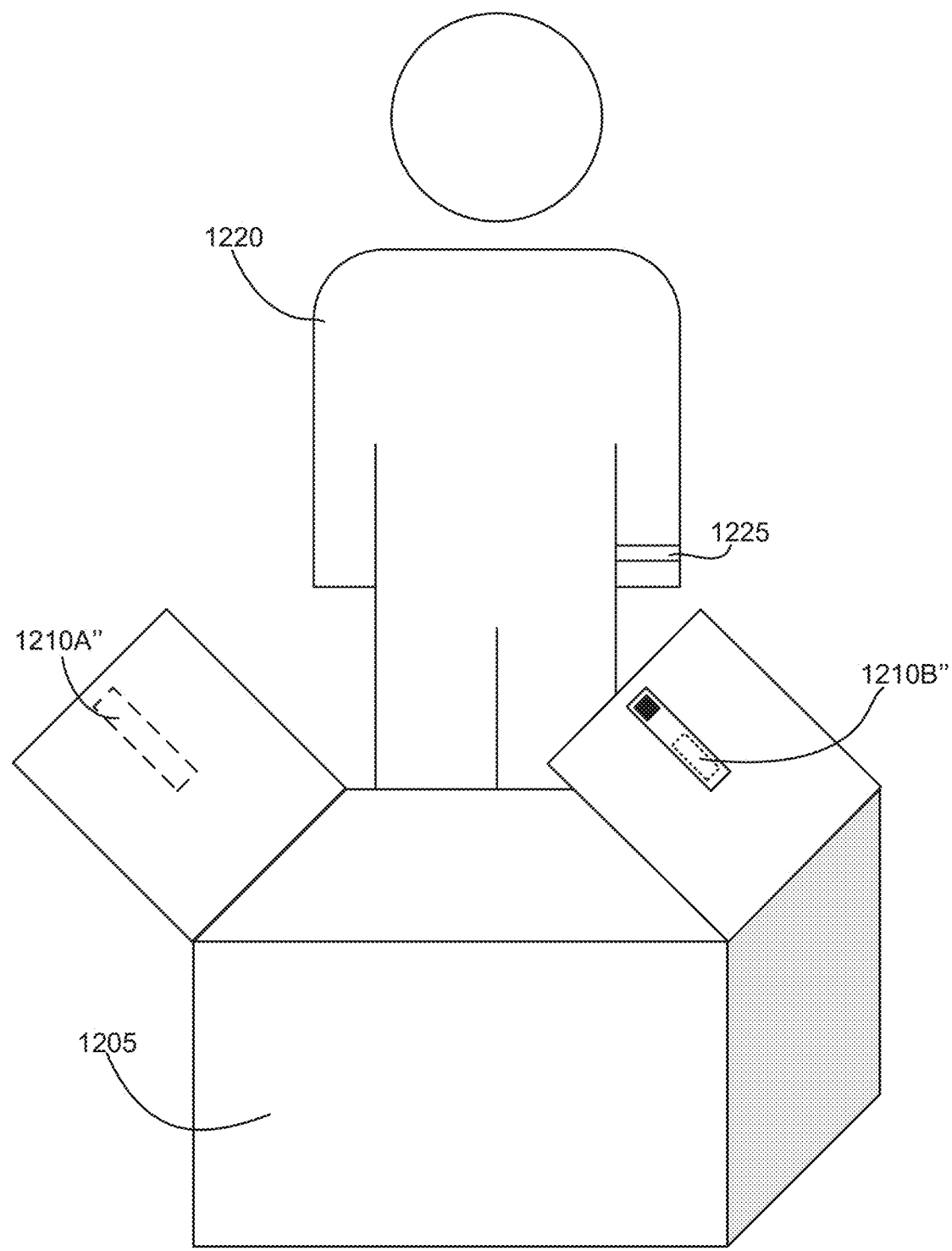

FIG. 12C illustrates an example embodiment wherein wireless nodes 1210A", B" associated with asset 1205 communicate with wireless nodes or devices 1225 associated with an authorized user 1220 to provide authentication. In the embodiment of FIG. 12C, a tampering event is detected by the wireless nodes 1210A" and 1210B" as discussed previously in conjunction with FIG. 12B. A wireless node 1210B" further receives a communication from a wireless node associated with an authorized user 1220 of the wireless sensing system or a device 1225 of the authorized user 1220 of the wireless sensing system. The device 1225 may be a client device (e.g., the mobile gateway 810, such as a smartphone, tablet, etc.), a wireless node of the wireless sensing system, a wearable device (e.g., a smartwatch), a badge (e.g., that includes an RFID chip, Bluetooth, or NFC), another device, or some combination thereof. In an embodiment, the communication includes an authorization key, identification of the user 1220, an encryption key, and/or another type of authorization information. Based on the received information indicating that the authorized user 1220 is authorized, the wireless node 1210B" determines that the event is not a tampering event (e.g., the event is an official inspection of the asset 1205) and that the event should not cause an alert and/or should not be reported. In some embodiments, the device 1225 instructs the wireless nodes 1210A" and 1210B" to disable tamper detection (e.g., that tampering may be "allowed") for a defined period (e.g., five or ten minutes) or for as long as the asset 1205 is within an authorized zone.

In certain embodiments, devices 1225 may include local gateways (e.g., stationary gateway 814 of FIG. 8) associated with safe zones or locations, wireless nodes associated with wearable or portable smart devices (e.g., smart phones or watches), or other electronic devices. In another embodiment, devices 1225 may include gateways (e.g., mobile gateway 812) or black tapes adhered to trucks, trailers, other vehicles, or other transport containers including assets having wireless nodes.

Figure 12D:
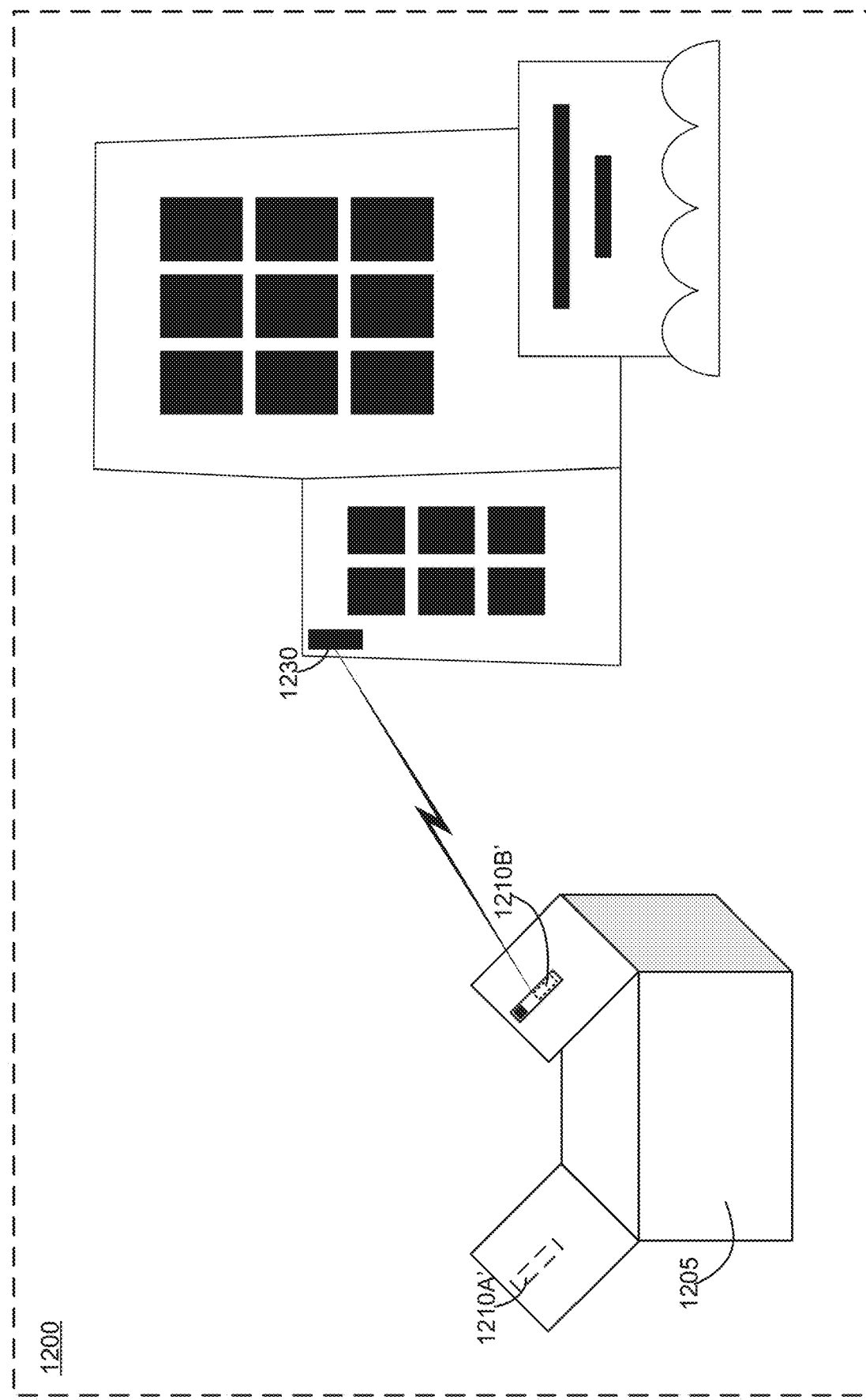

FIG. 12D illustrates one example scenario wherein wireless nodes 1210A', B' associated with asset 1205 communicate with a gateway node 1230 (e.g., stationary gateway 814) at a checkpoint (e.g., a port, border control checkpoint, security checkpoint, point of ingress, point of egress, etc.). The wireless nodes 1210A', B' have detected a tampering event in response to the distance between 1210A' and 1210B' exceeding a threshold distance. Within an area 1200 (e.g., before passing through and/or within the checkpoint) of a checkpoint, at least one stationary gateway 1230 and/or mobile gateways is stationed throughout the area 1200. For example, the stationary gateways 1230 may be plugged in to a power outlet to receive a permanent power source, e.g., within or adhered to buildings within the area 1200. The gateway 1230 communicates with the tape nodes 1210A', B' on the asset 1205 to determine whether tampering has occurred. In the case of tampering being detected locally by the tape nodes 1210A', B', the tape nodes 1210A', B' will ping any nearby devices (e.g., tapes nodes 818, 824, 828, 832, 842-848, 859, 860, 866, etc., other gateway devices 810, 812, 814, user client device 1225) to alert a nearby user (e.g., user 1220) or relay an update up to the server (e.g., server 804). The tape nodes 1210A', B' may request any nearby node to send an alert to any nearby user client devices and/or relay an alert up to the server. The request may include one or more identifiers (e.g., identifiers 122) for the tape node 1210A', B' on the asset 1205 or associated information for the asset 1205 itself. In some embodiments, the wireless tracking system 800 tracks and maintains information describing a line of custody, a history of authorized user interactions, a history of tampering events, and/or a history of movement and/or locations during transport. For example, a customer shipping an asset may be granted access to track or observe the line of custody for confidence that the asset is untampered, from warehouse (e.g., distillery, manufacturing plant, etc.) to destination. For example, the customer may be granted access (e.g., temporary) to the client application 822 to view a table 1502 and diagram 1500, as discussed below with reference to FIG. 15. In some embodiments, a portion of the information tracked and maintained by the wireless tracking system 800 regarding the history of an asset, as described above, is stored on the memory of a wireless node associated with and/or attached to the asset. In an embodiment, the wireless sensing system transmits information to transit locations or end destinations of an asset 1205 prior to arrival of the asset 1205 at the transit locations or end destinations to provide, for example, authorization to handle and inspect the asset or other information associated with the asset 1105. In some embodiments, the above information is included in a table (e.g., table 1502). The table 1502 or a portion of the table 1502 may be transmitted to a client device (e.g., mobile gateway 810), and the authorized user 1220 (e.g., border patrol, manufacturing employee, shipping employee, etc.) may use the client device to inspect activity associated with the asset to determine if a tampering event has occurred.

According to some embodiments, an authorized user 1220 (also referred to as a human operator, herein) of the wireless sensing system, using a client device (e.g., mobile gateway 810), may locate an asset 1205 that has an associated wireless node, where a tampering event associated with the asset has been detected by the associated wireless node. The wireless node may transmit a notification to the client device in response to the tape node detecting the tampering event. The location of the asset may be displayed to the user on a user interface of the client device (e.g., the asset with the tampering event may be indicated on a map, floor plan, a blueprint of a shipping yard where an asset container that included the asset that was tampered with is located, some other indicator of the asset's location, or some combination thereof). For example, the user may view the table 1502 (shipping manifest) and diagram 1500, as discussed below with reference to FIG. 15. In some embodiments, the client device indicates the proximity of the user to the asset based on a signal strength of a connection with the wireless node associated with the asset. This way, the user may physically locate the asset that has been tampered with and manually inspect it upon receiving a notification of the tampering event.

Figure 13:
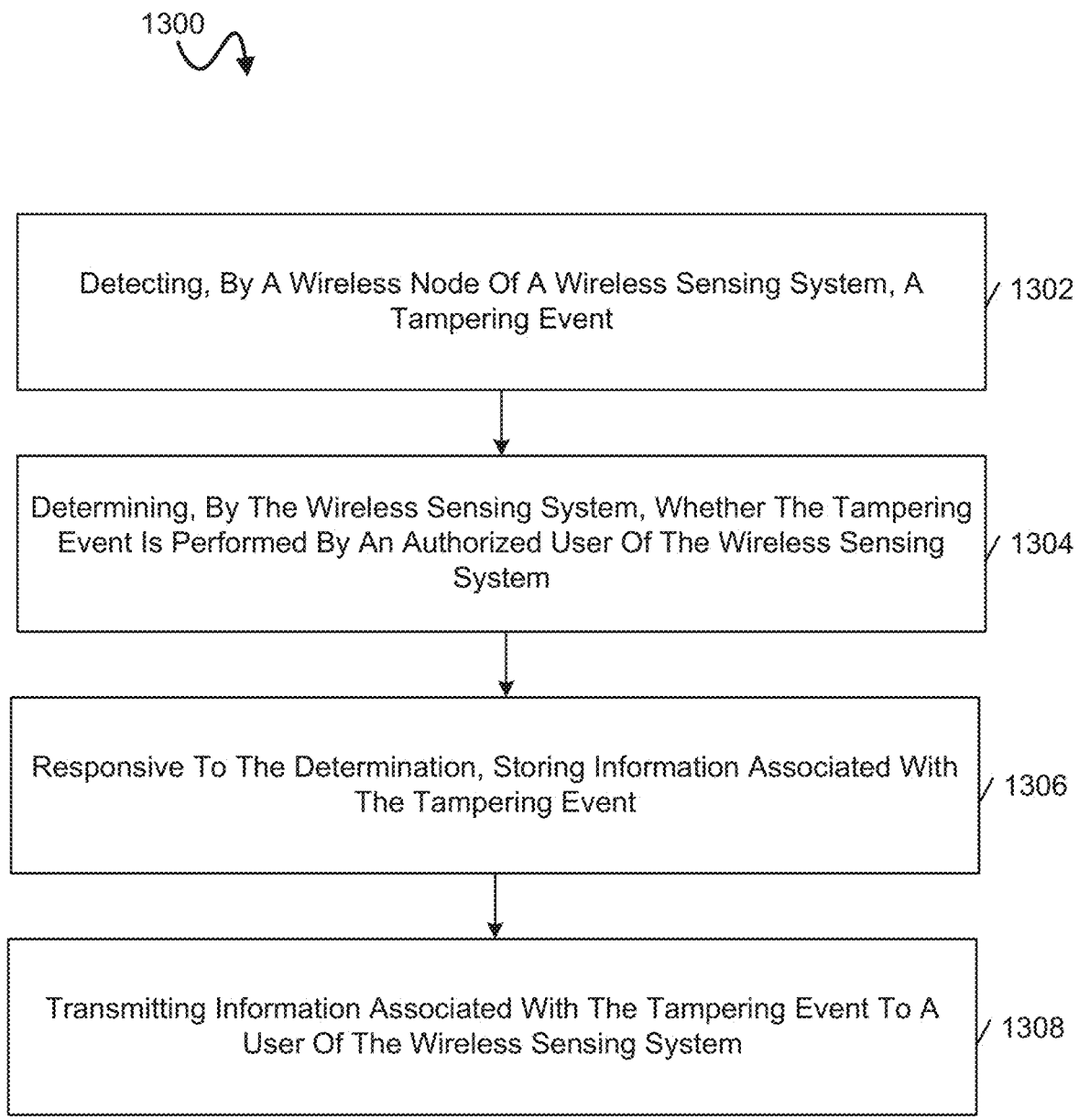
FIG. 13 is a flow diagram of one example method for detecting tampering by a segment of an adhesive tape platform, according to embodiments.

FIG. 13 is a flowchart illustrating one example method 1300 for detecting tampering of an asset (e.g., asset 1205). A wireless node (e.g., the wireless nodes 640, 670, 680, 810, 812, 814, 828, 830, 842-848, etc.) of the wireless tracking system 800 detects (1302) a tampering event, wherein the tampering event comprises accessing or handling an asset. For example, a tape node with a vibration sensor is attached to an asset and detects vibration (as discussed above) that indicates tampering; wireless nodes 1210A and 1210B detect a separation distance above a threshold (e.g., nodes 1210A, B were attached to opposing flaps of an asset 1205 or doors 862, 1419, 1421); a tape node with a light sensor detects light above a threshold; a secondary or tertiary tape node (e.g., tape node 860) attached to an inside wall of an asset container (e.g., asset container 864), with an embedded camera, detects movement within the asset container; etc.

The wireless tracking system 800 determines (1304) whether the tampering event is caused by an authorized user 1220. For example, when a tape node detects the device 1225 it determines that the tampering event is performed by an authorized user 1220 corresponding to the device 1225, as discussed above. In some embodiments, the tape nodes are preprogrammed to not generate alerts for detected tampering when within an authorized zone, as discussed above. For example, the authorized zone may include a shipping yard, a shipping facility (when many authorized users are handling the asset), within a country's borders (e.g., once the asset has crossed a border and is within a country; the tape node may reference collected tracking data to determine that it is within an authorized zone), etc. However, the tape nodes may log tampering events when within the authorized zone.

Responsive to the determination, the wireless tracking system 800 stores (1306) information associated with the tampering event. For example, the wireless sensing system may store the information within a database (e.g., database 808 of FIG. 8) and/or the tape node that detected the tampering event may store the information within its memory (e.g., memory 426, 658, 658', 658"). The wireless tracking system 800 transmits (1308) the information describing the tampering event. In an embodiment, responsive to determining that the tampering event is not performed by an authorized user, the wireless sensing system transmits a notification to an authorized user of the wireless sensing system to indicate that a tampering event has occurred. For example, the wireless tracking system 800 transmits the tampering alert to a client device (e.g., mobile gateway 810) of the wireless tracking system 800. In some embodiments, the client device is a tablet that displays a map (or other form of display, as discussed below) indicating where the tampering event occurred as well as any information associated with the tampering, as discussed below.

The method 1300 may include additional, fewer, or different steps, and the steps may be performed in a different order. In certain embodiments, steps of the method 1300 are performed by different components of the wireless sensing system. In one example, a wireless node of the wireless sensing system performs the detecting, the determining, the storing, and the transmitting.

Figure 14:
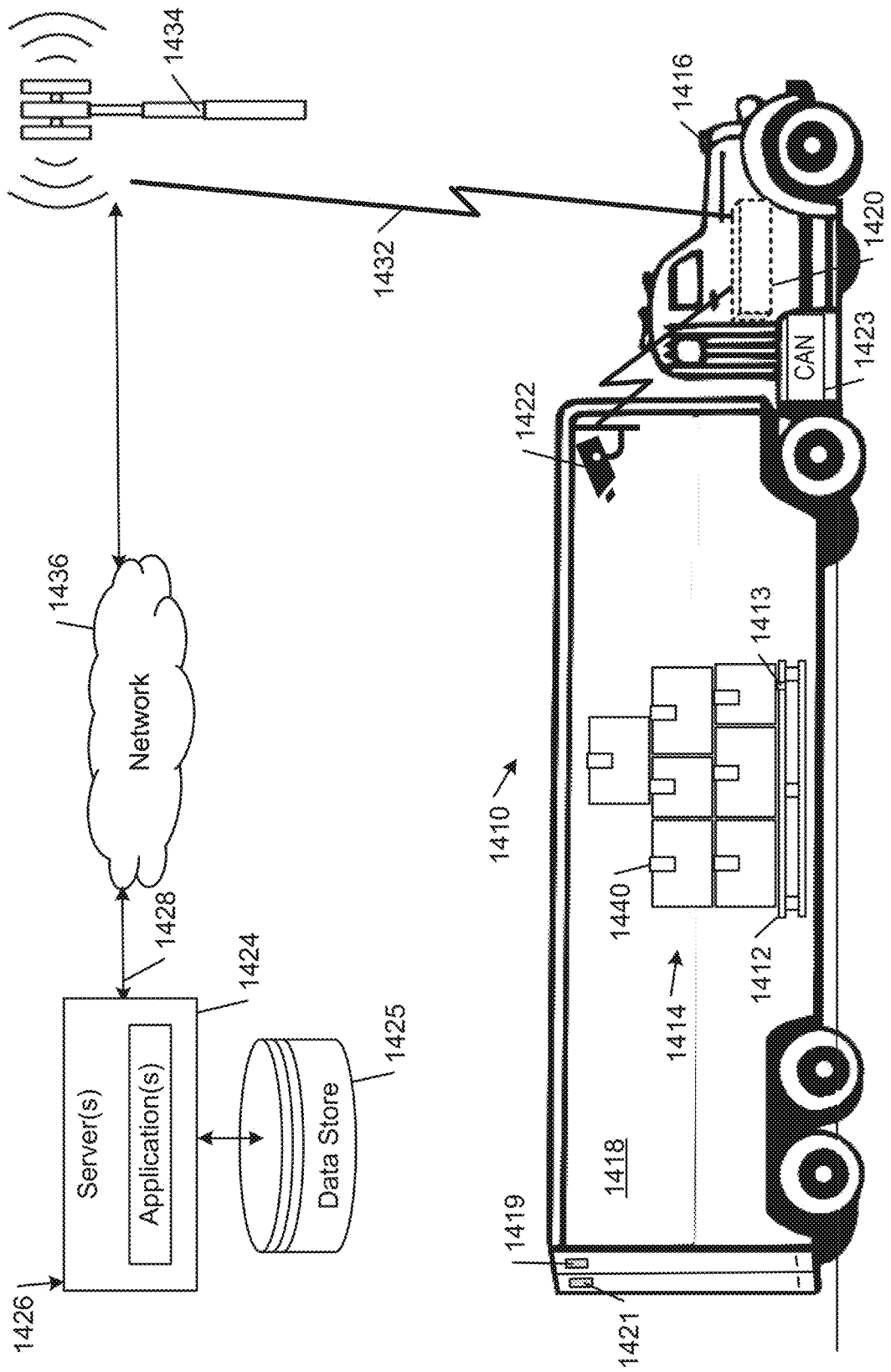
FIG. 14 is a schematic diagram a segment of an adhesive tape platform that communicates with one or more network services, during transportation, according to embodiments.

FIG. 14 is a schematic diagram of an example vehicle 1410 (e.g., a semi-trailer truck) transporting a pallet 1412 of assets 1414. In some embodiments, a tertiary wireless network node 1413 (e.g., as discussed with reference to FIG. 8) is fixed to the pallet 1412 and is configured to communicate wirelessly with tape nodes 1440 that are attached to the assets 1414, and/or with a camera tape node 1422. In this example, the vehicle 1410 is a semi-trailer truck that includes a tractor unit 1416 and a semi-trailer 1418 that carries freight loaded through doors 1419 and 1421 (of which nodes 1210A, B may be attached to). In general, the vehicle 1410 may be any type of vehicle used to transport goods or other things from one place to another, including any type of motorcycle, car, truck, van, train, ship, or aircraft. In some embodiments, the tape nodes 1440 may be any type of tape node (e.g., the wireless nodes 640, 670, 680, 810, 812, 814, 828, 830, 842-848, etc.), and may be tapped to the boxes containing assets and that are within the semi-trailer.

In the illustrated example, the tractor unit 1416 includes a mobile gateway 1420 (e.g., the mobile gateway 810, 812, FIG. 8). In some embodiments, the mobile gateway 1420 and the camera tape node 1422 each includes one or more of Cellular and GPS capability, wireless transceivers, processors, and memory devices storing programmatic instructions that enable wireless communications over multiple different wireless communications protocols and technologies across different power levels and ranges, such as, but not limited to, GSM, CDMA, Cellular, TDMA, WCDMA, EDGE, OFDM, GPRS, EV-DO, LTE, WiFi, LoRaWAN, Bluetooth LE, Z-wave, and Zigbee. In other embodiments, the wireless communications interfaces of the camera tape node 1422 are of lower power and shorter range than the communications interfaces in the mobile gateway 1420. The mobile gateway 1420 and the camera tape node 1422 have at least one communications interface (e.g., Bluetooth, LoRaWAN, and/or wired connection) in common and communicate with one another.

In some embodiments, the mobile gateway 1420 and the camera tape node 1422 include positioning sensors. For example, the mobile gateway 1420 and the camera tape node 1422 may have a higher storage capacity, more battery power, and more processing power than the tape nodes 1440 attached to the assets 1414.

The mobile gateway 1420 in the tractor unit 1416 typically communicates with a network service 1426 over one or more high-power, long-range communications interfaces. In the illustrated example, the mobile gateway 1420 wirelessly communicates with a server 1424 of the network service 1426 using a cellular connection 1432 with a cell tower gateway 1434 and over a communications network 1436 (with may be an example of wireless tracking system 800), which may be a private network or a public network (e.g., the Internet). The network service 1426 includes server 1424 executing one or more applications and storing and retrieving data from data store 1425 (e.g., the database of FIG. 8).

The mobile gateway 1420 may also wirelessly communicate with the camera tape node 1422 in the semi-trailer 1418 using a lower power, shorter-range wireless communications interface, such as LoRaWAN or Bluetooth LE. In some embodiments, the mobile gateway 1420 communicates with the camera tape node 1422 over a wired connection through a controller area network (CAN) bus system 1423, which is a vehicle bus standard designed to allow microcontrollers and devices to communicate with each other in applications using a message-based protocol without a host computer. The CAN bus system 1423 also may connect the mobile gateway 1420 to the communications interface of a cellular modem that is installed in some embodiments of the tractor unit 1416 of the vehicle 1410, thereby enabling the mobile gateway 1420 to share the cellular modem's existing cellular subscription service.

The assets 1414 are associated with tape nodes 1440 that include wireless communications, processing, sensing, and data storage capabilities. In some examples, these tape nodes 1440 are implemented as wireless electronic tags that are carried in or otherwise attached to or integrated with the respective ones of the assets 1414. Other examples incorporate the wireless communications, processing, sensing, and data storage capabilities into a low-cost, multi-function adhesive tape platform with a form factor that unobtrusively integrates the components useful for implementing a combination of different logistic functions and also is able to perform a useful ancillary function that otherwise would have to be performed with the attendant need for additional materials, labor, and expense. In some examples, the mobile gateway 1420 and the camera tape node 1422 are implemented as one or more segments of respective types of the adhesive tape platform described in US Patent Application Publication No. US-2018-0165568-A1, which was published on Jun. 14, 2018, and is incorporated in its entirety herein.

In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the wireless tracking system 800 but also maintains the flexibility needed to function as an adhesive product that can be deployed seamlessly into various logistic applications and workflows, including person and object tracking applications, and asset management workflows such as manufacturing, storage, shipping, delivery, and other logistics associated with moving products and other physical objects, including logistics, sensing, tracking, positioning, warehousing, parking, safety, construction, event detection, road management and infrastructure, security, and healthcare. In some examples, the adhesive tape platforms are used in various aspects of logistics management, including sealing assets, transporting assets, tracking assets, monitoring the conditions of assets, inventorying assets, and verifying package security. In these examples, the sealed assets typically are transported from one location to another by truck, train, ship, or aircraft or within premises, e.g., warehouses by forklift, trolleys etc.

For example, in the embodiment of FIG. 14, each door 1419 and 1421 has a tape node (e.g., a tape node as described in FIG. 12) attached to an inside or outside of the door, that cooperate to detect a distance between the tape nodes and thereby detect when the doors 1419 and 1421 are opened (e.g., see FIG. 12 and associated description). Further, the tape nodes 1440 (e.g., may be tape nodes 1210 A, B) are attached to opposing flaps of the assets 1414 on pallet 1412. The camera tape node 1422 detects movement within trailer 1418 and, in response to the camera tape node 1422 detecting movement/vibration/light from using image recognition techniques. In embodiments, any of the tape nodes 1440 detecting a tampering event (e.g., detecting the movement as discussed with reference to FIGS. 12A, B, 20, 21) may transmit an alert to the camera tape node 1422, which may orient itself to the direction of the tape node 1440 that detects the tampering. The camera tape node 1422 may record video or capture one or more still images of the environment within the trailer 1418. In some embodiments, the recorded video and/or captured images may use a narrow field of view that includes the location where the tape node 1440 detected a tampering event, or where movement was detected, or may use a wider field of view that includes substantially all of the interior of the trailer 1418. In one example of operation, the tape nodes 1440 attached to assets 1414 detect a tampering event. In another example of operation, the tape node 1413 detects a tampering event. The camera tape node 1422 with the embedded camera receives a signal from the tape nodes 1440 and/or 1413 indicating the tampering event and, in response, reorients its camera and begins recording video and/or still images that include the location of the tape node(s) 1440, 1413. In some embodiments, the camera tape node 1422 may transmit the recorded video and/or still images to one or more other tape nodes (e.g., tape nodes 1440, 1413, 1421, 1210A, B, etc.) within communication range.

In some embodiments, the recorded video and/or still images are transmitted, via the mobile gateway 1420, network 1436, and the server 1424, to the data store 1425 for storage. The wireless sensing system may further transmit an alert to an authorized user 1220, or a client device (e.g., the mobile gateway 810) associated with the authorized user 1220, that includes a time stamp and information relating to the tampering event (including the recorded video, the "after" images, and the "before" images). The time stamp and associated tampering information may be included in a table that shows events for an asset during a journey, as described with reference to FIG. 15. Advantageously, the authorized user 1220 is notified of the tampering event and may check the trailer 1410 (or the asset container 864, as described below) once the truck (or ship, etc.) has reached a resting point or check point.

Figure 16:
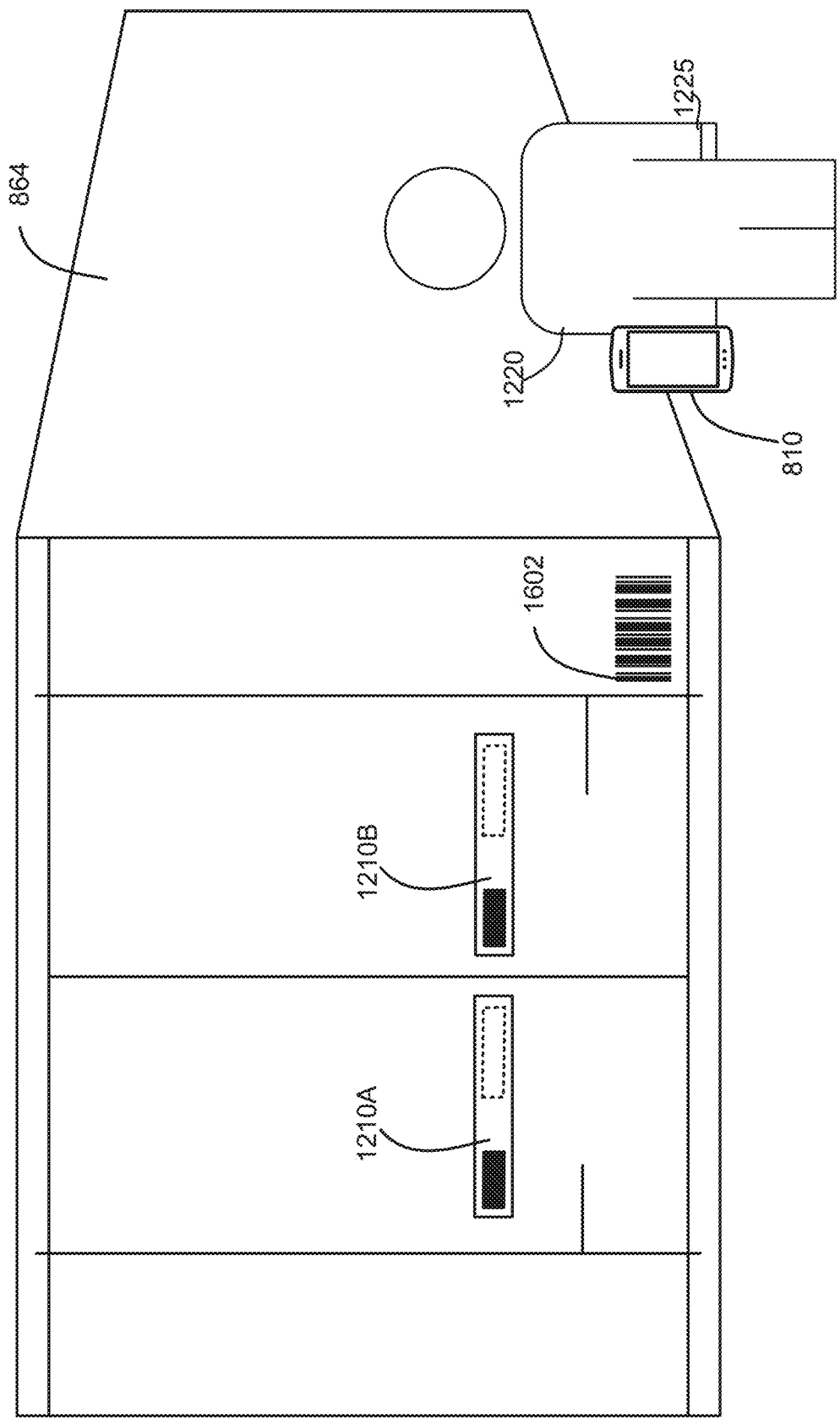
FIG. 16 is an illustration of an authenticated user scanning a bar code associated with an asset container after detecting a tampering event, according to embodiments.

FIG. 15 is a diagram 1500 of mobile gateway 810 (also referred to as client device 810), displaying a corresponding table 1502 showing events for an asset container (e.g., the asset container 864; FIG. 8) being transported by a ship 1504 and monitored by the wireless tracking system 800, according to some embodiments. For example, the asset container is being transported by the ship 1504 from a port in South America to a port in California. FIG. 16 is a perspective diagram showing an authorized user 1210 inspecting asset container 864. FIGS. 15 and 16 are best viewed together with the following description.

The asset container 864 has at least one tape node 1210A, 1210B installed/applied to it at a time of inspection before the asset container 864 departs on its journey. In embodiments, the tape nodes 1210A, B may be applied on any surface (e.g., inside and/or outside the container 864) of the asset container 864. Additional tape nodes (e.g., the wireless nodes 640, 670, 680, 810, 812, 814, 828, 830, 842-848, etc.) may be applied to the inside (e.g., walls, doors 862, etc.) of the asset container 864, as well as to the assets within the asset container 864. Although the asset containers 864 in these examples are in the form of a shipping container, this embodiment is not limited to shipping containers and may include any type of shipping mode, such as a trailer 1418 of a truck 1410, cargo plane, etc. In some embodiments, the asset container 864 is not a shipping article but a different type of container for assets. For example, the asset container 864 may be a vending machine storing items, a storage container, a room storing assets, a portion of a storage facility, a storefront, a box, a locker, a cabinet, some other container for assets, or some combination thereof.

Similar to the embodiment of FIG. 14, the tape nodes 1210A, B detect events, during the journey of the asset container 864, which are shown in the table 1502 displayed on the client device 810. In the example of FIG. 15, the table 1510 shows a potential tampering event (titled "Container door opened"). In response to the detected tampering event, the wireless tracking system sends a notification to the client device 810 of an authorized user (e.g., authorized user 1220) indicating the tampering event and thereby prompting the authorized user to inspect the asset container 864. The asset container 864 includes a barcode 1602 that allows the assets within the asset container 864 to be associated with the asset container 864. As described above with reference to FIG. 12, the authorized user 1220 may have the wearable device 1225 that is detected by the tape nodes 1210A, 1210B, which is also noted in the table 1502 (titled "Container door opened (inspection)"), which occurred when the authorized user 1220 opened the doors of the asset container 864 to make the inspection. In some embodiments, when the authorized user 1220 scans the barcode 1602 with the client device 810, the wireless tracking system notifies (e.g., by generating a wireless signal) the tape nodes associated with the asset container 864 that the authorized user 1220 is beginning an inspection. Accordingly, in response to the notification, the tape nodes 1210A, 1210B do not generate or send a tamper alert. Further, any tape nodes within the asset container 864 (e.g., attached to assets within the asset container 864 and/or attached to the inside walls of the asset container 864) do not generate a tamper alert. In some embodiments, the tape nodes do not collect data or detect a tampering event for a predetermined period (e.g., 30 seconds, 5 minutes, 30 minutes, etc.) of being notified of the inspection (or in response to detecting the wearable device 1225 of the user 1220).

In some embodiments, tape nodes 1210A, B detect tampering events when the container 864 or asset 1205 that is not in transit, or in a journey. Embodiments herein can be used on any other kind of container 864 or location (e.g., checkpoint, port, shipping yard, storage yard, storage facility, etc.) where tamper detection is of interest. For example, rather than the tape nodes 1210A, B alerting an authorized user upon docking or reaching a checkpoint (or geofenced threshold), the tape nodes 1210A, B may transmit an alert to stationary gateways 814, mobile gateways 812, and/or authorized users 1220 at the location.

In some embodiments, one of the tape nodes 1210 A, B or a gateway device (e.g., mobile or stationary gateway, 812, 814) may be located on the ship. For example, the mobile gateway 812 and/or stationary gateway 814 are adhered to container 864 or are at a different location, e.g. in the environs of the container 864. The mobile gateway 812 and/or stationary gateway 814 may be programmed to ping/alert any nearby users (e.g., user 1220) using a client device, directly, without connecting to the server 804, when the mobile gateway 812 and/or stationary gateway 814 are notified of a tampering event. For example, when the client device 810 of the user 1220 is in proximity (e.g. when the user walks by the mobile gateway 812 and/or stationary gateway 814) of the mobile gateway 812 and/or stationary gateway 814, the client device 810 receives the ping from the tape node 1210A, B, mobile gateway 812, and/or stationary gateway 814 (Bluetooth, LoraWAN, WiFi, etc.). The ping may include an instruction for display to the user 1220 to stop and perform an inspection of the container 864 or the ping may provide the user 1220 alternative instructions (e.g., to upload data that was included in the ping to the server 804 using the client device 810, and/or to order another user 1220 to carry out an inspection, etc.). In some cases, a client device application (e.g., mobile application 822) running on the client device 810 causes, in response to detecting the ping, the client device to operate as a mobile gateway 810 and relay data over a longer distance on behalf of the tape node (which may have limited range).

In some embodiments, the server 804 receives the diagram 1500 and the table 1502 and the server may transmit the diagram 1500 and the table 1502 to any tablet, or a smartphone that a user or authority (e.g., border patrol agent) is using to inspect an asset container 864 (or any shipment), for display. In some embodiments, any data viewable within the client device 810 may be stored, updated/synced, temporarily or long term, within the server 804, and the stored data may be accessible at any time by a user 1220 using devices of the wireless tracking system. For example, in addition to the user 1220 viewing the diagram 1500 and the table 1502 on the client device 810, a second user may view that same or more information from a remote device associated with the wireless tracking system 800. In some embodiments, the client device may store and display the diagram 1500 and table 1502 in real-time. In some embodiments the diagram 1500 and table 1502 may be part of a mobile application (e.g., the mobile application 822 and/or a third-party application) that is integrated with the wireless tracking system 800.

In alternative embodiments, if the tape node 1210 A, B, mobile gateway 812, and/or stationary gateways 814 cannot locate a client device in within a proximity, tape node 1210 A, B, mobile gateway 812, and/or stationary gateways 814 may locate other nearby tape nodes, mobile gateways, and/or stationary gateways, and delegates the task to the nearby tape node, mobile gateway, or stationary gateway to locate a user 1220 to perform an inspection of the container 864. In this way the ping can be relayed over a longer range.

In some embodiments, the user 1220 a smartphone application running on a user's smartphone as a background application, listens for tampering event-related pings from the tape nodes 1210 A, B, mobile gateway 812, or stationary gateways 814. In embodiments, the user may use the smartphone application to perform the inspection (e.g., receive an alert of a tampering event, compare "before" and "after" images, discussed below, display a shipping manifest 1510, etc.) and auditing of the assets 1205 and containers 864. The smartphone application is connected to the wireless tracking system 800. For example, the smartphone application can communicate with the server 804, any tape node (or a select few depending on a subscription), any mobile or stationary gateway 810, 812, 814 (or a select few depending on a subscription), etc. In some embodiments, the smartphone application is a third-party application operated by a customer of the wireless sensing system 800 operations, that connects to the wireless sensing system 800 on the backend (e.g., connect to the server 804 via the internet), or is the client application 810.

Figure 17B:
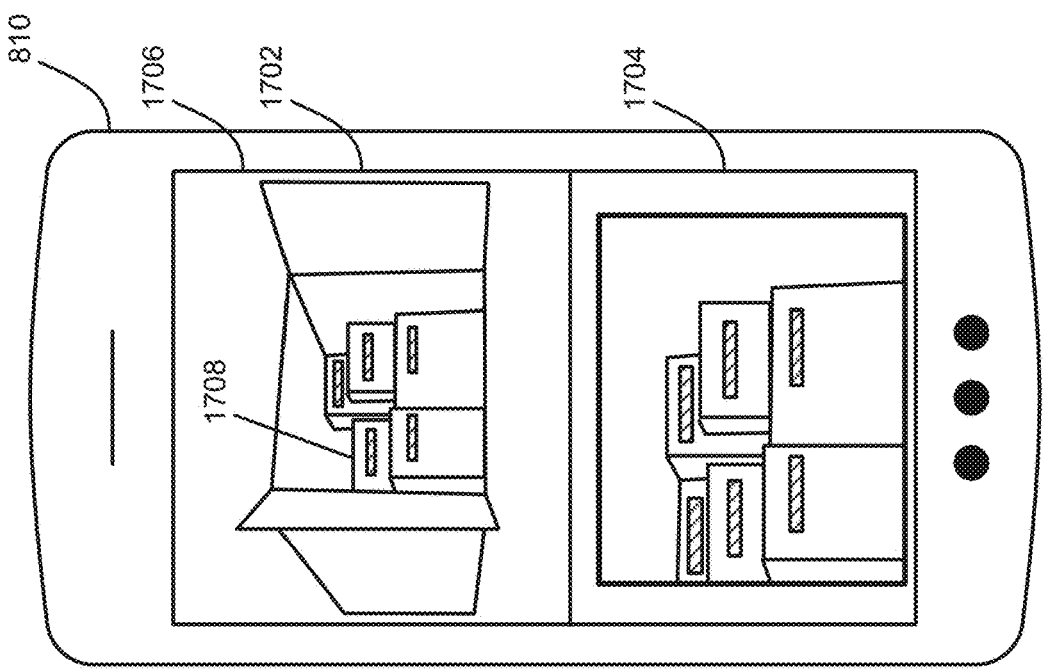
FIGS. 17A and B are illustrations of a client device showing a side-by-side comparison of a "before" image and "after" image, according to embodiments.
Figure 17A:
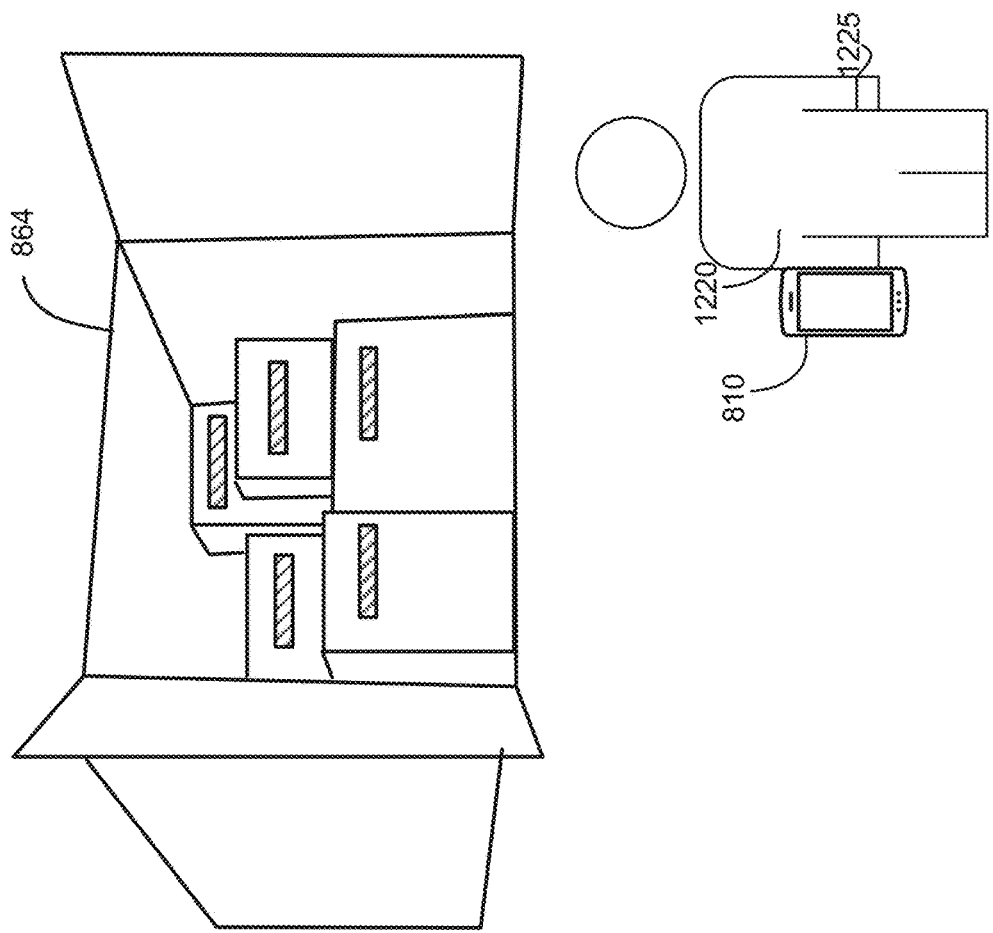

FIGS. 17A and 17B are discussed together and are schematic diagrams illustrating the authorized user 1220 using an application (e.g., client application 822) on the client device 810 (e.g., a smartphone) to capture an "after" image 1702 of the asset container 864 for comparison to a "before" image 1704. The "before" image 1704 is captured by an authorized user during an earlier inspection of the asset container 864 at a first time, such as prior to the asset container 864 being shipped. The "after" image 1702 may be captured using the same or a different client device 810 than was used to capture the "before" image 1704. The "after" image 1702 is captured from a perspective similar to the perspective used for the "before" image 1704, but the "after" image 1702 is captured at a second time later than the first time. In some embodiments, the client device 810 uploads the "before" image 1704 to the wireless tracking system (e.g., the wireless network communications environment 800). For example, the client device 810 may upload the "before" image 1704 to one or more of the server 804, the database of the wireless tracking system 800, the mobile gateways 810, 812 (e.g., a mobile gateway 810, 812 associated with the ship that the asset container 864 is loaded on, e.g., tape node 860), any tape node (e.g., to memory 658, 658', 658") within the asset container 864, etc. Further, the client device 810 may store the "before" image in its own memory, for retrieval when a tampering event occurs.

The wireless tracking system 800 compares the "after" image 1702 and the "before" image 1704 using computer vision difference detection algorithms to identify locations in the "after" image 1702 that correspond to an area of the asset container 864 where potential tampering has occurred. In some embodiments, multiple "after" and "before" image 1702, 1704 are captured and analyzed to identify any tampering event locations (e.g., by using a machine learning model for image difference detection). For example, machine learning may be combined with standard difference image analysis techniques. In some embodiments, a neural network or an adaptive neural network may be used to identify changes between the "after" and "before images 1702, 1704. In some embodiments, the wireless tracking system 800 uses image processing to remove background noise, increasing the likelihood of the computer vision algorithm identifying differences between the "after" and "before" images 1702, 1704 as tampering events. Image pre-processing, such as image registration, geometric adjustments, spatial transformation, radiometric/intensity adjustments, intensity normalization, homomorphic filtering, illumination modeling and compensation, linear transformations of intensity, noise removal, other image pre-processing, or some combination thereof, may be performed on both the "after" and "before" images 1702, 1704 prior to performing the image difference detection, according to some embodiments. The authorized user 1220 performing the inspection may use an integrated display 1706 and a camera of the client device 810 to assist with the inspection. The application running on the client device 810 may include an augmented reality (AR) user interface (discussed with reference to FIGS. 18A and 18B) that guides the authorized user 1220 to locations 1708 where potential tampering has occurred. In some embodiments, the authorized user 1220 may identify the location of tampering on their own by differentiating between the "after" and "before" images 1702, 1704 presented on the integrated display 1706. In some embodiments, difference image analysis techniques such as linearized kernel models, Zackay formal image treatments, other difference image analysis techniques, or some combination thereof may be used to detect and locate differences in the "before" 1704 and "after" 1702 images. Computer vision and image processing techniques, such as structural similarity index measure, image differencing, image ratioing, change vector analysis (CVA), tasseled cap transformation (TCT), principal component analysis, other algorithms for detecting and locating changes in images, or some combination thereof may be used to detect and located differences between the "after" and "before" images 1702, 1704, according to some embodiments.

Figure 18A:
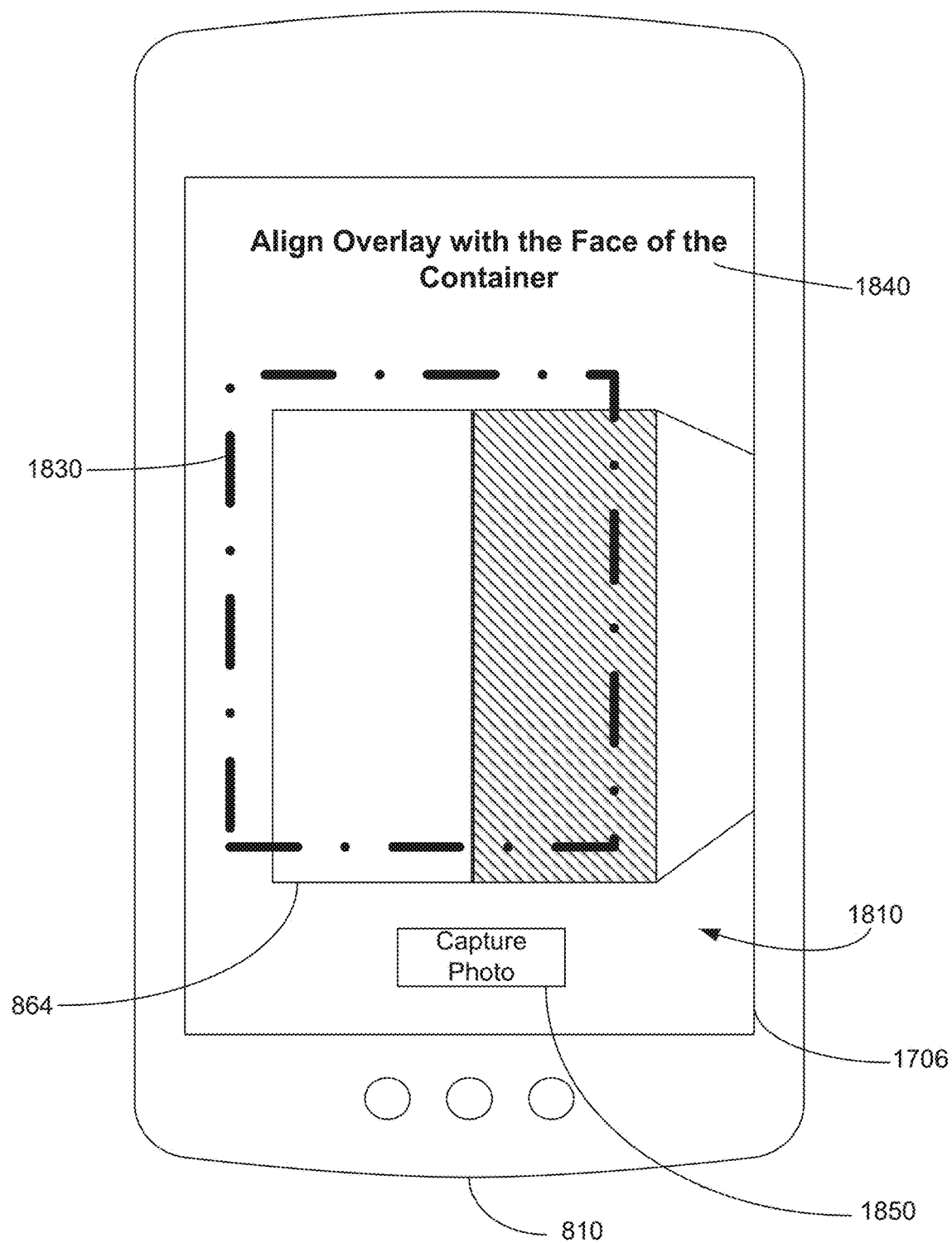
FIGS. 18A and B are illustrations of an augmented reality overlay within the client device for guiding the authenticated user to capture an "after" image, according to embodiments.

For computer recognition, image analysis, etc., capturing an "after" image from a substantially similar (or identical) perspective as a "before" image, increases the ease and likelihood of accurately identifying a difference to a "before" image. Embodiments herein provide a system for guiding a user (e.g., user 1220) in orienting a client device (with a camera) to capture an "after" image from perspective that is substantially similar (or identical) to a "before" image. FIG. 18A is schematic illustrating example use of an AR user interface 1810 on the integrated display 1706 of the client device 810 to guide the authorized user 1220 to the potential tamper location 1708 of FIG. 17 within the asset container 864, according to some embodiments. The AR user interface 1810 may be included as part of an app, e.g. a smartphone app, installed on the client device 810. For example, the potential tampering location 1708 is detected by comparing the "before" image 1702 with the "after" image 1704, as described above. According to some embodiments, the tamper location detection may be executed by the client device 810, e.g. by an app installed on the client device 810 which is integrated with the tracking system 800. In other embodiments, the tamper location detection may be executed by an app on a server of the wireless tracking system 800, with the app on the client device 810 transmitting data to the server and receiving the results of the tamper location detection via the network 802. In either case the app on the client device 810 or the app on the server processes and analyzes the "before" and "after" images as described above, with respect to FIG. 17, to detect the location of potential tampering.

Figure 18B:
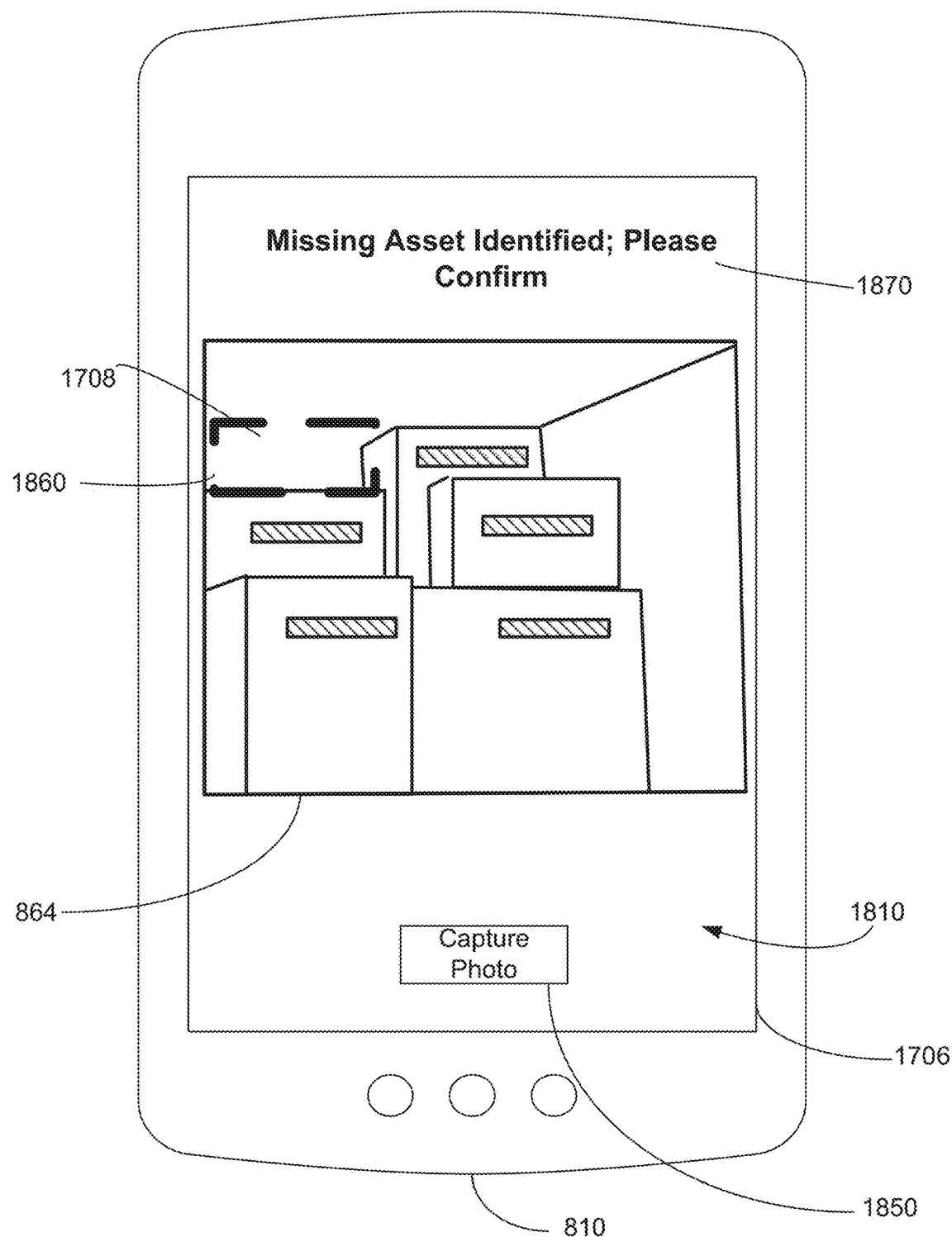

In FIG. 18B, the AR user interface 1810 then displays graphical overlay elements 1860 on the "after" image to indicate the identified tamper location 1708, according to some embodiments. In certain embodiments, the AR user interface 1810 overlays the graphical overlay elements 1860 onto a live video feed, where the graphical overlay elements 1860 indicate the potential tamper location 1708 in relation to the perspective or frame shown in the live video feed. The graphical overlay elements 1870 may be animated or updated based on a determined location and orientation of the client device and on the potential tampering location relative to the position of the client device. The AR user interface 1810 may further include a description 1870: "Missing Asset Identified; Please Confirm". The AR user interface 1810 may also show information about the asset associated with the potential tampering event. In some embodiments, the information may include a name of the asset, a type of asset, a point of origin associated with the asset, a destination location associated with the asset, a timestamp indicating when the potential tampering event occurred, an identifier associated with the container the asset is stored in, a description of the location of the asset within the container, a description of the appearance of the asset, a value of the asset, a weight of the asset, a size of the asset, some other information on the asset, or some combination thereof.

In some embodiments, the tape node (e.g., tape nodes 1210A, B) for an asset 1205 or container 864 may notify a border patrol agent of the expected weight for the asset 1205 or container 864. Accordingly, by weighing the asset or container at a weigh station, the agent may determine when something is missing or has been added based on difference in the weight. Tape node may store information about the asset that the border patrol agent may retrieve directly using his smartphone. While the human operator in the above examples is a border patrol agent, the human operator may be another authorized user of the system, security officer, agent, or authority.

As further illustrated in FIG. 18A, the integrated display 1706 shows the AR user interface 1810 that assists the authorized user 1220 to capture the "before" image 1704 and the "after" image 1702 with similar perspective views of the asset container 864. The AR user interface 1810 shows a live video feed with AR alignment overlays 1830 overlaid on the live video feed. The AR user interface 1810 also includes displayed instructions 1840 and one or more interactive interface elements 1850. In the example shown, the interactive interface element 1850 is a shutter button for capturing the "after" image 1702. In response to the user interacting with the interactive interface element 1850, the client device 810 captures the "after" image using the integrated camera. The client device 810 may store the "after" image in a memory of the client device 810 and/or may transmit the image to a server of the wireless tracking system 800. In some embodiments, the client device 810 wirelessly transmits the "after" image to one of the tape nodes 1210A and 1210B, and the respective tape node stores the "after" image in its own memory. The AR alignment overlays 1830 correspond to features of the asset container 864 that are aligned with the AR alignment overlays 1830 shown in the live video feed when the client device is in the correct position for capturing the "after" image 1702. For example, the AR alignment overlay 1830 corresponds to the face (opening) of the asset container 864. In some embodiments, the "after" image 1702 is automatically captured and stored by the client device, in response to the live image content aligning with the AR alignment overlay 1830 and/or the client device 810 reaching the correct location and orientation relative to the asset container 864. Th detection of the correct location and orientation may be detected based on measured distance of the client device 810 from two or more tape nodes attached to the asset container 864 as described below, according to further embodiments. In other embodiments, the AR user interface 1810 displays graphics that indicate that the correct position of the client device's camera is detected and may also display instructions instructing the user to take the image at a corresponding time when the client device's camera is correctly aligned. The instructions 1840 may direct the user to move the client device 810 to a specific location, in some embodiments. For example, the instructions 1840 may direct the user to step 5 meters away from a front edge of the asset container 864. In some embodiments, the instructions 1840 and/or the AR alignment overlay 1830 may include symbols (e.g., arrows) indicating a direction for the user 1220 to move the client device 810.

Tape nodes within the asset container 864 may triangulate, in two or three-dimensional space, with the client device 810 to give an approximate location of where the user should orient the client device 810 with respect to the asset container 864, based on wireless communication signals between the tape nodes and the client device 801. The wireless communication signals may include Bluetooth (e.g., BLE) signals, LoRa signals, LoRaWAN signals, WiFi signals, Zigbee signals, or other wireless communication signal. For example, at least two tape nodes within or attached to the asset container 864 may triangulate with the client device 810 and determine a location of the client deice 810 relative to the asset container 864, whereby the client device 810 may determine and display instructions 1840 for the authorized user 1220 to move the client device 810 to a desired location and orientation (e.g., centered six feet away from the face of the asset container 864 at a specific height and orientation (e.g., five feet off the ground directed at a specific angle towards the asset container 864). In certain embodiments, the instructions 1840 position the client device 810 in a similar location and orientation, relative to the asset container 864, as the camera that captured the "before" image 1704, by, e.g., referring to measured coordinates of the device capturing the "before" image 1704 that were stored in memory (e.g., database of the wireless tracking system 800, memory 658, 658', 658", memory of the client device). In some embodiments, the camera or electronic device that captured the "before" image is the same electronic device that captures the "after" image.

In some embodiments, the client device 810 triangulates its position based on the received signal strengths from the tape nodes 1210A, B. For example, the client device 810 may have a baseline signal strength of each of the tape nodes 1210A, B, from referencing database 808 or from receiving the baseline from the tape nodes 1210A, B. The client device may compare received signal strength and direction of signal from each of the tape nodes 1210A, B to the baseline signal strength. From this, the client device 810 may triangulate the position of each tape node 1210A, B, and then determine an orientation, with respect to the tape nodes 1210A, B, of the client device for capturing an "after" image of the assets that has a similar perspective to the "before" image of the assets.

In some embodiments, the client device 810 determines its location based at least partially on sensors (GPS, altimeter, etc.) of the client device 810. For example, the client device 810 may receive GPS coordinates from its GPS sensor, height relative to the ground, from its altimeter, etc. The client device may receive the location (e.g., coordinates) of each of the tape nodes 1210A, B from any of the server 804, and the tape nodes 1210A, B, etc. The client device may then determine, a relative position of the tape nodes to the client device, and thereby determine where the camera should be positioned such that an "after" image of the assets and the storage container 864 has a similar perspective to the "before" image of the assets 1205 and the storage container 864.

In some embodiments, alternatively or in addition to a client device capturing either the "before" or "after" images 1702, 1704, a tape node (e.g., camera tape node 1422, FIG. 14), with an embedded camera, attached to the asset container (e.g., to a corner of the container or to the door 862, 1419, 1421) may capture the "after" and/or "before" images 1702, 1704. For example, when the assets are loaded within the asset container 864, the camera tape node 1422 may capture the "before" image 1704. The tape node 1422 may automatically capture the "before" image 1704 at the time of loading the asset container 864, or wait until the tape node 864 receives a signal (e.g., from the client device) to capture the "before" image 1704. Then, upon receiving an indication that a tampering event has occurred (as described with reference to FIG. 14), the camera tape node 1422 may capture an "after" image 1702, in the form of a captured image or recording. In the embodiment of the camera tape node 1422 recording video, the client device 810 may identify a single or multiple captured images within the video that provides an accurate representation of the "after" image for comparing to the "before" image. The camera tape node 1422 may upload the "before" image to the wireless tracking system 800 (network 1436). For example, the camera tape node 1422 may upload the "before" image to the server 804, the database of the network service 808, the mobile gateways 810, 812, any tape node (e.g., to memory 658, 658', 658") within the asset container 864, the client device, etc. Further, the camera tape node 1422 may store the "before" image in its memory (e.g., memory 658, 658', 658").

Figure 19:
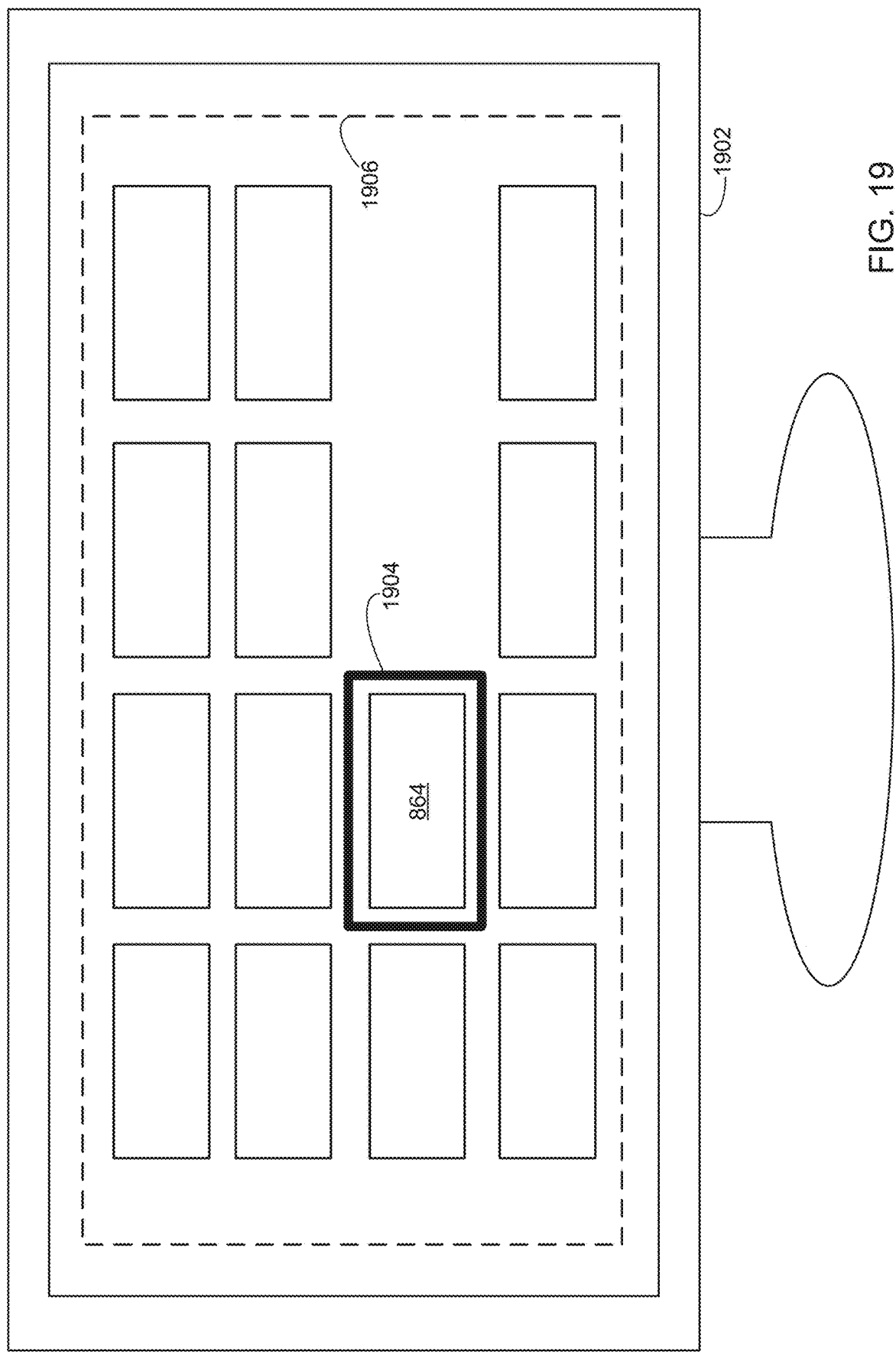
FIG. 19 is an illustration within a user interface of a client device that include a marker identifying a particular asset container within a shipping yard, according to embodiments.

In some embodiments, when a shipping transport enters (e.g., ship docks at a port, vehicle crosses a border, etc.) a checkpoint (e.g., port, border crossing, etc.), the wireless tracking system 800 may notify an authority (e.g., port authority, border patrol, port security, etc.) that a tampering event has occurred within a particular asset container 864. For example, the authority may be using a client device 810 and receive within the client device 810, the notification regarding the tampering event. The authority may not know where the asset is located. FIG. 19 shows an electronic device 1902 (e.g., a computer, smart phone, tablet, and/or any type of electronic device), which may be an example of mobile gateway 810, that includes a graphical display of asset containers 864 located within a perimeter of an area 1906 (e.g., shipping port). The graphical display shows the location of the asset container 864 within the area 1906 by marking the asset container 864 with an identifier 1904. In some embodiments, the wireless tracking system 800 has a record of the location of the asset container 864 and transmits the location of the asset container 864 to the client device 1902. For example, the wireless tracking system 800 generates a map of the area 1906 that includes the location of the asset container 864 and transmits the generated map to the client device 1902 and any other associated client devices (e.g., client device 810). In some embodiments, the wireless tracking system 800 knows the location of the client device 810 and transmits the generated map to the client device 810, along with a path to the asset container 864.

Embodiments of the present disclosure further provide a mechanism for blacklisting or fast-tracking shipments (e.g., ships, trucks, trains, planes, or other modes of transporting assets) based on tampering events (or other detected events, such as temperature, humidity, light, and/or other environmental changes. For example, the wireless tracking system 800 (and other aspects of the disclosure) may be utilized across multiple checkpoints (e.g., shipping ports, border crossings, shipping facilities, etc.) and an authority at each of the locations may blacklist certain tape nodes associated with an asset or fast-track certain asset containers or shipping modes (e.g., a ship, train, etc.) based on an absence of a tampering or detected event. For example, each check point has a finite number of lanes available for passage through the checkpoint and passage depends on an inspection of the assets on board, e.g., the ship, truck, etc. Authorities at the checkpoint utilizing embodiment of the present disclosure (e.g., the wireless tracking system 800) have access to data pertaining to the assets passing through the checkpoint. For example, the authority may have a client device 810 connected with the wireless tracking system 800. When a ship (e.g., ship 1504) and/or a truck (e.g., truck 1410) using the wireless tracking system 800 approaches the checkpoint, the authorized user (e.g., port agent) may access data relating to assets on the transporting vehicle. The data may indicate whether any assets on the vehicle (e.g., ship or truck or asset container) have detected and/or reported a tampering event or any other anomalous event.

Fast-tracking may include a shipment (e.g., a vehicle carrying multiple assets) passing through a checkpoint without a laborious inspection process. For example, a shipping port may have one or more shipping lanes for inspection and, upon the authority receiving a report that the shipment has indicated no tampering events, the authority or the wireless tracking system 800 may determine the shipment may enter a fast-track lane that circumvents detailed inspection. In some embodiments, the fast-track lane may have minimal inspection. In other embodiments, the fast-tracking includes other preferred or expedited authorization of the shipment, vehicle, or assets to pass through a checkpoint location, port, inspection point, or other ingress or egress point. Further, the authority using a mobile gateway 810 (e.g., client device 810) associated with the wireless tracking system 800 may access images of the contents/assets of the shipment to aid in determining that the shipment should be fast-tracked. In some embodiments, the wireless tracking system 800 may automatically determine whether a shipment is fast-tracked upon a threshold being satisfied (e.g., zero tampering events). For example, once the wireless tracking system 800 analyzes data associated with a particular shipment that has had fewer than a threshold number of tampering events, the wireless tracking system 800 may determine that the shipment is fast-tracked. In some embodiments, the wireless tracking system 800 may determine that the shipment has had a particular number of tampering events and assets associated with the shipment should be inspected by authority. In some embodiments, the fast-tracking may include minimal inspection or some level of inspection less than what is regularly used.

Blacklisting may include tape nodes associated with certain assets being banned from passing through a checkpoint. For example, if an asset has had a tampering event, the tape node may record the tampering event and upload the tampering event to the wireless tracking system 800, as described above. The authority or wireless tracking system 800, upon determining that the asset has been damaged, or tampered with, may blacklist the asset to prevent its entry at all checkpoints utilizing the wireless tracking system 800, so that the asset may not pass through another checkpoint. In some embodiments, an asset may not have had a tampering event, however, the authority may determine that a particular asset should not pass through the checkpoint because the asset has been compromised (e.g., because the asset is damaged: dropped; contaminated; not edible; otherwise compromised; etc.); the authority may blacklist the compromised asset and indicate this to the wireless tracking system 800. In some embodiments, the authority may retrieve this information from the tape node. For example, the tape nodes with temperature sensors may detect the temperature inside a package. The wireless sensing system 800 then associates an identifier (e.g., identifier 122) of the tape node with the event of the food being compromised. The wireless sensing system 800 may then store this information within a database of the server 804.

In some embodiments, when an asset is blacklisted, the authority may keep the asset and destroy it or allow it to leave the checkpoint. Two example methods below detail scenarios including both blacklisting and fast-tracking an asset of a shipment.

Figure 20A:
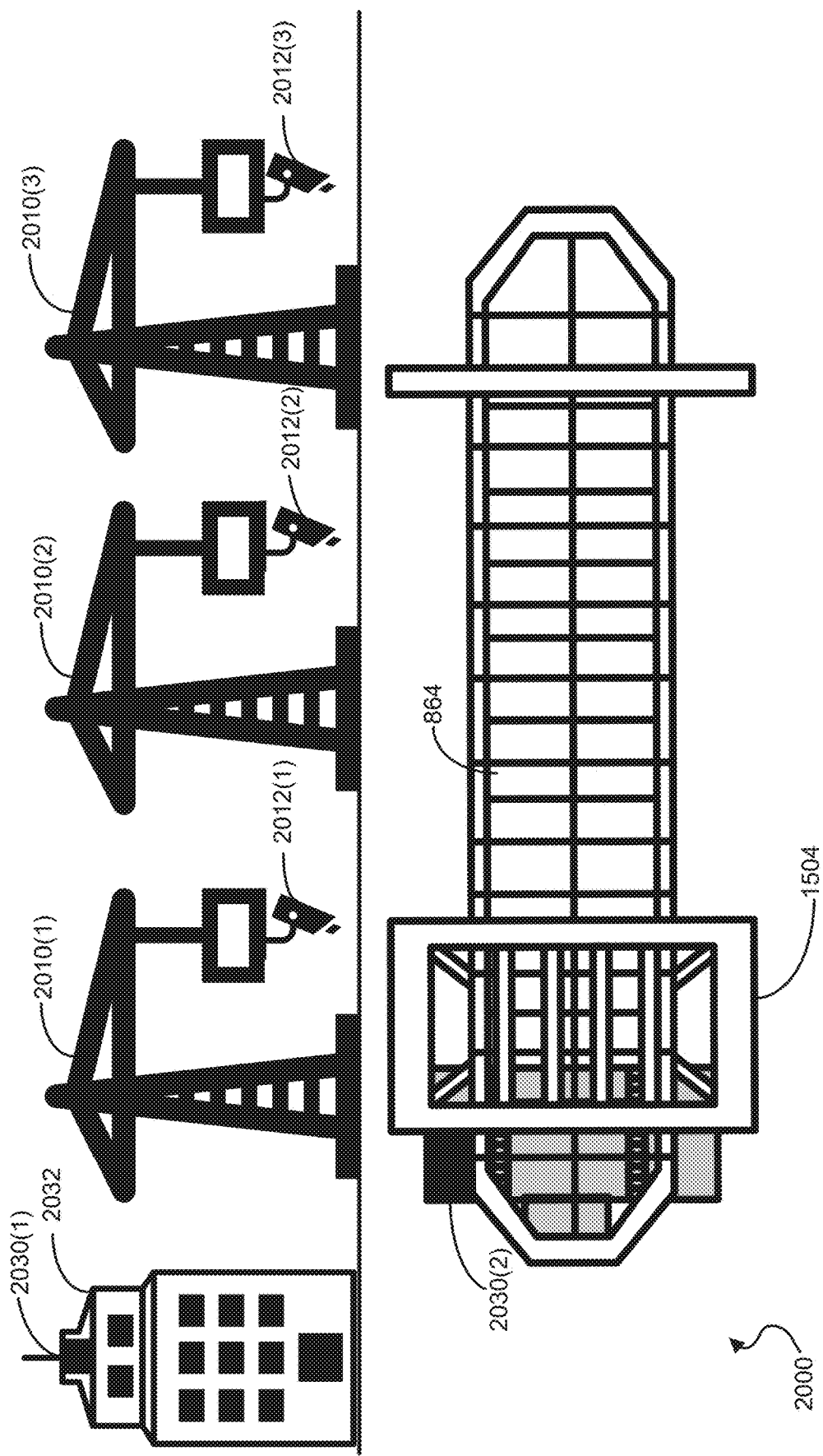
FIGS. 20A and 20B are illustrations of a scanning system at one of a shipping port or a checkpoint at a border crossing, according to embodiments.

FIG. 20A illustrates a scanning system at a shipping port 2000. The port scanning system includes scanner gateways 2012(1)-(3) attached to cranes 2010(1)-(3); a stationary gateway and/or mobile gateway 2030(1) (e.g., stationary gateway 814 or mobile gateway 812) located on, or attached to, a shipping vessel 1504 carrying asset container 864; and a stationary gateway 2030(2) (e.g., stationary gateway 814) attached to infrastructure 2032. The scanner gateways 2012(1)-(3) are not limited to being attached to cranes 2010(1)-(3) but may be positioned at any location within a point of ingress (e.g., the shipping port 2000) and adhered to, and oriented, on any object. For example, the scanner gateways may be positioned at the top of the cranes 2010(1)-(3), on a different portion of the cranes 2010(1)-(3), or on vehicles within the port 2000, such as forklifts, automobiles, etc. In some embodiments, the scanner gateways 2012(1)-(3) include an adhesive platform and may be adhesively applied to any surface, including walls, or any object. In some embodiments, the scanner gateways 2012(1)-(3) are solar-powered tape nodes or solar-powered gateways, as described by the following provisional: U.S. Provisional Application Ser. No. 63/124,791, incorporated herein in its entirety. As described in Provisional Application Ser. No. 63/124,791, the scanner gateways 2012 may have an integrated solar cell. For example, the solar cell is located within a frame in the adhesive platform and, when the scanner gateway 2012 is adhesively applied to a surface, the solar cell receives and generates solar energy for use by scanner gateway 2012.

The gateway 2030(1) includes a medium and/or high-power wireless-communication interface 672', 682" that can connect to the gateway 2030(2). In some embodiments, there may be one or more gateways 2030(1) located within the shipping port, e.g., adhered to infrastructure, and one or more mobile gateways within the shipping port, connected to vehicle (e.g., forklifts, cranes, etc.). There may be one or more gateways 2030(2) located on the ship, e.g., adhered to the ship, asset containers. The gateway 2030(2) on the ship may collect tampering related data from the tape nodes (e.g., 1210A, B) on the containers 864. The gateway 2030(2) on the ship may provide a manifest (e.g., the table 1502) of all the tapes 1210A, B on the asset containers 864 and whether any of them detected tampering to scanner gateways 2012(1)-(3).

In some embodiments, the port scanner gateways 2012 connect to individual tape nodes 1210A, B that have medium range/long range (e.g., that include medium and/or high-power wireless-communication interface 672', 682") capability to check if tampering has occurred in any of the containers. For example, the port scanner gateways 2012 communicate with the tape nodes 1210A, B through LoRa or LoRaWAN communications.

The port 2000 may include shipping lanes or choke points for the ships 1504 to pass through. The scanning system may be located at these choke points. As the ships 1504 pass through the choke points, the scanning system determines if the ship 1504 is eligible to be fast tracked. The scanner gateways 2012(1)-(3) 2012(1)-(3) may be placed on high structures, such as cranes 2010(1)-(3) for moving sea containers. The scanner gateways 2012(1)-(3) provide results and data to client devices (e.g., mobile gateway 810) of the wireless sensing system used by an authority (e.g., border patrol agents) on the scene.

In some embodiments, a ship may include one or more asset containers 864, each containing assets with associated tape nodes, as described above, connected to the wireless tracking system 800. The ship 1504 may include a mobile gateway 812 (connected to wireless tracking system 800) that has longer communication capabilities than the tape nodes. The wireless tracking system 800 tracks the location of the ship using the mobile gateway 812 (and/or a wireless communication device 816). In some embodiments, the final destination, port 2000, may be geofenced such that, once the ship transits the perimeter of the geofence, the tape nodes 1210A, B are activated. In some embodiments, once the ship 1504 passes the perimeter of the geofence, the tape nodes and the mobile gateway 812 transmit, all data collected, to the wireless tracking system 800, scanner gateways 2012 (1)-(3), and/or the stationary gateway 2030(1), accessible by a client application 822, running on a mobile gateway 810 (e.g., client device 810). In some embodiments, the mobile gateway 812 has cellular communication capabilities and has been transmitting all tampering events to the wireless tracking system 800, as described with reference to FIGS. 8, 14.

In some embodiments, one or more mobile gateway 812, stationary gateway 814, or tape gateways located on the ship collects tampering data from the respective surrounding tape nodes 1210A, B on the asset containers 864, and one or more of scanner gateways 2012(1)-(3) at the port 2000 connects to each of the one or more mobile gateways 812, stationary gateways 814, or tape gateways located on the ship to check whether any tampering events occurred on the ship. For example, the tape nodes (e.g., tape nodes 1210A, B, 818, 824, 828, 832, 842-848, 859, 860, 866, etc.) adhered to assets report data, including tampering events, to the tape nodes 1210A, B adhered to asset containers; the tape nodes 1210A, B adhered to asset containers report the data to a mobile gateway 812, stationary gateway 814, or tape gateways located on the ship; the mobile gateways 812, stationary gateways 814, or tape gateways located on the ship report the data to the scanner gateways 2012(1)-(3); the scanner gateways 2012(1)-(3) then report the data to the server 804. The raw data (e.g., all data collected from the tape nodes adhered to assets) may not be relayed up to the server 804, but may be filtered so that the tampering event data is relayed to the server 804.

In an example, if a tampering event occurs in or on an asset container 864 during the journey of the ship, one or more of the tape nodes 1210A, 1210B reports the even to one or more of the mobile gateway 812, stationary gateway 814, or tape gateways located on the ship. When the ship enters the port 2000, the one or more of the mobile gateway 812, stationary gateway 814, or tape gateways located on the ship report the tampering event to the scanner gateways 2012(1)-(3). The scanner gateways 2012(1)-(3) may then report the event to a client device at the port 2000. Alternatively or additionally, the scanner gateways 2012(1)-(3) may directly report the tampering event to the server 804, and the client device at the port 2000 may receive a notification or report of the tampering event from the server 804. Thus, the client device at the port 2000 and users using the client device may quickly determine if a tampering event has occurred on the ship and if an inspection is necessary. If no tampering events are reported, the ship may be fast-tracked through a security or processing checkpoint, according to some embodiments.

An authorized user (e.g., authorized user 1220, such as a border patrol agent, shipping authority, etc.) utilizing the client application 822 on the client device 810 may access the shipping manifest, including information pertaining to any tampering events, the assets within the asset containers and their associated tape nodes, and any other relevant data. The authorized user 1220 may, upon determining a detected event (e.g., a temperature increase above an acceptable threshold) of an asset (e.g., shrimp, which is susceptible to temperature changes) occurred, inspect the asset to determine if the asset is damaged or safe for consumption. The authorized user may scan a bar code (e.g., bar code 122) of the tape node or the identifier 1602 associated with the asset container 864. If the authorized user 1220 determines the asset is unsafe for consumption, the authorized user 1220 may, through the client application 822, mark the tape node associated with the asset as unsafe for consumption and "blacklist" the tape node. The blacklisting will cause the wireless tracking system 800 to update information related to the tape node, to restrict entry of the tape node at any checkpoint. For example, a tape node blacklisted at checkpoint A will be restricted from passage through checkpoints B, C, etc. For example, if the shipment comes back to the port at a later time (e.g., 6 months later) the shipment will get caught as a blacklisted item, even if it's on a different ship or vehicle. In some embodiments, the blacklisted tape node is required to pass through the port 2000. Blacklisting may be permanent or it may be temporary. For example, blacklisting of an asset and the tape node may be removed when the asset passes a certain inspection or is repaired.

In some embodiments, the wireless tracking system 800 may automatically determine that the tampering event or detected event (e.g., temperature outside a desired range) detected by the tape node is sufficient to warrant an inspection of the asset.

In some embodiments, the wireless tracking system 800 or an authorized user may, automatically or manually, respectively, determine to fast-track a shipment (e.g., a ship with multiple containers 864) through a checkpoint. For example, the wireless tracking system 800 may analyze the manifest and any data, including tampering events, associated with asset containers 864 of the shipment. If a tampering threshold is exceeded, the shipment may not be fast-tracked, but rather inspected. However, if the tampering threshold is not exceeded, the shipment may be fast-tracked through the checkpoint. In some embodiments, the authorized user 1220, utilizing the client application 822, may determine upon inspection of the manifest and the data, including tampering events or detected events, that an inspection should occur; or that there has been no tampering event logged, and the shipment should be fast-tracked through the checkpoint.

Figure 20B:
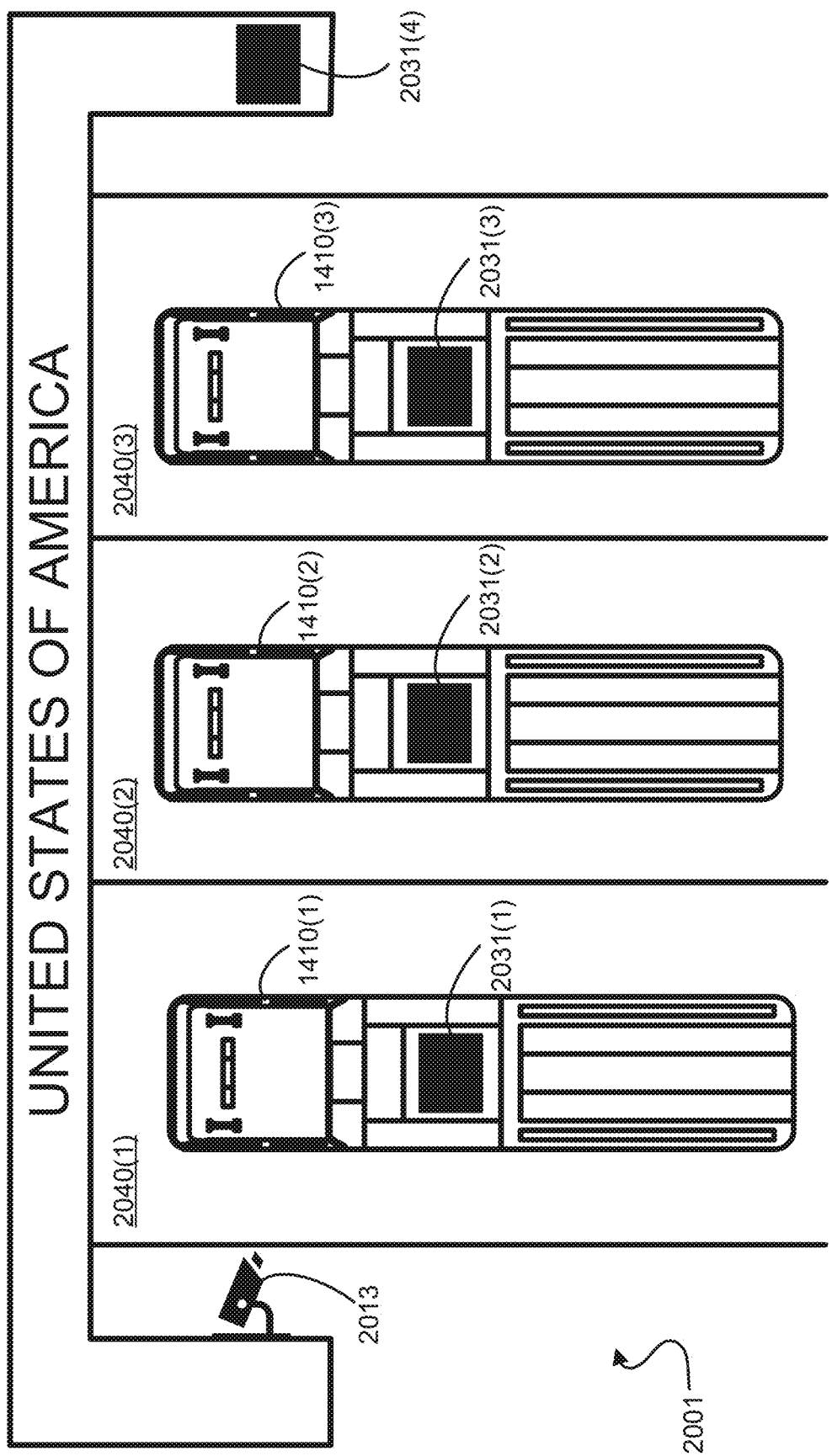

FIG. 20B illustrates a scanning system at a checkpoint 2001 (e.g., a border checkpoint). The scanning system includes scanner gateways 2013 attached to infrastructure, and a stationary gateway and/or mobile gateway 2031(1)-(4) (e.g., stationary gateway 814 or mobile gateway 812) attached to infrastructure and trucks 1410(1)-(4) carrying an asset container (not shown), each within a lane 2040(1)-(3), one of which is a fast-track lane 2040(1). The gateways 2031(4) includes a medium and/or high-power wireless-communication interface 672', 682" that can connect to the gateways 2031(1)-(3). In some embodiments, there may be one or more gateways 2031(4) located at the checkpoint 2001, e.g., adhered to infrastructure, and one or more mobile gateways within the checkpoint 2001, connected to vehicles (e.g., forklifts, trucks, etc.). The gateways 2031 on the truck 1410 may collect tampering related data from the tape nodes (e.g., 1210A, B) on the containers (not shown). The gateway 2031 on the truck 1410 may provide a manifest (e.g., the table 1502) of all the tapes 1210A, B on the asset containers 864 and whether any of them detected tampering to scanner gateways 2013.

In some embodiments, the scanner gateways 2013 connect to individual tape nodes 1210A, B that have medium range/long range (e.g., that include medium and/or high-power wireless-communication interface 672', 682") capability to check if tampering has occurred in any of the containers. For example, the port scanner gateways communicate with the tape nodes 1210A, B through LoRa or LoRaWAN communications.

The checkpoint 2001 may include lanes or choke points for the trucks 1410 to pass through. The scanning system may be located at these choke points. As the trucks 1410 pass through the choke points, the scanning system determines if the truck 1410 is eligible to be fast tracked (e.g., proceed through without further inspection or go to the fast-track lane 2040(1). The scanner gateway 2013 provides results and data to client devices (e.g., mobile gateway 810) of the wireless sensing system used by an authority (e.g., border patrol agents) at the checkpoint 2001.

Figure 21:
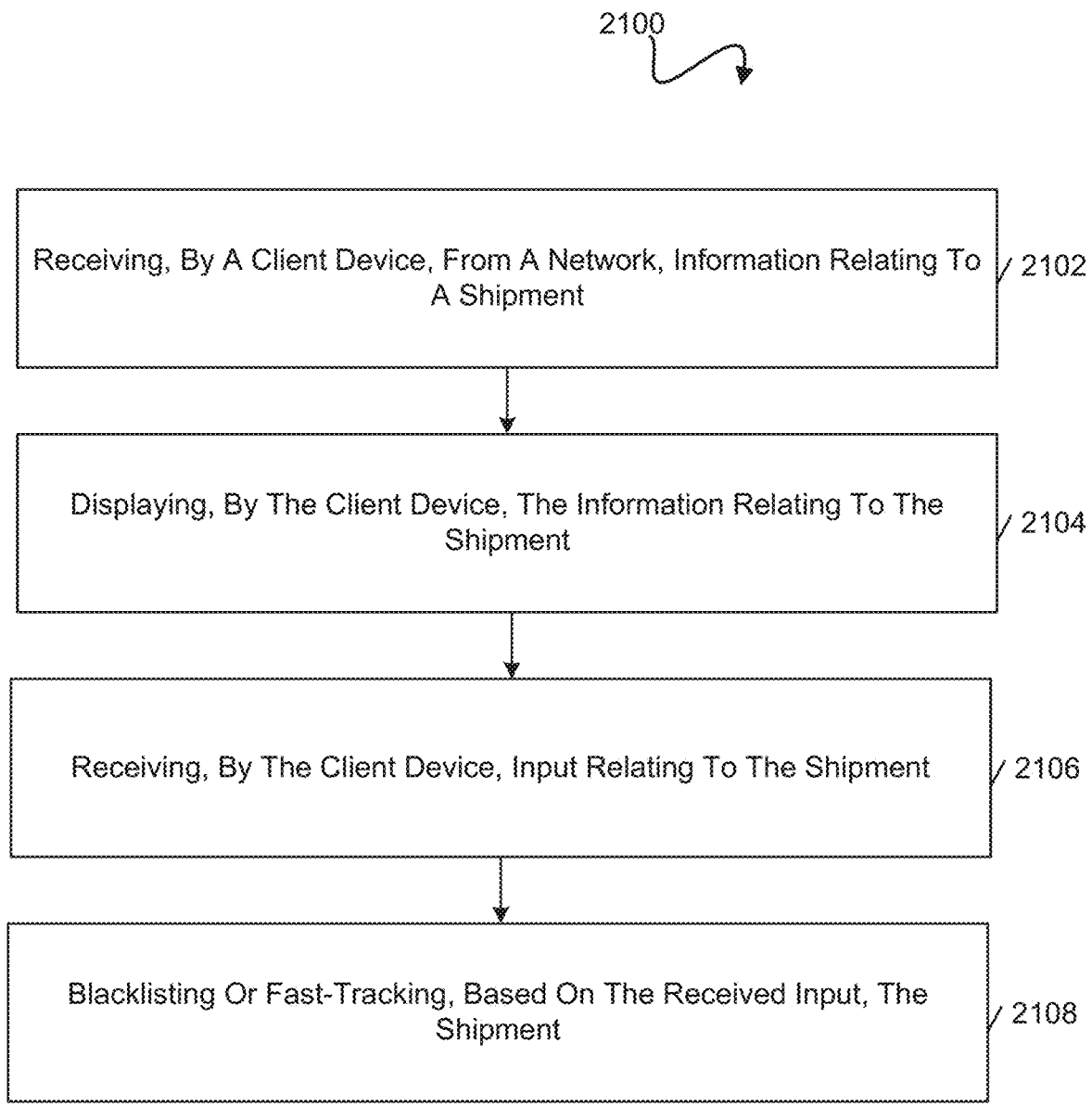
FIG. 21 is a flow diagram of one example method for a client device blacklisting or fast-tracking a shipment at a checkpoint, according to embodiments.

FIG. 21 illustrates a method 2100 for the blacklisting an asset or fast-tracking a shipment at a checkpoint (e.g., a port, border crossing, etc.) by a mobile gateway 810 (e.g., client device 810). The method 2100 includes the client device that includes a client application 822 receiving (2102) from the wireless tracking system 800 (network 1436), information pertaining to a shipment (e.g., one or more asset containers 864 on a ship 1504). In some embodiments, the client device may receive the information pertaining to the shipment when the shipment passes a geofenced threshold (e.g., a geofenced perimeter a distance from a final destination, such as a port). In some embodiments, the client device may receive the information from a mobile gateway 812 associated with, or located on, the shipment and/or its carrier. In some embodiments, the mobile gateway may transmit the information to a stationary gateway 814 associated with, or located on, the checkpoint. The stationary gateway 814 may then transmit the information to the client device.

In some embodiments, rather than the client device receiving the information upon the shipment passing the geofenced threshold, the client device may receive the information upon the, e.g., mobile gateway 812 or tape nodes of the shipment establishing a connection, or being within communication range, of the client device 810 or the stationary gateway 814 associated with, or located on, the checkpoint. For example, the mobile gateway 814 may include a medium-power wireless-communication interface 672', 672" (LoRa interface), with a communication range of up to 15 kilometers, and establishes connection with the stationary gateway 814 at a distance 10 kilometers from the checkpoint. In some embodiments, the tape nodes may also have a medium-power wireless-communication interface and establish connection with the stationary gateway 814 at a distance 10 kilometers from the checkpoint.

In some embodiments, the client device includes the client application 822 connected to the wireless tracking system 800. In this embodiment, the client device may utilize the client application 822 to access the information.

The method 2100 further includes the client device 810, running the client application 822, displaying (2104) the information relating to the shipment. For example, the client device may display the diagram 1500 and the table 1502, along with a shipping manifest, and any information related to detected events (e.g., the "before" and "after" images, discussed above; temperature differentials detected; vibration differentials detected; etc.) associated with the shipment, including the location of the detected events (e.g., the information may be, in part, in the form of a map, such as an augmented reality or 3D-vision map (FIGS. 17, 18), that illustrates the location of the asset container, as well as the location within the asset container, where the event occurred). In some embodiments, the information may include the location of sensitive assets (e.g., medicine or perishable items that are susceptible to temperature fluctuations). The method 2100 further includes the client device receiving (2106) input (e.g., user input from an authorized user 1220) related to the client device. For example, the input may include a selection to either "blacklist" (described above) or "fast-track" (described above) the shipment. In some embodiments, the selection may be based on the authorized user analyzing the information and/or inspecting the shipment. The method 2100 may further include the client device either blacklisting or fast-tracking (2108) the shipment based on the received input. In some embodiments, the client device may update a database of the wireless tracking system 800 to include the actions taken by the client device. For example, the client device may transmit a notification to the wireless tracking system 800 of the actions taken and update the database of the wireless tracking system 800 to reflect that the shipment was blacklisted.

In some embodiments, once the shipment passes through the checkpoint, the wireless tracking system 800 may disable tracking for particular users (e.g., governmental agencies), depending on the laws of the country the shipment is entering and/or any country associated with assets, the shipment, or the shipping mode. For example, if the checkpoint is a border checkpoint and the country the shipment is entering excludes a particular user/entity from tracking assets within the within the country without legal safeguards (e.g., a warrant), the wireless tracking system 800 may reference the database of the wireless tracking system 800, and disable any tracking for the particular entity. For example, the wireless tracking system 800 will disable access, within the client application 822, for the restricted entity (government employees) to track the shipment, once the shipment is within the border. Further, the wireless tracking system 800 will take similar actions to comply with maritime laws.

Figure 22:
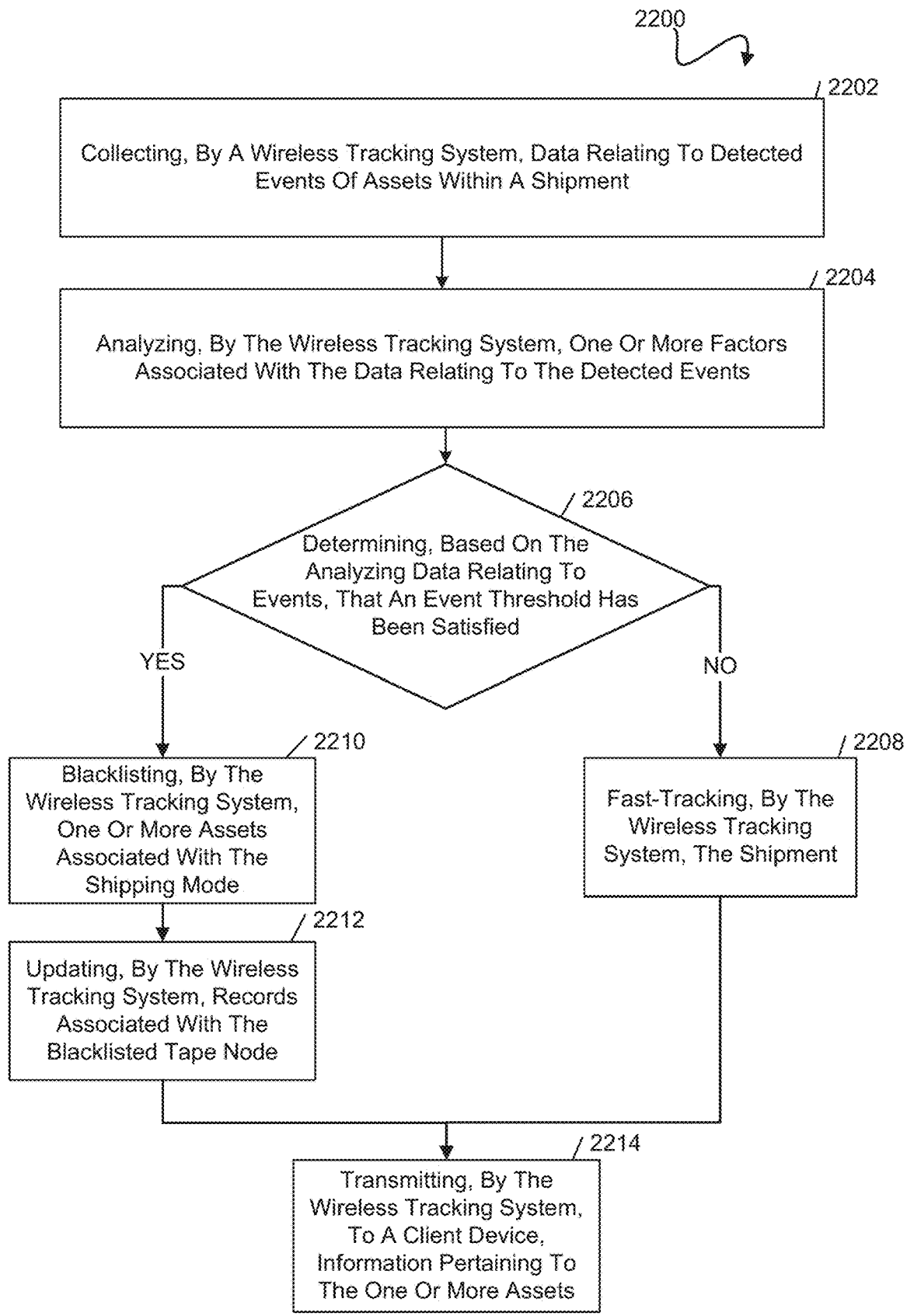
FIG. 22 is a flow diagram of one example method for a network determining whether to blacklist or fast-track a shipment based on analyzing events during a journey, according to embodiments.

FIG. 22 shows a method 2200 of a wireless tracking system 800 (network 1436) blacklisting or fast-tracking a shipment based on a tampering threshold. Method 2200 includes the wireless tracking system 800 collecting (2202) data relating to tampering events of assets within a shipment. For example, the data relating to the events includes the diagram 1500 and the table 1502, along with a shipping manifest, and any information related to tampering events (e.g., the "before" and "after" images, discussed above; temperature differential above a threshold; vibration differential above a threshold; light differential above a threshold; humidity differential above a threshold; etc.) associated with the shipment, as well as any information relating to the tape nodes associated with assets of the shipment.

In some embodiments, collecting may include scanning each tape node associated with the shipment to determine whether all the tape nodes that are included within the tracking system or the manifest are accounted for and are at a correct location. If there are any tape nodes not accounted for, the wireless tracking system 800 may determine there was a tampering event. For example, scanning may include the mobile gateway 812 transmitting an instruction to each tape node within a proximity (e.g., a half mile) of the mobile gateway 812 for the tape nodes to transmit any sensor data collected (e.g., by the cameras, accelerometer, humidity sensors, temperature sensors, etc.) during the voyage.

Method 2200 further includes the wireless tracking system 800 analyzing (2204) one or more factors associated with the data relating to events. In some embodiments, a factor may include determining whether the event may adversely affect the asset, for example, if the asset is food and the event was a temperature differential; if the asset is very fragile and the event is a vibration differential; if the asset is light sensitive and the event is a light differential; etc. Another factor may include determining the degree of the event. For example, if the required temperature of an asset was 50 degrees, and the measured temperature was 51 degrees, the degree of the event may be minor. However, if the measured temperature was 90 degrees, the degree of the event may be major. Further, yet another factor may include utilizing the image recognition, as discussed above, to determine differences between "before" and "after" images; and, analyzing includes determining if the degree of confidence satisfies a threshold that there is a missing asset. Moreover, the factors may include a value, both subjective and objective, of the asset. For example, the subjective value of medicine may be high due to the volatility of some medicines with respect to temperature; the subjective value of a family heirloom may be high based on sentimental value. A user shipping the asset may place a numerical value on the asset before shipping. For example, the objective value of gold, diamonds, or other rare-earth materials may be high based on economic value.

Method 2200 further includes the wireless tracking system 800 determining (2206) that an event threshold has been satisfied, based on the analyzing data relating to the events. In some embodiments, the event threshold may be a numerical value and analyzing the factors resulted in a numerical value that is greater than or equal to the event threshold. Method 2200 (decision: "NO") includes the wireless tracking system 800 fast-tracking (2208) the shipment, in response to the wireless tracking system 800 determining that the does not satisfy the event threshold. In some embodiments, not satisfying the threshold may include the numerical value of the event threshold being within a close range of the numerical value determined from analyzing the factors. However, method 2200 (decision: "YES") includes the wireless tracking system 800 blacklisting (2210) one or more assets associated with the shipping mode, in response to the wireless tracking system 800 determining that the event threshold has been satisfied.

Method 2200 further includes the wireless tracking system 800 updating (2212) records associated with the blacklisted one or more assets. For example, the wireless tracking system 800 updating the records includes updating data within the database (e.g., in the form of a table that includes tape nodes and corresponding assets) of the network on the tape nodes associated with the blacklisted assets. For example, updating includes tagging the asset with a smart label (e.g., a tape node) that, if/when scanned at a checkpoint in the future, would transmit a notification that the asset has been denied. In some embodiments, any checkpoint utilizing the wireless tracking system 800 will receive the update that the tape node is blacklisted. Further, any node, mobile gateway 810 (e.g., client device 810), and/or any other computing device associated with the wireless tracking system 800 may receive the updated records related to the blacklisted tape node.

Method 2200 further includes the wireless tracking system 800 transmitting (2214), to the client device, information pertaining to the one or more assets. In some embodiments, the authorized user may wish to double-check that the determination of either blacklisting or fast-tracking the item is correct. In some embodiments, the wireless tracking system 800 may receive a confirmation from the client device that the determination of either blacklisting or fast-tracking is correct. In some embodiments, the transmitting may be in response to a mobile gateway 812 or tape nodes, located on the ship, passing a geofence perimeter, as discussed with reference to FIG. 22, and/or in response to the mobile gateway 812 or the tape nodes being within communication range of a stationary gateway 814 and/or the client device associated with the checkpoint.

In some embodiments, the communication range of the wireless communication (e.g., high, medium, and low-power wireless-communication interface, and the types of communication, such as LoRa, cellular, etc.) embedded within the tape nodes (mobile gateway, stationary gateway, tape nodes, etc.) associated with the shipping mode may be selected based on a desired distance from a perimeter of a geofenced area (e.g., 600 feet, a quarter mile, a mile, etc. from the center of a checkpoint), to a checkpoint. For example, the wireless-communication interface for the tape nodes may be selected based on the lowest cost required to establish communication at the desired distance. For example, the low-power wireless-communication interface is selected based on a desired distance of 600 ft, and only a few select tape nodes, including the mobile gateway 812 have communication range capabilities exceeding 600 ft. Continuing the example, the mobile gateway 812 may have GPS capabilities so that the shipment may be tracked throughout the route and any events, including tampering events, may be transmitted from the tape nodes to the mobile gateway, and then the mobile gateway may transmit the events to the wireless tracking system 800 (e.g., satellite 870, 1066, 1070, etc.).

The following explanation discusses blacklisting. In embodiments, when the shipment is scanned at a checkpoint (e.g., a point of ingress), a client device (e.g., client device 810) or port scanning system (e.g., as discussed with reference to FIG. 20A, B) that scans a stationary or mobile gateway located on a ship or tape nodes adhered to assets, accesses the database (e.g., the database of server 804) to determine if the scanned identifier corresponds to a manifest and/or asset containers 864 that has been blacklisted in the past. In embodiments, the local scanning system at the port (e.g., port 2000) may store a portion or a copy of the database locally.

Blacklisting may occur during an inspection. If the tape node alerts the border patrol agent that an asset may be compromised the border patrol agent will conduct an inspection. If the border patrol agent determines an asset should be blacklisted, he can enter it into the database using the client device. The client device will automatically input the associated tape node data pulled from the tape node as well as any relevant information on the shipment/asset container.

In embodiments, automatic blacklisting can occur if a tape node adhered to an asset is configured with the rules for blacklisting (e.g., manufacturer sets a temperature limit which can never be exceeded and the tape node monitors temperature of the asset to determine the asset is within the set temperature limit). The tape node on the asset can determine if its associated asset should be blacklisted locally or the tape node can transmits historical data and statistical data of the asset to a client device, gateway, or the port scanner system (e.g., 2030(1), 2012(1)-(3), 2031(4), 2013, FIGS. 20A, B) for one of those devices to make the decision. Further, the data can be relayed up to the server for the server to make the determination. The database is updated with the information.

The following explanation discusses fast-tracking. In embodiments, the port scanning system (e.g., 2030(1), 2012

(1)-(3), 2031(4), 2013, FIGS. 20A, B) or the border patrol agent using a client device scans to check if any of the assets have had a tampering event that exceeds a threshold. A decision to fast-track may be made by the wireless sensing system 800. The gateway nodes (using low or medium-power wireless-communication interfaces 652, 672', such as Bluetooth, LoRa, LoRaWAN, WiFi, etc.) transmit instructions to the client device (for display to border patrol agents). The wireless sensing system (e.g., the port scanning system) that is local to the point of ingress may then update the server 804 (and database) with the scanned data and fast-tracked assets concurrently or at a later time. In embodiments, the port scanning gateway (e.g., 2030(1), 2012(1)-(3), 2031(4), 2013) or client device makes the decision to fast-track, then updates the server 804 with the decision. In another embodiment, the tape node on the container 864 may determine whether a tampering event exceeds a threshold and report the result of the tampering event to the border patrol agent, client device, or port scanning system 2030(1), 2012(1)-(3), 2031(4), 2013, FIGS. 20A, B.

In embodiments, the wireless sensing system 800 or gateways 2030(1), 2012(1)-(3), 2031(4), 2013 may relay the data to the server 804, and the server 804 makes the determination. If the server 804 determines to fast-track the ship/asset container, the database of the server 804 may store a threshold for the detected tampering event. Otherwise, the thresholds for tampering may be stored at the wireless sensing system that is at the ingress point (e.g., port 2000, checkpoint 2001) or on the gateways 2030(1), 2012(1)-(3), 2031(4), 2013 at the ingress point. In embodiments, the thresholds for tampering may be stored locally on the tape nodes on the assets, and the tape nodes may signal to the gateways 2030(1), 2012(1)-(3), 2031(4), 2013 at the port whether the thresholds have been exceeded.

Figure 23:
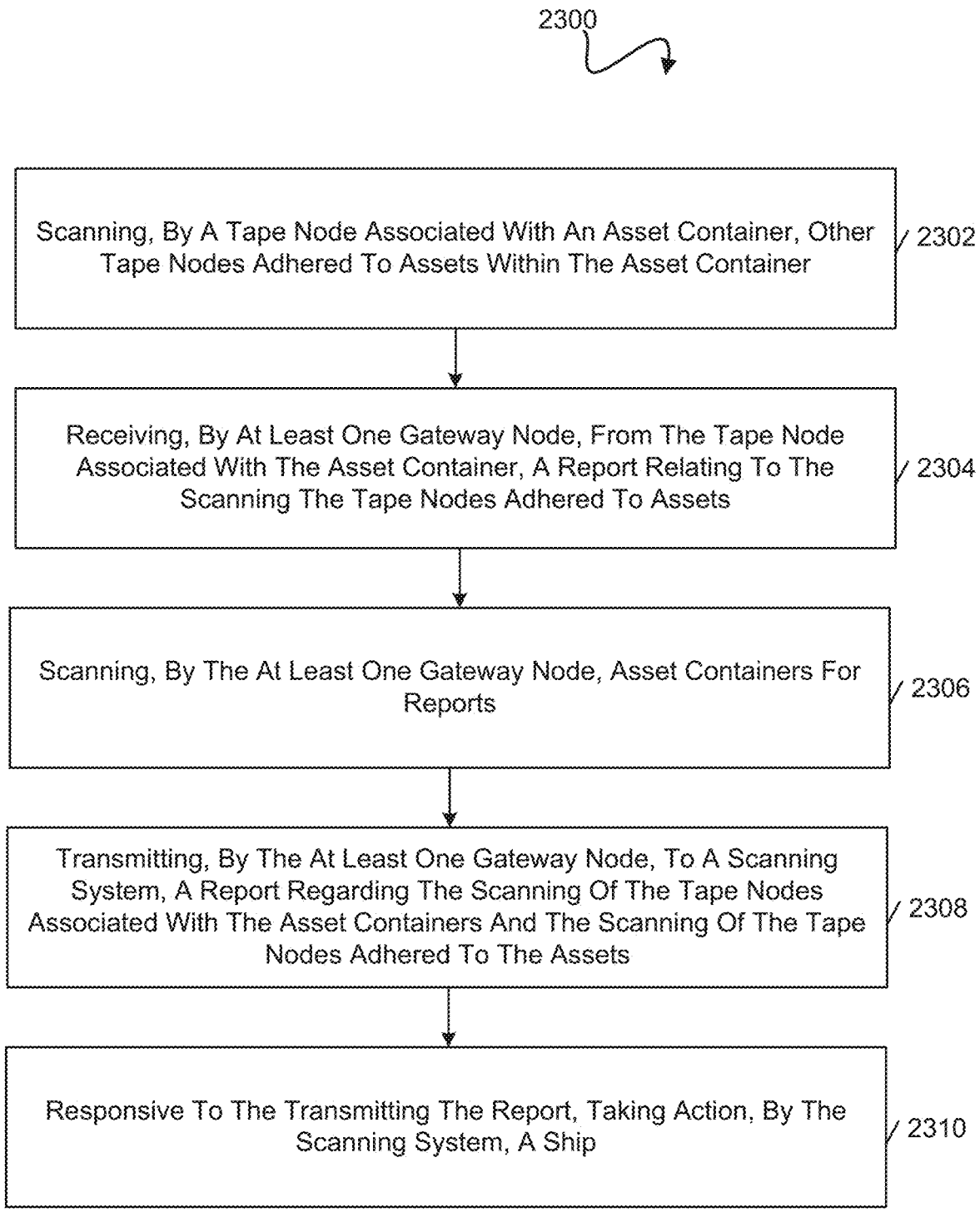
FIG. 23 is a flow diagram of one example method for a scanning system determining whether to fast-track a shipment based on a report created by at least one gateway node, according to embodiments.

FIG. 23 illustrates one example method 2300 for transmitting a report to a scanning system (e.g., of the wireless sensing system 800) for a determination to either fast-track or blacklist a ship. This method is not meant to be limiting to a ship but may be implemented with any form of transportation (e.g., ground, air, sea, etc.) and applied at any checkpoint (e.g., border crossing, shipping port, etc.) to fast-track or blacklist any type of asset conveyance (e.g., ship, truck, plane, train, etc.). Method 2300 includes a tape node (e.g., tape node 1422) associated with an asset container (e.g., asset container 864, truck trailer 1418, etc.) scanning (2302) tape nodes adhered to assets within the asset container. In one example of block 2302, the gateway node may be a stationary gateway (e.g., stationary gateway 814) or mobile gateway (e.g., mobile gateway 812) located on the ship and may be line-powered. Method 2300 further includes at least one gateway node receiving (2304) a report relating to the scanning of the tape nodes adhered to assets. In one example of block 2304, the at least one gateway node may receive the report from the tape node associated with the asset container. Method 2300 further includes the at least one gateway node scanning (2306) multiple asset containers 864 for reports. Method 2308 further includes the at least one gateway node transmitting (2308) a report to a scanning system (e.g., located at a shipping port). In some example of block 2308, the report includes the scanning of the tape nodes adhered to assets (block 2302) and the scanning of the tape nodes associated with the asset containers (block 2306). Method 2300 further includes the scanning system taking (2310) action based on the report. In one example of block 2310, taking action includes fast-tracking the ship in response to a positive report (e.g., no tampering events or minimal tampering events; the tape nodes adhered to assets are substantially accounted for based on referencing a shipping manifest or an internal database of the wireless sensing system; etc.). In one example of block 2310, taking action includes performing routine inspection of the ship and any asset containers on the ship; inspection protocols may be initiated including the manual inspection using the AR user interface, discussed with reference to FIGS. 16-19.

Figure 24:
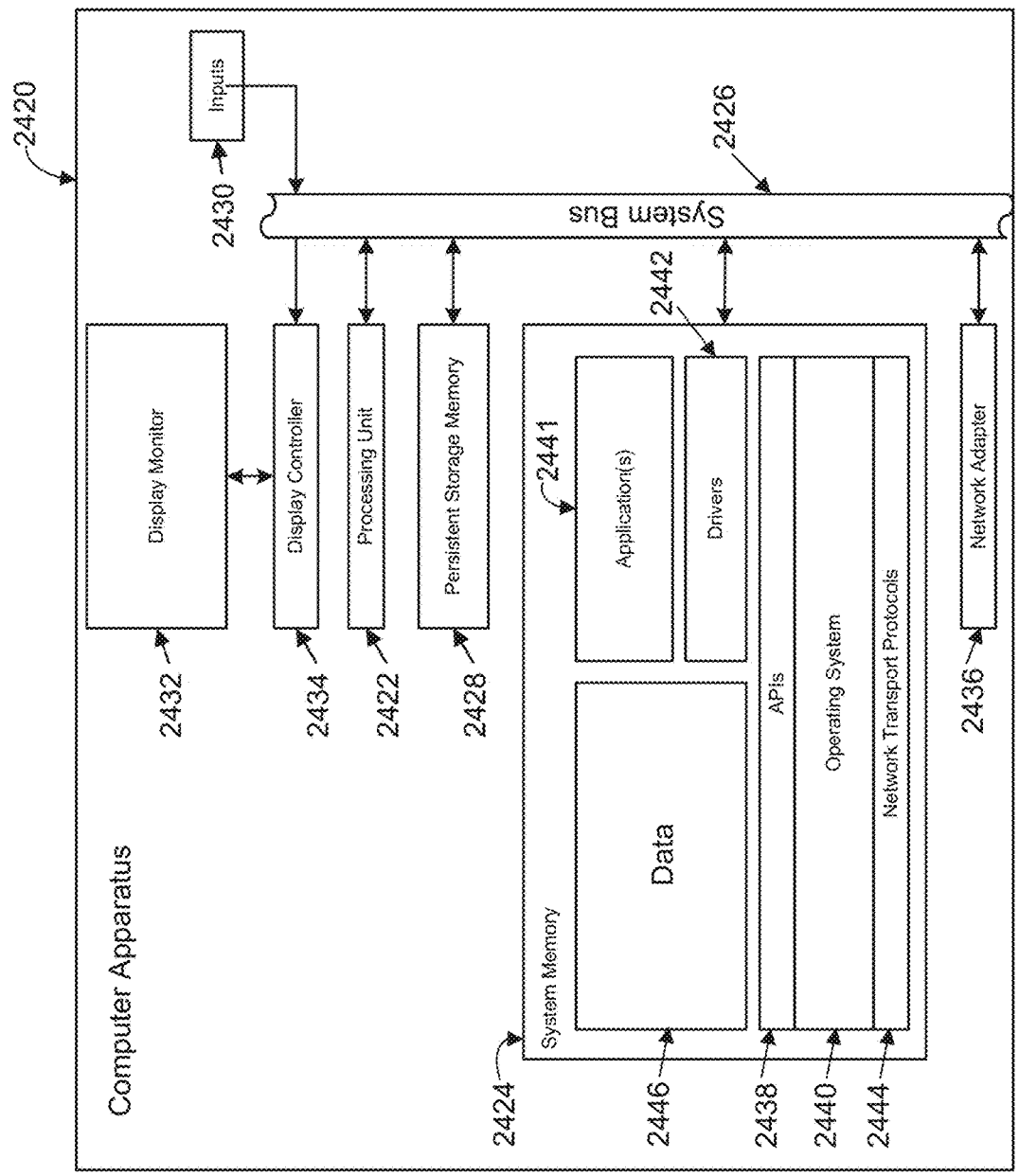
FIG. 24 is a block diagram of an example computer apparatus, according to an embodiment.

FIG. 24 shows an example embodiment of computer apparatus 2420 that, either alone or in combination with one or more other computing apparatus, is operable to implement one or more of the computer systems described in this specification. The computer apparatus 2420 includes a processing unit 2422, a system memory 2424, and a system bus 2426 that couples the processing unit 2422 to the various components of the computer apparatus 2420. The processing unit 2422 may include one or more data processors, each of which may be in the form of any one of various commercially available computer processors. The system memory 2424 includes one or more computer-readable media that typically are associated with a software application addressing space that defines the addresses that are available to software applications. The system memory 2424 may include a read only memory (ROM) that stores a basic input/output system (BIOS) that contains start-up routines for the computer apparatus 2420, and a random-access memory (RAM). The system bus 2426 may be a memory bus, a peripheral bus, or a local bus, and may be compatible with any of a variety of bus protocols, including PCI, VESA, Microchannel, ISA, and EISA. The computer apparatus 2420 also includes a persistent storage memory 2428 (e.g., a hard drive, a floppy drive, a CD ROM drive, magnetic tape drives, flash memory devices, and digital video disks) that is connected to the system bus 2426 and contains one or more computer-readable media disks that provide non-volatile or persistent storage for data, data structures and computer-executable instructions.

A user (e.g., user 1220) may interact (e.g., input commands or data) with the computer apparatus 2420 using one or more input devices 2430 (e.g. one or more keyboards, computer mice, microphones, cameras, joysticks, physical motion sensors, and touch pads). Information may be presented through a graphical user interface (GUI) that is presented to the user on a display monitor 2432, which is controlled by a display controller 2434. The computer apparatus 2420 also may include other input/output hardware (e.g., peripheral output devices, such as speakers and a printer). The computer apparatus 2420 connects to other network nodes through a network adapter 2436 (also referred to as a "network interface card" or NIC).

A number of program modules may be stored in the system memory 2424, including application programming interfaces 2438 (APIs), an operating system (OS) 2440 (e.g., the Windows® operating system available from Microsoft Corporation of Redmond, Wash. U.S.A.), software applications 2441 including one or more software applications programming the computer apparatus 2420 to perform one or more of the steps, tasks, operations, or processes of the positioning and/or tracking systems described herein, drivers 2442 (e.g., a GUI driver), network transport protocols 2444, and data 2446 (e.g., input data, output data, program data, a registry, and configuration settings).

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method, comprising:
  detecting, by a wireless tracking system, a tampering event associated with an asset within an asset container;
  in response to detecting the tampering event, capturing, by the wireless tracking system, a first digital representation of the field of view including the asset container;
  determining, based on the wireless tracking system comparing the first representation to a second digital representation of the field of view including the asset container stored in memory, a difference between the first and second digital representations; and
  displaying, by the wireless tracking system, within a graphical user interface of a client device, the difference between the first and second digital representations, wherein displaying the difference comprises displaying an augmented reality overlay to emphasize the difference.

2. The method of claim 1, wherein capturing the first digital representation further comprises:
  displaying an overlay onto a live feed of the client device to guide a user in positioning the client device to capture the first digital representation.

3. The method of claim 1, further comprising:
  transmitting an alert to a client device from the wireless tracking system in response to detecting the tampering event.

4. The method of claim 3, wherein the alert includes a shipping manifest, a diagram of a journey of the asset container, and corresponding information related to the tampering event.

5. The method of claim 1, further comprising:
  transmitting, by the wireless tracking system, an alert responsive to transiting a perimeter threshold of a predetermined geofenced area.

6. The method of claim 1, further comprising storing, by the wireless tracking system, the first captured digital representation in a database.

7. The method of claim 1, wherein displaying the difference comprises displaying a three-dimensional visualization of the asset environment and indicating a location of the tampering event thereon.

8. The method of claim 1, wherein displaying the difference comprises displaying a map of the asset environment and including a marker identifying the asset.

9. The method of claim 1, further comprising:
  scanning, by the client device, an identifier of the asset container that associates the asset container with one or more intelligent nodes within the asset container that are attached to one or more assets.

10. The method of claim 1, wherein a tape node with an embedded camera, within or on the asset container, captures the first digital representation of the field of view, the field of view including an interior portion or an exterior portion of the asset container.

11. The method of claim 1, wherein a tape node with an embedded camera, within or on the asset container, captures the second digital representation field of view, the field of view including an interior portion or an exterior portion of the asset container.

12. The method of claim 1, wherein a client device of the wireless tracking system captures the first digital representation and was used to capture the second digital representation.

13. The method of claim 1, wherein a first intelligent node and a second intelligent node of the wireless tracking system are each adhesively attached to opposing flaps of the associated asset, respectively, wherein the detecting the tampering event further comprises:
  detecting, by at least one of the first and second intelligent nodes, a distance between the first and the second intelligent nodes satisfying a distance threshold.

14. A wireless tracking system, comprising:
  a first client device operable to obtain a first digital representation of a field of view including an asset container;
  a network comprising:

a first intelligent node attached to an asset within the asset container, the first intelligent node operable to detect a tampering event of the asset; and a second intelligent node operable to receive an indication of a tampering event from the first intelligent node, the second intelligent node communicatively coupled to the first client device, and includes a wireless communication interface with longer range capabilities of a wireless communication interface of the first intelligent node; and a second client device communicatively coupled to the second intelligent node, and operable to receive the indication of the tampering event by wirelessly communicating directly with the second intelligent node, the second client device further operable to capture a second digital representation of the field of view including an asset container.

15. The wireless system of claim 14, wherein the first client device is the second client device.

16. The wireless tracking system of claim 14, wherein the second client device is further operable to display graphical overlay elements in the second digital representation to indicate the detected tampering event location.

17. The wireless tracking system of claim 14, wherein the second client device is operable to display an overlay onto a live feed of the second client device to guide an authorized user in positioning the second client device to capture the second digital representation.

18. The wireless tracking system of claim 14, wherein the second client device is further operable to present instructions to guide an authorized user in positioning the second client device to capture the second digital representation.

19. The wireless tracking system of claim 14, wherein the second client device is further operable to detect, using computer vision techniques, differences between the first and second digital representations.

20. A method, comprising:
analyzing, by a wireless tracking system, sensor data associated with an event proximate to an asset, collected by at least one intelligent node of a wireless tracking system associated with the asset;

determining, based on the wireless tracking system analyzing the sensor data, whether an event threshold has been satisfied;

responsive to determining the event threshold is satisfied, blacklisting the at least one intelligent node from passing through a checkpoint, wherein assets associated with a blacklisted intelligent node are prohibited from entry across the checkpoint; and updating, by the wireless tracking system, records within the wireless tracking system associated with the at least one intelligent node to include the blacklisting.

21. The method of claim 20, further comprising:
identifying, by the wireless tracking system, the at least one intelligent node, responsive a client device scanning an identifier of the at least one intelligent node at another checkpoint; and restrict, by the wireless tracking system, the at least one intelligent node from passing through a second checkpoint.

22. The method of claim 20, further comprising:
transmitting, by the wireless tracking system to the client device of the wireless tracking system, the sensor data associated with the events for display within a graphical user interface of the client device; and allowing, by the wireless sensing system, the blacklisted tape node to pass through the checkpoint.

23. The method of claim 20, wherein the determining whether the event is satisfied further comprises comparing the collected sensor data to predetermined sensor data, the method further comprising:
determining, based on the comparison, a difference between the collected sensor data and the predetermined data satisfies an event threshold.

24. A method, comprising:
analyzing, by a wireless tracking system, sensor data associated with an event proximate to an asset, collected by at least one intelligent node of a wireless tracking system associated with the asset within an asset container;

determining, based on the wireless tracking system analyzing the sensor data, whether an event threshold has been satisfied; and responsive to determining the event threshold is satisfied, fast-tracking the asset container through a checkpoint, wherein fast-tracked asset containers are permitted to pass through the checkpoint with reduced security requirements or inspection.

25. The method of claim 24, further comprising:
disabling, by the wireless tracking system, tracking capabilities of the wireless tracking system, upon crossing a geofence perimeter threshold.

26. The method of claim 24, further comprising:
transmitting, by the wireless sensing system, to a client device of the wireless sensing system, sensor data associated with an event proximate to an asset for display within a graphical user interface of the client device.

* * * * *

UNITED STATES PATENT AND TRADEMARK OFFICE
CERTIFICATE OF CORRECTION

| | |
|---|---|
| PATENT NO. | : 11,741,822 B2 |
| APPLICATION NO. | : 17/449582 |
| DATED | : August 29, 2023 |
| INVENTOR(S) | : Hendrik J. Volkerink et al. |

It is certified that error appears in the above-identified patent and that said Letters Patent is hereby corrected as shown below:

In the Claims

In Claim 16 at Column 59 Line 24:
"indicate the detected tampering event location."

Should read:
--indicate location of the tampering event.--

Signed and Sealed this
Fourteenth Day of May, 2024

Katherine Kelly Vidal
*Director of the United States Patent and Trademark Office*